Nov. 10, 1953 J. KAYE 2,658,946

CODE KEYING SYSTEM

Filed April 16, 1951 14 Sheets-Sheet 1

INVENTOR.
JOHN KAYE,
BY
Barkelew & Scantlebury
ATTORNEYS.

Nov. 10, 1953 J. KAYE 2,658,946

CODE KEYING SYSTEM

Filed April 16, 1951 14 Sheets-Sheet 2

INVENTOR.
JOHN KAYE,
BY
Berkeley & Castleberry
ATTORNEYS.

INVENTOR.
JOHN KAYE,
BY
Baukelew & Beaulieu
ATTORNEYS.

Nov. 10, 1953 J. KAYE 2,658,946

CODE KEYING SYSTEM

Filed April 16, 1951 14 Sheets-Sheet 4

INVENTOR.
JOHN KAYE,
BY Batchelor & Saulsbury
ATTORNEYS.

INVENTOR.
JOHN KAYE,
BY
Bucklew & Crattlebury
ATTORNEYS.

INVENTOR.
JOHN KAYE,
BY
Beukelaw & Seaxelbury
ATTORNEYS.

Nov. 10, 1953 J. KAYE 2,658,946

CODE KEYING SYSTEM

Filed April 16, 1951 14 Sheets-Sheet 7

INVENTOR.
JOHN KAYE,
BY
Beukelaw & Scaulleberry
ATTORNEYS.

JOHN KAYE,
INVENTOR.
BY Berkelew & Scantlebury
ATTORNEYS

INVENTOR.
JOHN KAYE,
BY
Berkelew & Saulsbury
ATTORNEYS.

INVENTOR.
JOHN KAYE,
BY
Buckeley & Scantlebury
ATTORNEYS.

Nov. 10, 1953 J. KAYE 2,658,946

CODE KEYING SYSTEM

Filed April 16, 1951 14 Sheets-Sheet 11

INVENTOR
JOHN KAYE,
By Bauhelew & Sean Alsbery
ATTORNEYS.

Nov. 10, 1953 J. KAYE 2,658,946

CODE KEYING SYSTEM

Filed April 16, 1951 14 Sheets-Sheet 12

INVENTOR
JOHN KAYE,
By Bucklew & Scantlebury
ATTORNEYS.

INVENTOR
JOHN KAYE
By Baukelaw & Scandleberry
ATTORNEYS.

Nov. 10, 1953 J. KAYE 2,658,946

CODE KEYING SYSTEM

Filed April 16, 1951

14 Sheets-Sheet 14

INVENTOR
JOHN KAYE,
BY
Barkelew & Scantlebury
ATTORNEYS.

Patented Nov. 10, 1953 2,658,946

UNITED STATES PATENT OFFICE 2,658,946

CODE KEYING SYSTEM

John Kaye, Banning, Calif.

Application April 16, 1951, Serial No. 221,241

60 Claims. (Cl. 178—82)

This invention is concerned generally with the production of electrical impulses that conform strictly to definite rules of timing and yet are selective in nature. A typical field in which such impulses are utilized is the sending of information in the form of telegraphic code by wire or radio. Code signals can convey information only if selective control is exercised over their production, either manually, as in operation of a hand key, for example, or through some automatic or semi-automatic device. At the same time, the more closely the signals conform to definite rules of timing, the more readily and reliably they can be interpreted.

The problem of generating code signals efficiently is largely the problem of reconciling full selectivity with maximum timing accuracy. The present invention provides a more complete and satisfactory solution to that basic problem than has been previously available. Means are provided for the first time by which the function of selection can be entirely separated from the function of timing. The signal selecting function, whether depending upon manual action of a human operator or upon signals pre-formed on a tape, for example, is thus relieved by providing full timing accuracy of any type. Timing errors of all types introduced by the control function (provided only that they do not exceed certain definite but wide limits) are corrected by the timing function, and the system generates code that is fully correct in all respects.

The invention will be described, for the sake of clarity, with specific relation to the production of Continental (International) Morse Telegraph Code, for which it is particularly well adapted. However, it will be understood that the same basic concepts and procedures can be utilized also for producing other types of code signals, and, indeed, for producing any similar type of succession of electrical impulses in which selectivity of impulse type must be combined with definite rules of timing. The general term "code" is here used in that broad sense, and the particular characteristics of any specifically described type of code are illustrative.

Continental Code employs two alternative output circuit conditions, marking output (typically closed pole) and spacing output (typically open pole). Those conditions are combined to form characters of two distinct types, dots and dashes, which are combined in definite patterns separated by spaces of various definite lengths to represent letters and words. The timing relations between marking and spacing output within each character, and the timing relationship of successive characters and of spaces between characters and between words are defined in accordance with the so-called "baud" principle, which is the internationally accepted standard for radio-telegraphic code.

The shortest timing unit of such code is commonly called a baud, and two successive bauds make up one complete keying cycle. A dot consists of one baud of marking output followed by one baud of spacing output, and occupies one full keying cycle. A dash occupies two keying cycles and consists of three bauds of continuous marking followed by one baud of spacing. Letters are represented by characteristic sequences of such characters, and are separated by one keying cycle of continuous spacing output. The space between words is two or three keying cycles in length, depending upon receiving end techniques and general desirability.

Many devices are known which are more or less effective in assisting the manual production of accurate code. Such devices include, for example, mechanical linkages connected to a manual key and tending to give the key a definite natural period of oscillation between marking and spacing conditions. Such a natural period may improve the uniformity of timing of a series of dots, for example. Electronic means have been described which accomplish much the same purpose. Means have also been described, both mechanical and electronic, providing two such natural periods, appropriate for dots and dashes, respectively, and permitting selective actuation of one or the other such timing device by corresponding movement of a key. Most such devices control the relative timing of successive characters of the same type only, and rely entirely upon the skill of the operator to determine the proper moment to start a dash that immediately follows a dot, and vice versa. One device of this general type provides three separately adjustable timing means that control respectively the lengths of dot marking, of dash marking and of spacing intervals of characters. However, with such a device any change in keying speed requires separate readjustment of each of the three timers. Moreover, the spaces between letters and between words are not subject to automatic control in any of the "natural frequency" devices just referred to, but must be manually timed by the operator.

Previous devices of another type employ rotating drums upon which alternately conductive and non-conductive sectors reproduce, for example, the patterns of mark and space timing required for sequences of like characters. Such devices provide no automatic control for timing successions of unlike characters, nor for timing the inter-letter and inter-word spaces that must be introduced between groups of characters. Another type of rotating drum device employs in effect a separate drum for the particular sequence of characters that represents each letter. Such devices may produce correct internal timing within each letter, but the inter-letter and inter-word spaces are either not controlled at all, or are timed incorrectly.

The present invention has as an important object the provision of means for producing, under control of a selective agency that performs only the selective function, code that is strictly accurate in all respects. Timing errors of any type that may be introduced by the process of control, so long as they do not exceed certain generous limits, are fully corrected, and the code output is correctly timed. Not only is the mark to space ratio of each character correct; not only do successive characters of a letter have correct relative timing; but inter-letter spaces of one keying cycle and inter-word spaces of two or three keying cycles are also correctly produced.

A further important object of the invention, which relates more particularly to manual control, is to permit the operator greater freedom of action in performing the selective function. More specifically, signal storing means are provided, so that the operator may perform in relatively rapid succession the operations required to select a desired sequence of characters, including successive unlike characters. The system then acts in response to the stored signals to produce the corresponding series of marking and spacing intervals in their correct time relations. Provision of such signal storing or memory functions, particularly in combination with the extended timing function already described, permits the operator to keep well ahead of the actual code production, thus providing a flexibility of action which results in increased speed and remarkable ease of operation. No previous code keying system is known in which any such memory action is provided. The great advantages of this aspect of the invention, which are difficult to appreciate fully without direct experience, have been amply demonstrated with both experienced and novice operators.

The present invention in its preferred form times the code characters and spaces by reference to what will be termed a "free-running time base." That is to say, the time base of the system is not affected by the control operation that determines the sequence of code signals to be generated. The time base is preferably completely independent of the control agency.

Moreover, in preferred form, the time base comprises effectively instantaneous timing signals. That leads to greatly improved performance in comparison to timing signals that are effectively of appreciable duration relative to one baud, or half keying cycle. As an example, some prior devices employ, for producing dots, a constantly driven commutator that provides a closed circuit contact during the first half of each keying cycle and an open contact during the second half of each keying cycle. A manual key and any suitable output circuit means are connected in series with the commutator. Continued closure of the key then may produce a series of correctly timed dots. However, such a timing commutator is not an effectively instantaneous timing device for the following reason. Closure of the commutator contact produces a timing signal that is continuing in its effect. It shifts the circuit from a condition in which key closure has no effect to a condition in which key closure actuates the output circuit means. That shift takes place at a definite instant, to be sure, but it has a continuing effect, not merely an instantaneous effect. The effect of the shift continues, in the specific instance mentioned, throughout one baud, until the commutator again shifts the circuit to idle condition. That continuing effect of the timing signal has the disturbing result that the output circuit may be actuated by manual key closure at any time during a whole half cycle. For example, if the key is closed half way through the first baud of a keying cycle, while the commutator contact is closed, the output circuit goes at once to marking condition; and shifts back to spacing condition at the end of that same baud, when the commutator contact opens. Thus a short dot is produced, only half as long as it should be.

In contrast to such systems, the present invention preferably employs a timing signal that has only an instantaneous effect. If the rest of the system is in idle condition (due, for example, to the operator's selective action or inaction) at the moment of the timing signal, so that the signal produces no immediate change in the system, then no such change can be produced until the next timing signal appears. Each timing signal is thus effectively instantaneous, in the sense that whatever effect it is potentially capable of producing can be produced only at a definite moment. If conditions do not permit that effect to take place at that moment, it cannot take place at all in response to that particular timing signal. In actual practice the period of effectiveness of the timing signal necessarily has a finite duration. However, since that duration can be made as short as a few microseconds, it is in full effect instantaneous.

That important distinction between the prior art and the preferred form of the present invention has been described in broad terms because it is essentially broad in its nature. There are many types of mechanism by which the described behavior can be brought about. For example, the timing signals may be inherently instantaneous in their nature, as in the case of electric pulses produced by periodic condenser discharge. If one such pulse fails to produce an effect on the system, obviously no such effect can be produced before the appearance of the next pulse. Alternatively, the basic timing signal may be of an inherently non-instantaneous type. It may, for example, be produced by alternate opening and closing of an electrical contact, as in the prior art arrangement last described. That type of signal may be described broadly as the equivalent of a symmetrical square wave having a period of one keying cycle. An illustrative manner of utilizing such a non-instantaneous basic timing signal in accordance with the present invention involves first effectively differentiating the square wave to produce a series of instantaneous timing signals of alternating character, and utilizing those inherently instantaneous derived signals for timing control of the system. In that way the timing signals, although originally of continuing nature, are made effectively instantaneous in their interaction with the system.

In many embodiments of the invention the complete code keying system comprises clearly distinguishable and physically separate sections which perform definite parts of the overall function of the system. For example, means for generating a free-running time base may comprise a definite physical part of the apparatus; the output circuit means is usually clearly separable; and the memory circuitry, when used, may be clearly distinguishable from the rest of the apparatus, and hence, for example, removable as a unit without requiring extensive rearrangement of other parts of the circuitry. Whether that is the case or not, each of the various functions of the apparatus can ordinarily be accomplished by very different types of detailed circuitry. A particular type of memory circuit, for example, that is included in one illustrative embodiment as here described, can ordinarily be incorporated alternatively in another embodiment in place of (or in addition to) the type of circuit there shown for performing the corresponding function. No attempt is made here to point out all such possible combinations. That would obviously be quite futile, since there is no possibility of showing explicitly all types of circuit that can be effectively employed in performing even one function in accordance with the invention. The present description is limited to certain typical and illustrative arrangements which are thought to include a sufficient variety of specific embodiments of the various aspects of the invention to convey a clear understanding of the invention and of its objects and advantages.

In the appended drawings, which form a part of that description:

Figure 5:
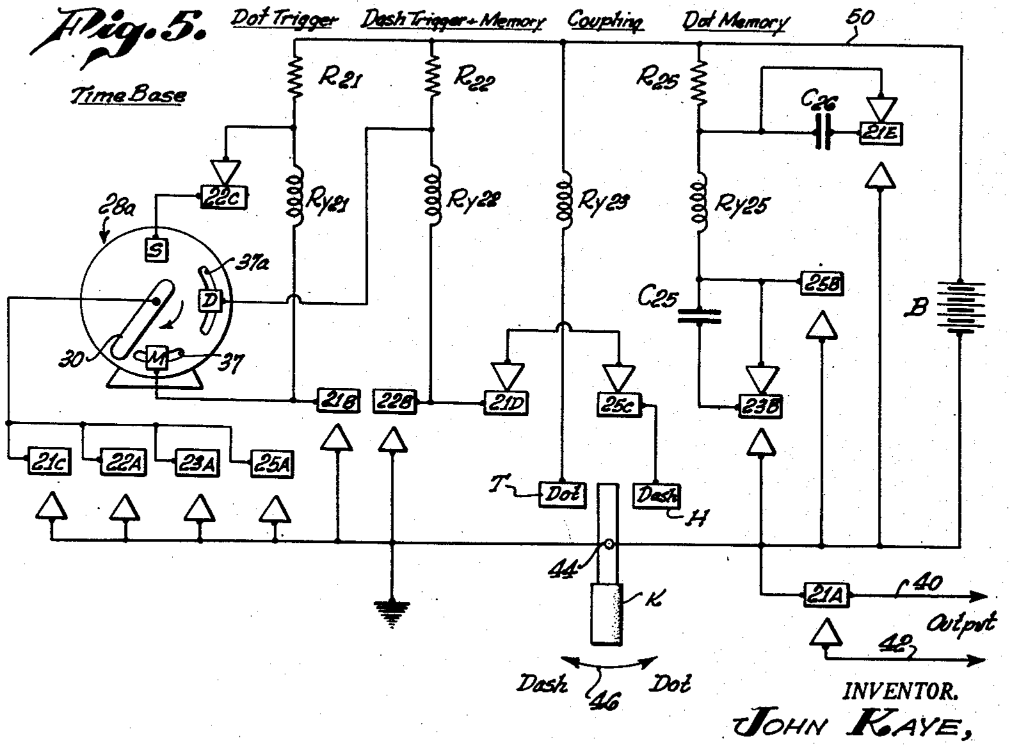
Fig. 5 is a schematic diagram illustrating an embodiment providing two types of memory function.
Figures 5A, 5B:
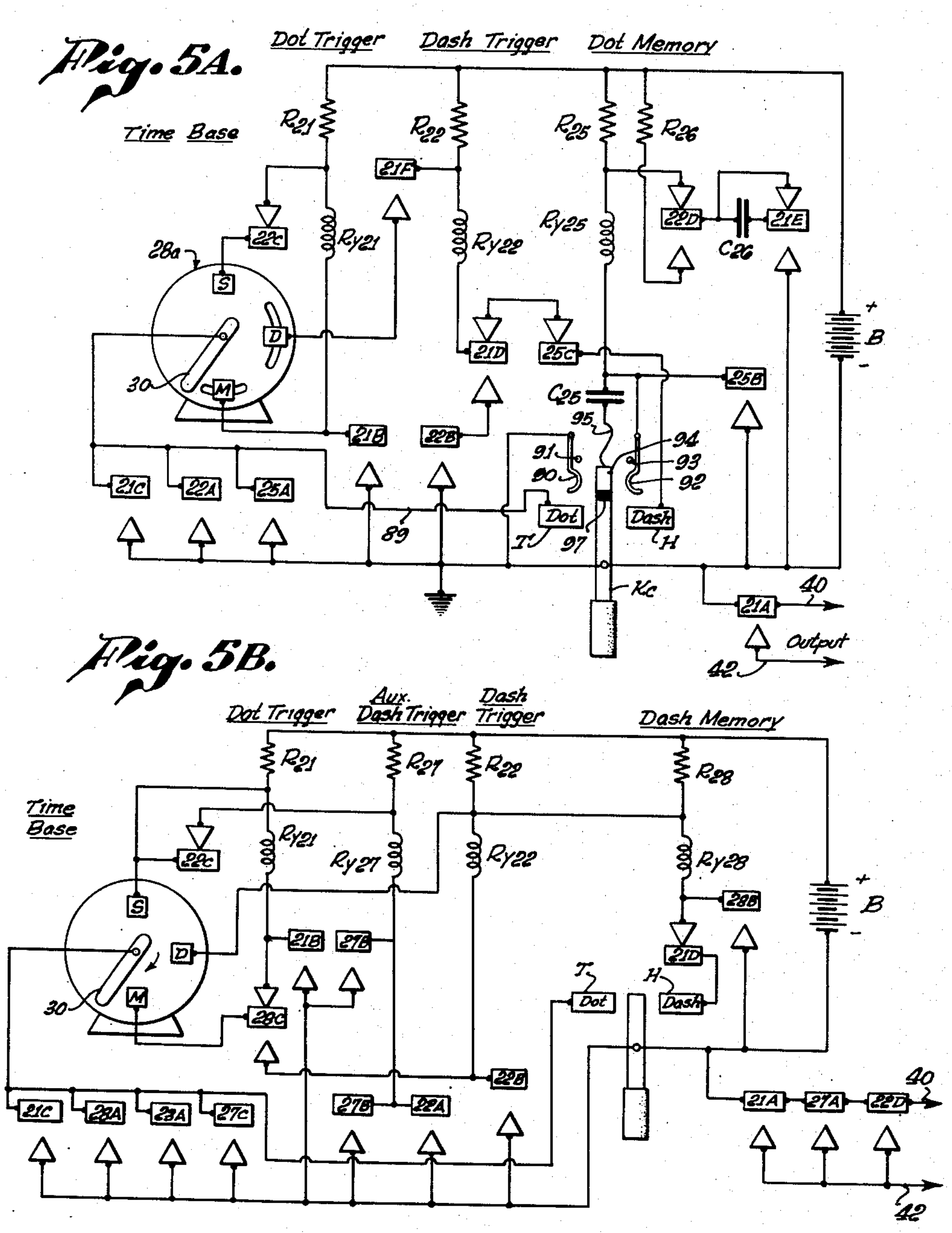
Figures 6, 7:
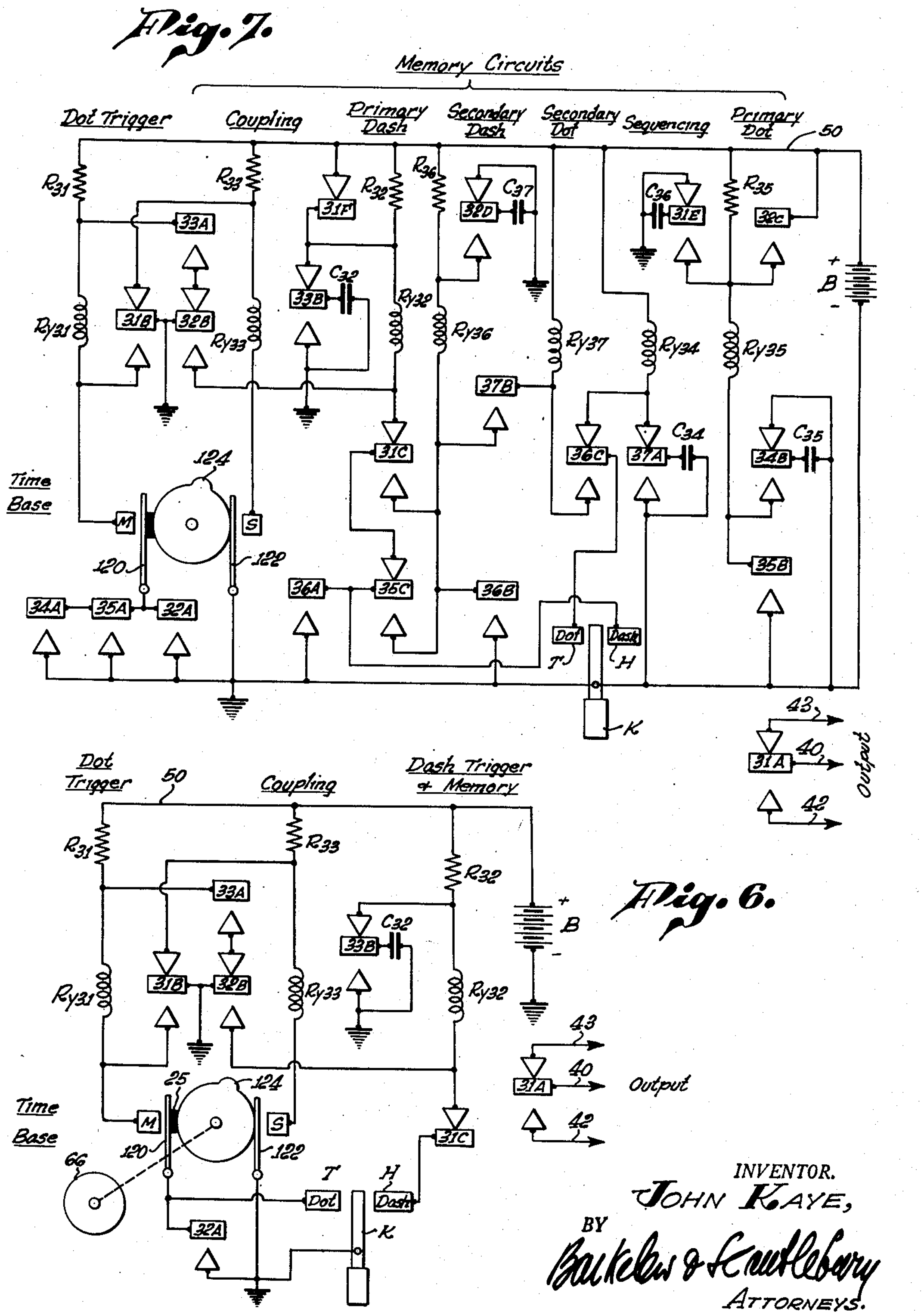
Figure 8:
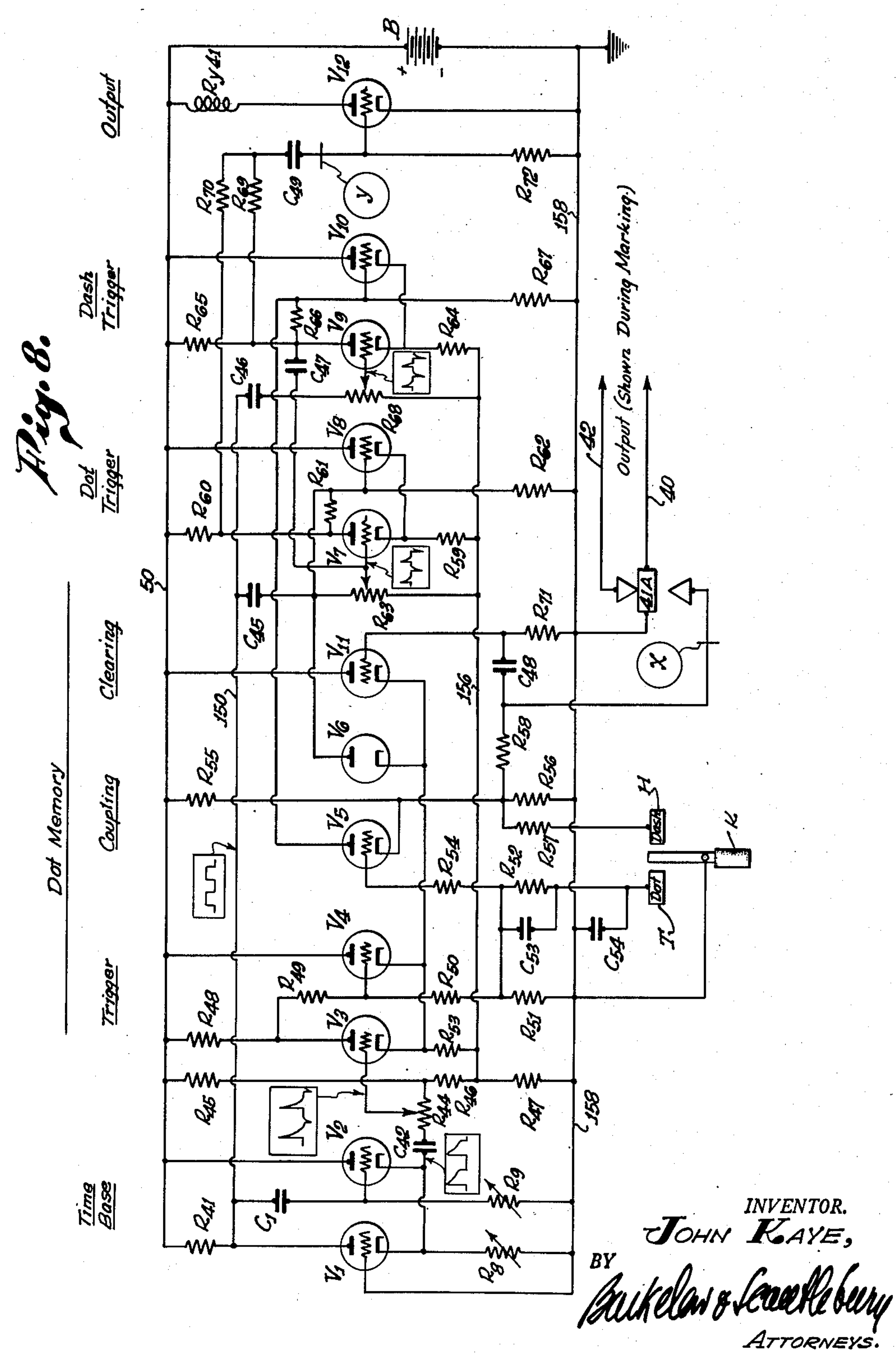
Figure 8A:
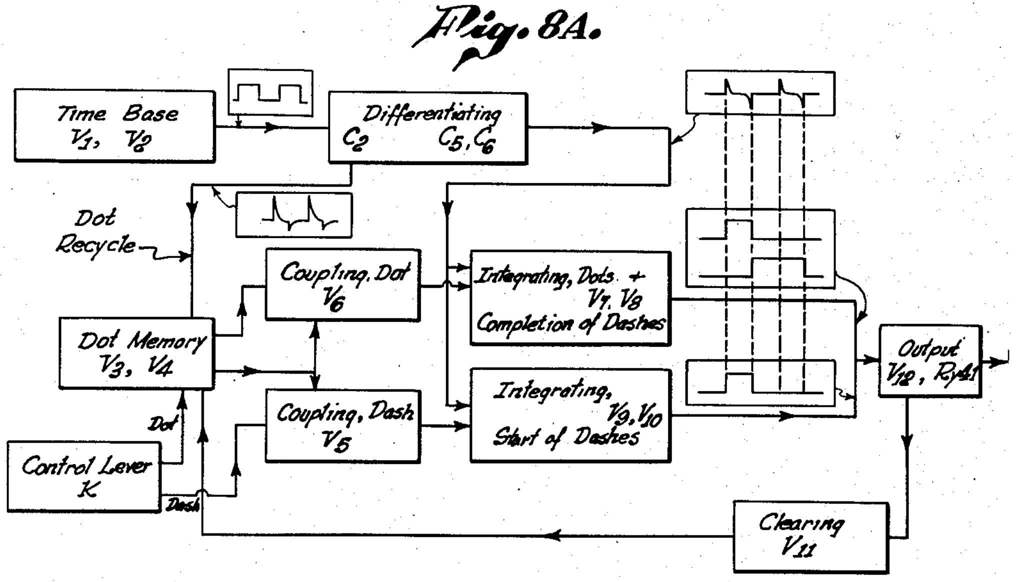
Figures 9, 10:
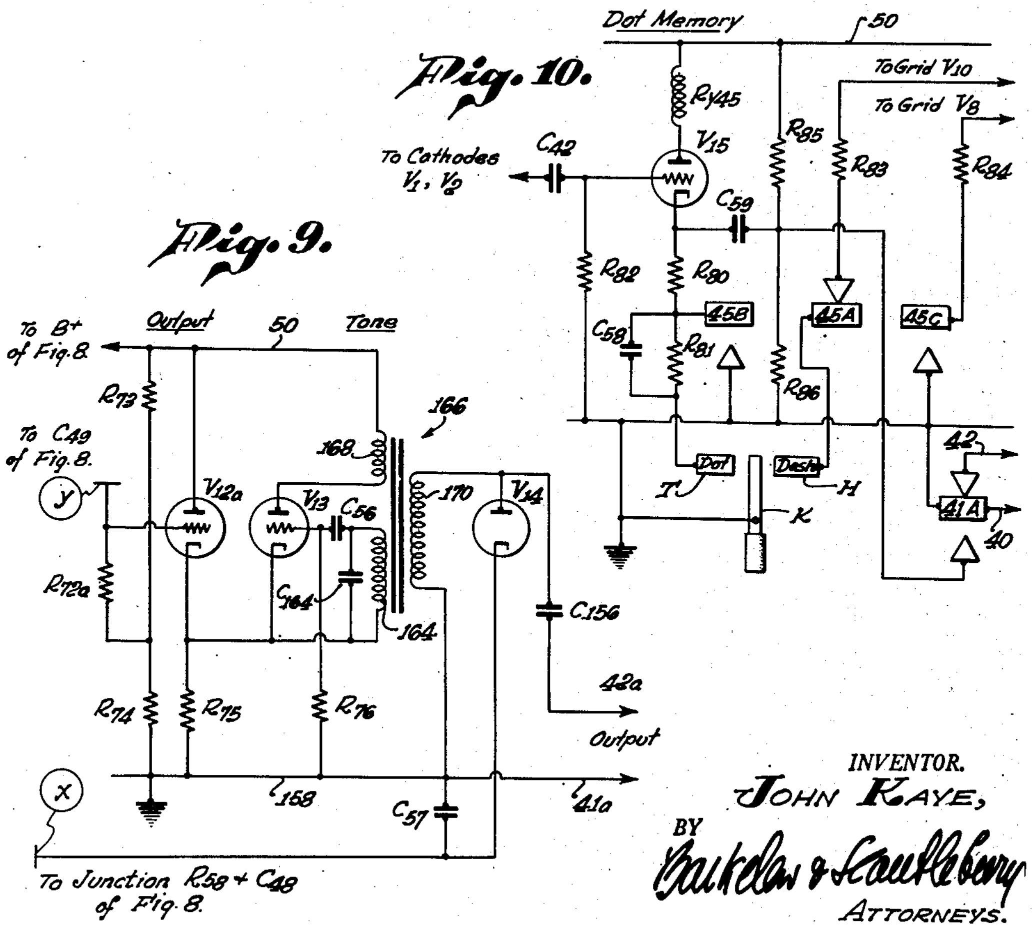
Figures 11, 12B:
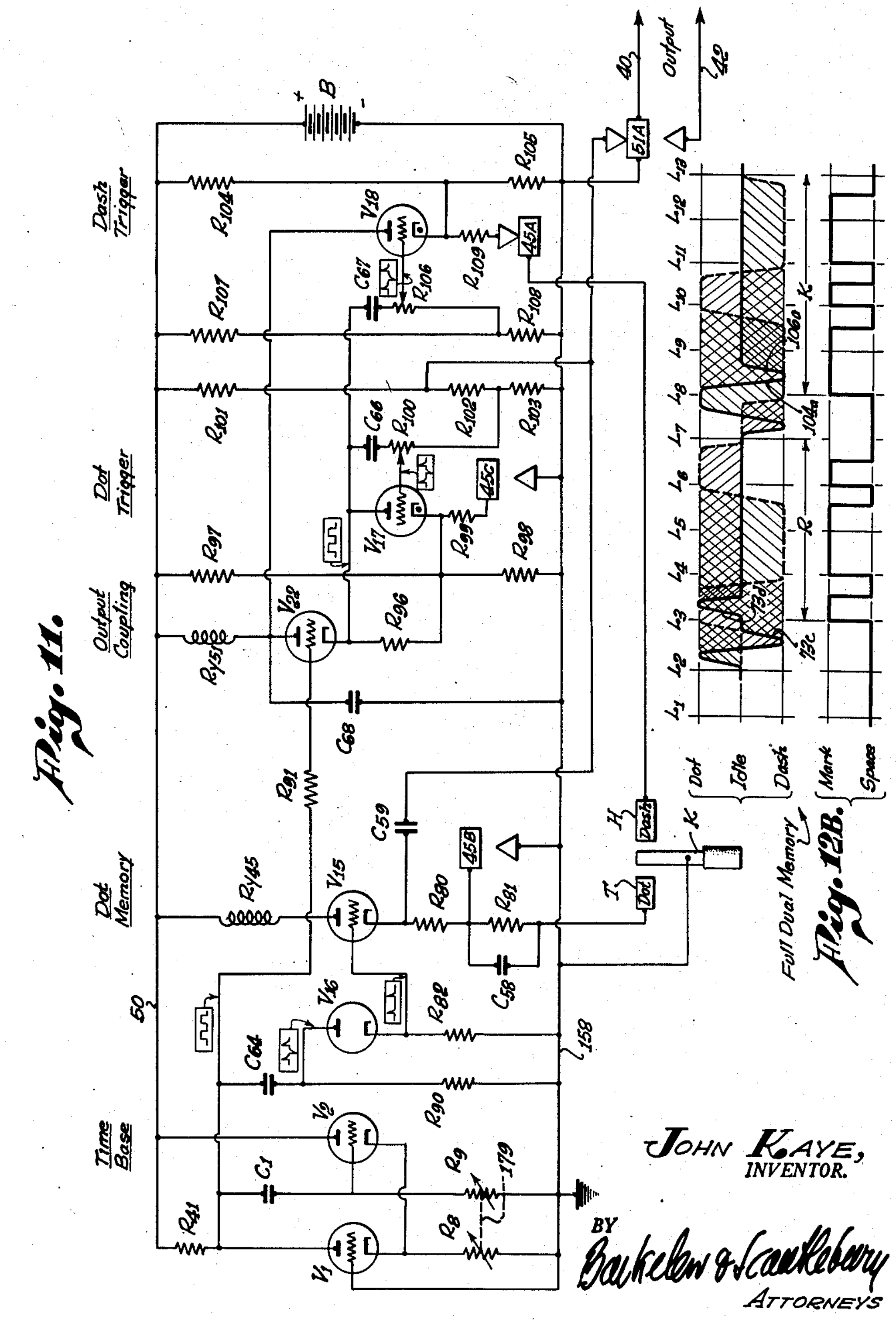
Figure 12:
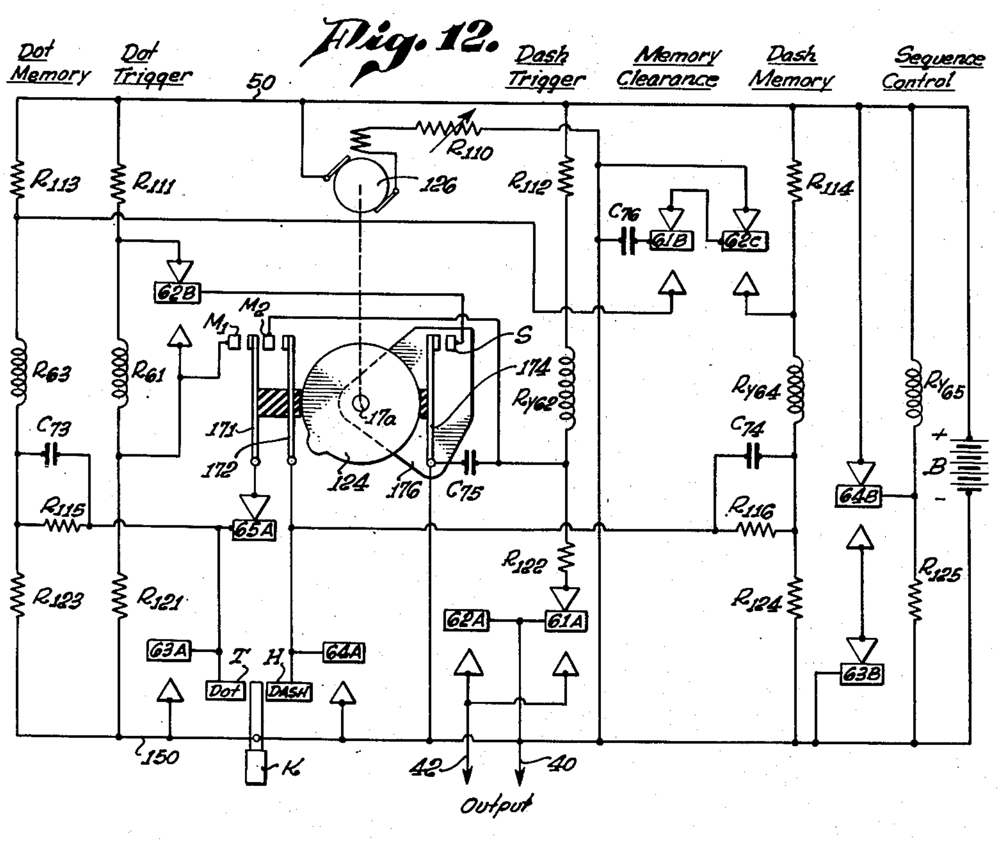
Figures 14A, 14B, 14C:
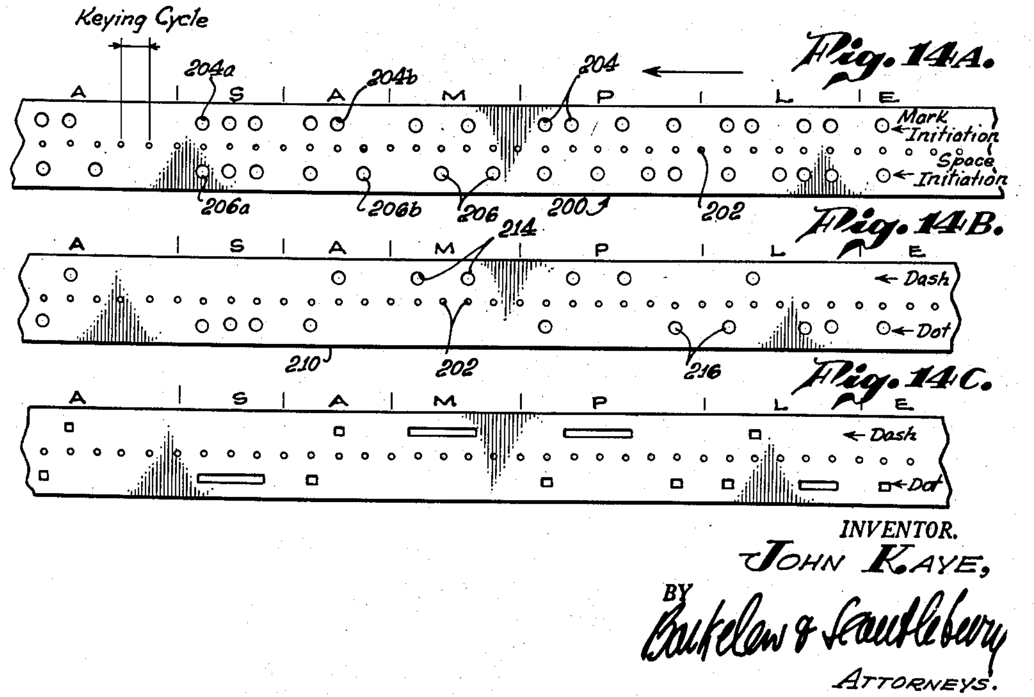
Figure 13:
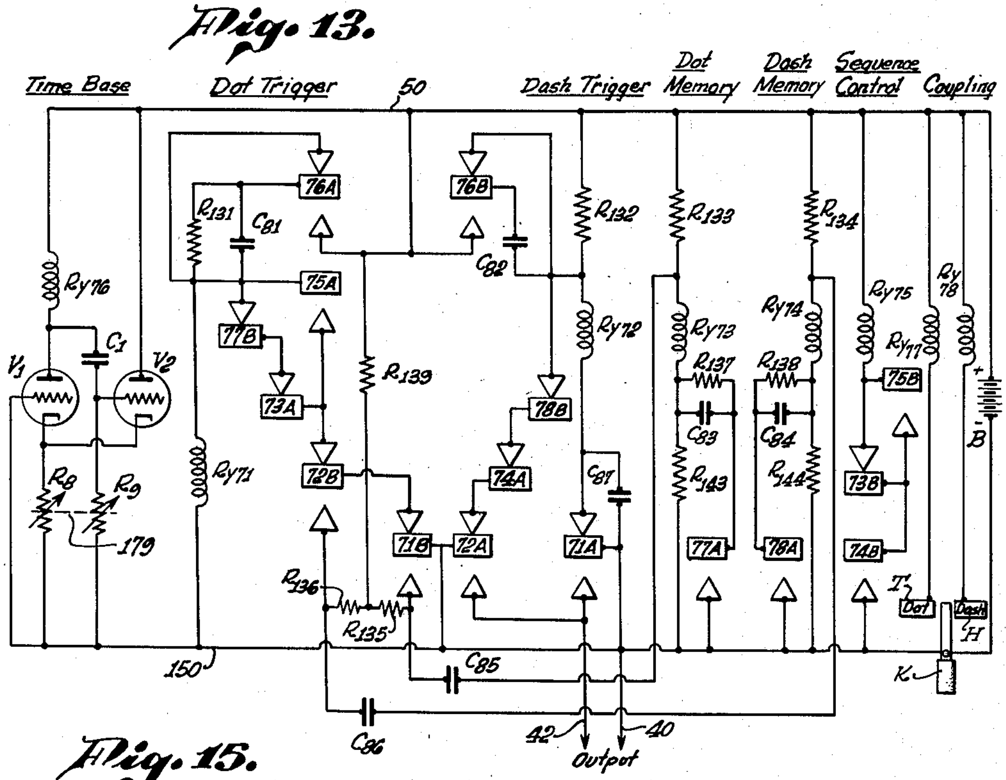
Figure 15:
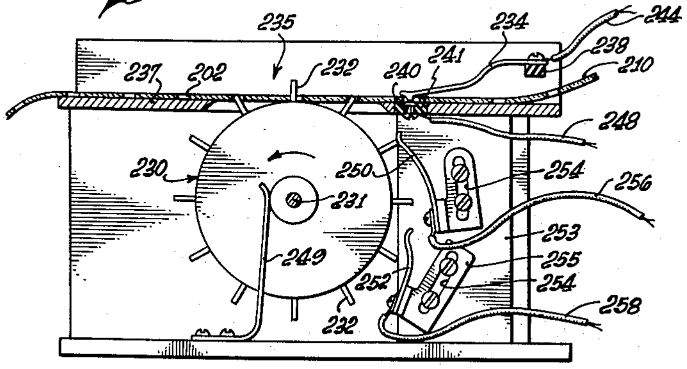
Figure 12A:
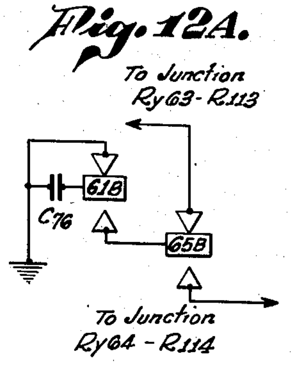
Figure 16:
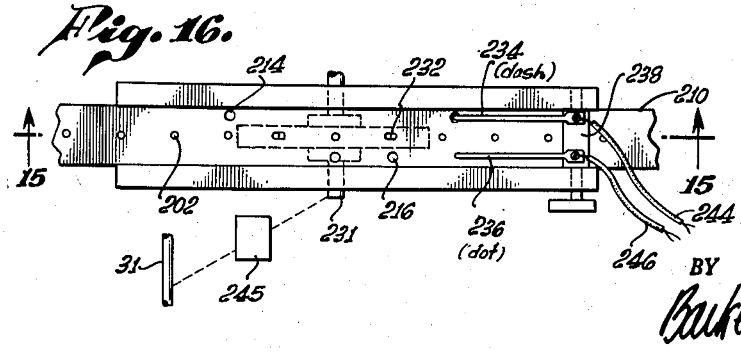
Figure 17:
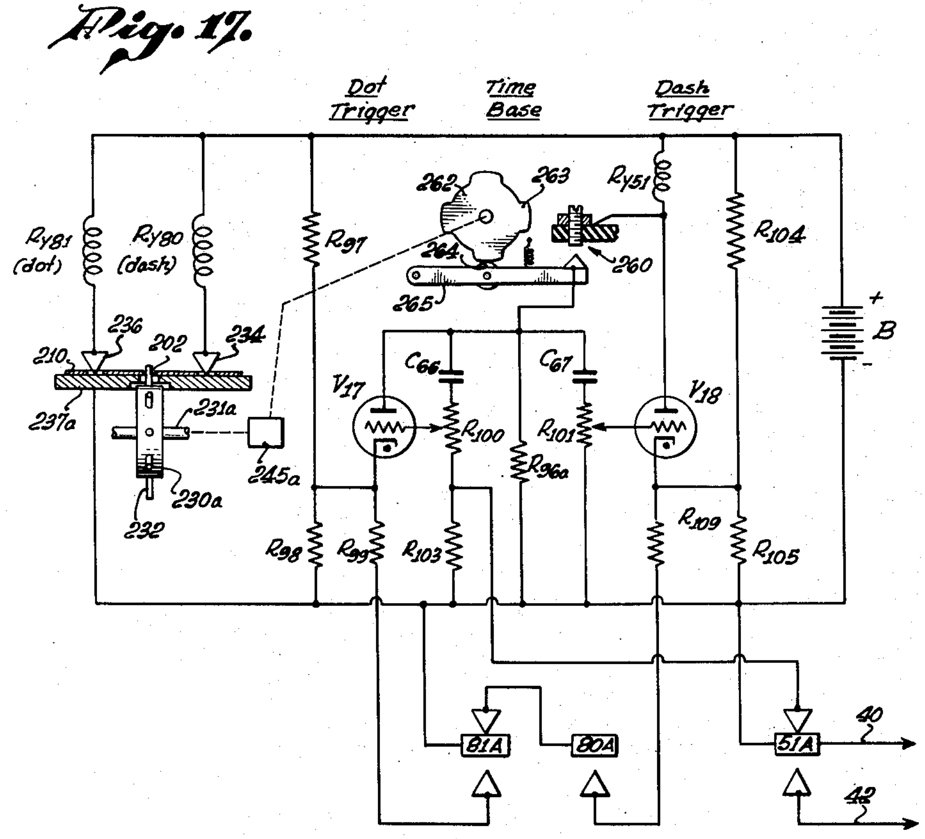
Figure 18:
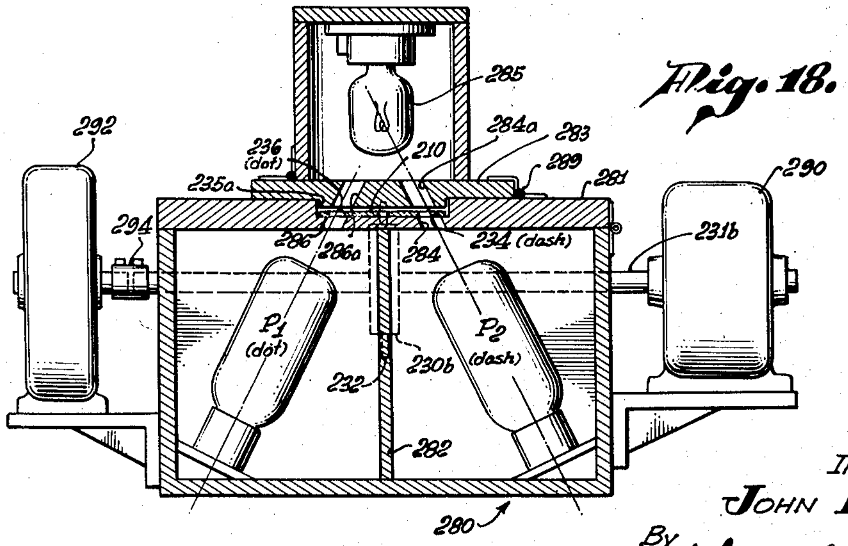
Figure 19:
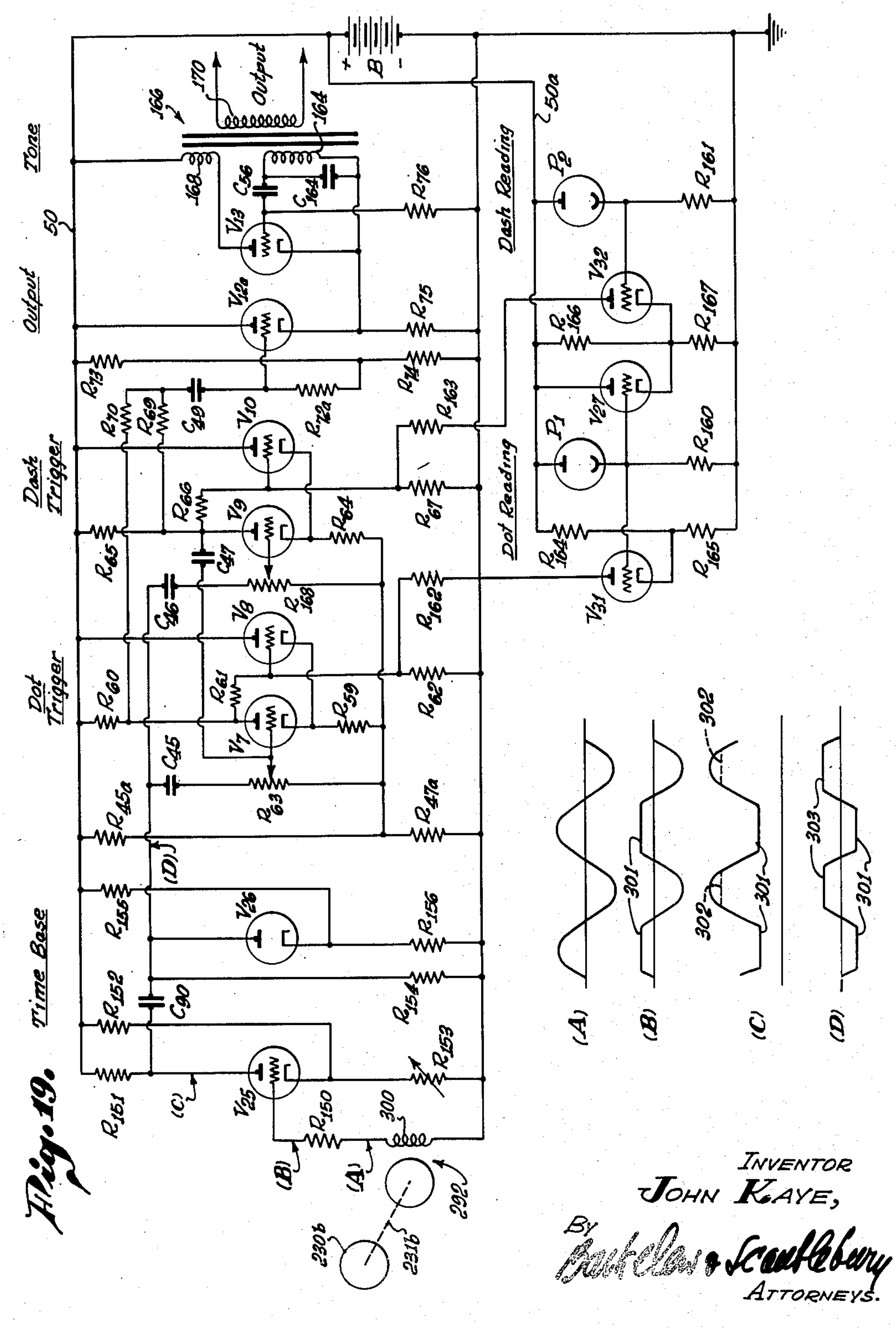
Figure 20:
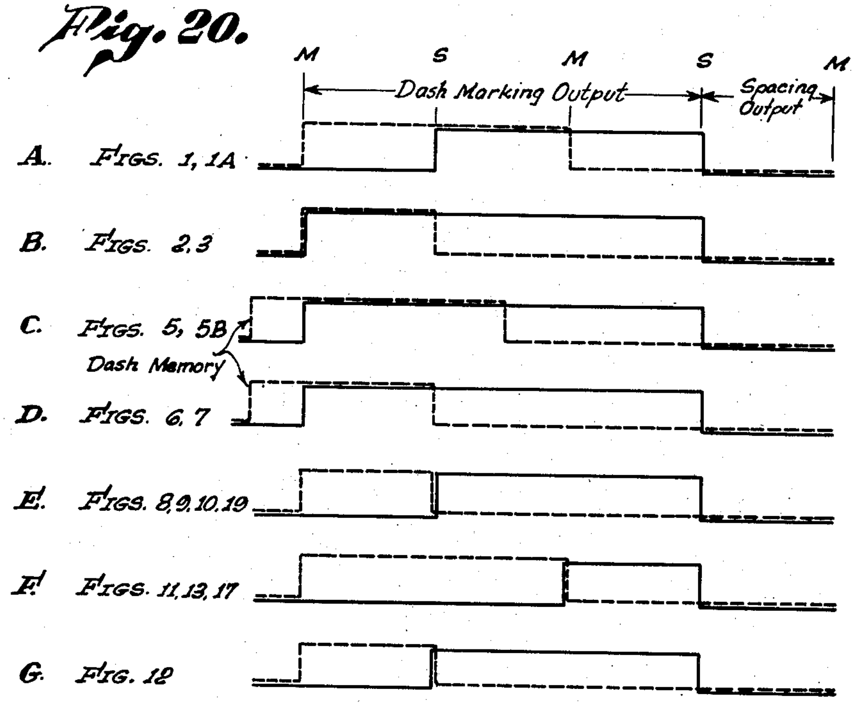

Fig. 5A corresponds to Fig. 5 and illustrates several typical distinct modifications;

Fig. 5B corresponds to Fig. 5 and illustrates a further modification;

Fig. 6 is a schematic diagram illustrating an embodiment of the invention including another type of memory function;

Fig. 7 is a schematic diagram illustrating a modification of Fig. 6, including multiple memory functions;

Fig. 8 is a schematic diagram and Fig. 8A a block diagram, illustrating a preferred embodiment of the invention;

Fig. 9 is a fragmentary schematic diagram illustrating a typical modification of Fig. 8, providing electronic action throughout;

Fig. 10 is a fragmentary schematic diagram, illustrating a further modification of Fig. 8, providing alternative memory circuitry;

Fig. 11 is a schematic diagram illustrating a typical embodiment employing gas tubes for control triggers;

Fig. 12 is a schematic diagram illustrating another embodiment, having particularly simple multiple memory functions;

Fig. 12A corresponds to a portion of Fig. 12 and illustrates a modification;

Fig. 12B is a diagram of memory action for the system of Fig. 12;

Fig. 13 is a schematic diagram illustrating an embodiment somewhat related to that of Fig. 12;

Figs. 14A, B and C are fragmentary plans illustrating respectively a conventional type of code record and two modifications in accordance with the invention;

Fig. 15 is a vertical longitudinal section of an illustrative device for reading a code record;

Fig. 16 is a plan of the device of Fig. 15;

Fig. 17 is a schematic diagram illustrating an electrical system, based on that of Fig. 11, for transmitting code from a code record;

Fig. 18 is a vertical transverse section of an illustrative alternative device for reading a code record;

Fig. 19 is a schematic diagram illustrating an electrical system, based on that of Fig. 8, for transmitting code from a code record, utilizing a code reading device such as that of Fig. 18; and Fig. 20 is a diagram illustrating the sequence of trigger actuation in dash production in accordance with various embodiments of the invention.

Figure 21:
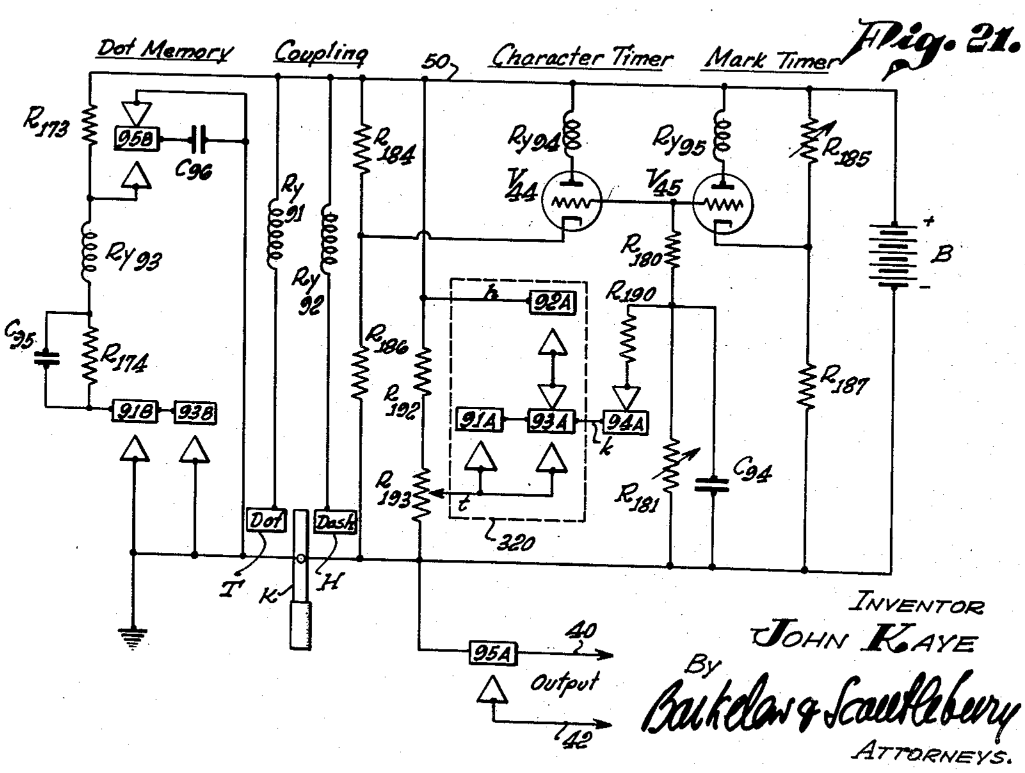
Figure 21A:
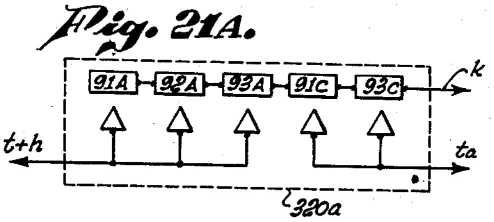
Figure 21B:
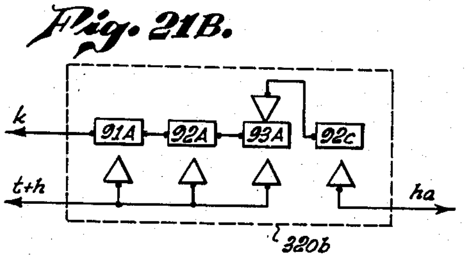
Figures 22, 22B:
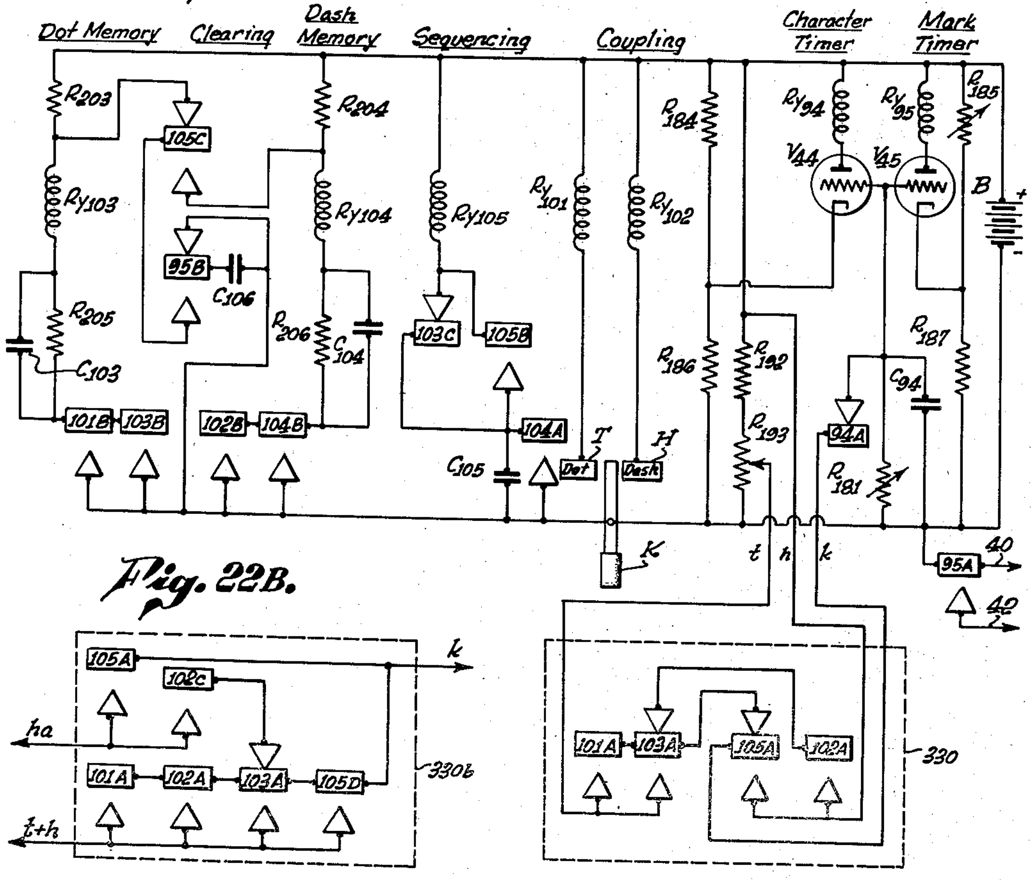
Figure 22A:
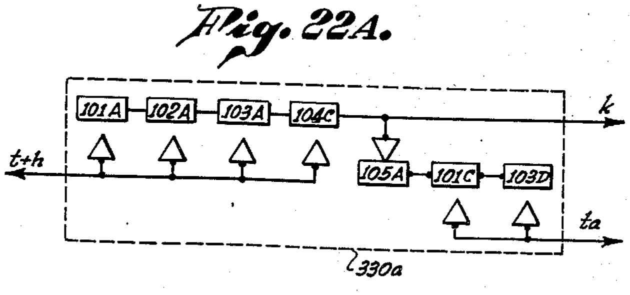

Fig. 21 is a schematic diagram illustrating an embodiment of the invention that provides memory action in combination with a typical previously known timing system;

Fig. 21A is a fragmentary schematic diagram illustrating a modification of the system of Fig. 21;

Fig. 21B is a fragmentary schematic diagram illustrating a further modification of the system of Fig. 21;

Fig. 22 is a schematic diagram illustrating an embodiment related to Fig. 21 and providing multiple memory action;

Fig. 22A is a fragmentary schematic diagram illustrating a modification of the system of Fig. 22; and Fig. 22B is a fragmentary schematic diagram illustrating a further modification of the system of Fig. 22.

In order to simplify and clarify the present description, a uniform system of terminology is used throughout. Circuit elements of certain types are denoted by sets of symbols, the first symbol of the set being a letter indicating the type of element, in accordance with the following schedule: B, battery or other source of voltage; C, capacitance; K, manual control key or lever; R, resistance; R*y*, relay winding, or relay; V, vacuum tube.

Different elements of the same type are distinguished by numerals immediately following such symbols. In closely related embodiments of the invention, directly corresponding elements are denoted, as usual, by the same symbols, and elements that correspond less closely are sometimes distinguished by appending a lower case letter to the symbol. For the sake of clarity and conciseness in referring by symbol to elements shown in the drawings, the type of element is ordinarily not explicitly repeated. Thus, R16, for example, denotes resistance 16, and R16*a* indicates a resistance employed in another modification of the invention and having a function similar to that of R16.

A numeral directly followed by a capital letter always denotes a relay switch or switch contact controlled by the relay coil corresponding to the numeral. For example, 3A and 3B indicate two electrically separate switches, both controlled by the relay Ry3. Movable contacts of relay switches are indicated in the drawings by rectangular boxes containing appropriate designations of the type just described. Cooperating fixed contacts are shown as triangles above or below the movable contacts. The convention is followed that the movable contact is always moved downward in the drawing by energization of the controlling relay coil. Thus a normally closed relay switch is indicated by showing the fixed contact (triangle) above the movable one (rectangular box); while a normally open relay switch has the triangle below. In referring to a double throw relay switch, "upper 3A," for example, refers to the normally closed pole of the switch; "lower 3A," to the normally open pole. All relay switches are shown in unactuated, or upper, position, corresponding to unenergized relay coil.

For clarity of showing, the mechanical association between each relay coil and the switch contacts that it controls, is not explicitly shown, since it is clearly indicated in the drawings by the described notation. Wherever connections to ground are indicated in the drawings, it is optional whether or not such connections be made to actual ground potential.

The term "trigger circuit" is used to denote broadly any circuit capable of two distinct conditions and shiftable abruptly from one condition to the other. The term is frequently abbreviated to "trigger," which refers to the shiftable circuit rather than to the specific triggering mechanism that controls the shift.

Figures 1, 1A:
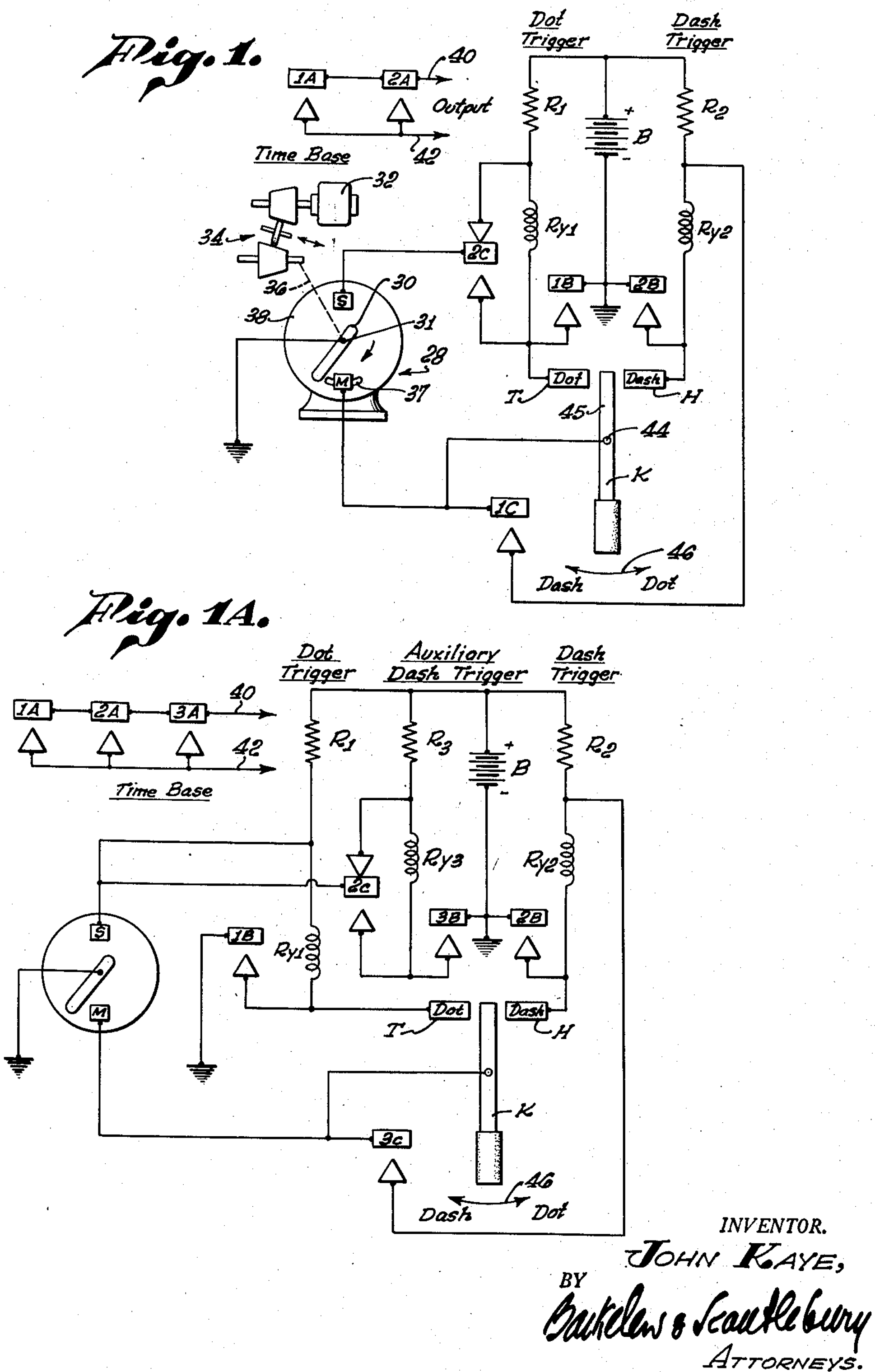
Fig. 1 is a schematic diagram illustrating a particularly simple embodiment of the invention employing electrical relays and omitting the memory function.
Fig. 1A is a similar diagram illustrating a modification of Fig. 1.

Fig. 1 is a schematic diagram showing a particularly simple and effective embodiment of certain primary features of the invention. The system as shown in Fig. 1 omits the memory function, which may, however, be added to such a system if desired.

In the system of Fig. 1 the time signals generated by the free-running time base comprise alternating and substantially instantaneous closures of two distinct circuits between ground and two timing contacts, which are designated, for reasons that will appear, as mark and space contacts M and S, respectively. Illustrative means for producing such time signals include a rotary switch 28 having a rotor 30 mounted on a shaft 31, connected to ground as by a slip ring, not shown, and driven typically by an electric motor 32 through a continuously variable speed transmission of any suitable type, indicated schematically at 34. The drive connection to the rotor is indicated by the dashed line 36. The rotating contact blade of rotor 30 sweeps alternately over mark and space contacts M and S, respectively, which are mounted approximately 180° apart with respect to the rotor axis. Contacts M and S are preferably relatively adjustable in angle about the rotor axis, as by contact M being adjustably fixed in a circumferential slot, indicated at 37, in a mounting plate 38 of insulating material. Such relative adjustment of M and S may be used to adjust the mark to space ratio of the final code output of the system.

As will appear, instantaneous connection of either contact M or S to ground via grounded rotor 30 does not necessarily produce any current flow in the system. However, the generation of a timing signal, as that term is here understood, may or may not involve actual current flow. Mere closure (or opening) of a circuit contact is one specific type of timing signal that may be employed.

A source of voltage is indicated at B as a battery with its positive terminal uppermost and its negative terminal connected directly to ground. For convenience of explanation that type of voltage source and that polarity are employed in the circuits shown herein, but it is to be understood that any polarity and any type of current and current source may be used, subject only to certain practical limitations that will be obvious.

Two parallel relay circuits are provided between the positive pole of B and ground. One circuit includes resistance R1, relay coil Ry1 and normally open (or lower) relay switch contact 1B of Ry1. The other circuit correspondingly includes R2, Ry2 and lower 2B. Relay contacts 1B and 2B act only as holding circuits for their respective relays. Relay actuating circuits are provided from the negative terminals of Ry1 and Ry2, respectively, to the control lever contacts T and H, which are also designated "dot" and "dash."

The control lever K is electrically connected directly to timing contact M, which times the start of each mark. When in idle position, as illustrated, arm 45 of lever K is spaced between contacts T and H, and, as indicated by the arrow 46, it may be swung about pivot 44 alternatively counterclockwise to close a circuit between timing contact M and dot contact T; or clockwise to similarly close a circuit between M and dash contact H. Although not shown (for simplification) suitable means, such as a spiral or other spring, may be provided to bias lever K toward the midpoint between T and H when the lever is unoperated. Those alternative operating conditions of the control lever will be referred to for convenience of description as "closed to dots" and "closed to dashes" respectively.

Timing contact S, which times the start of each interval of spacing output, is connected directly to movable contact 2C of Ry2, upper and lower 2C being connected, respectively, to the junction of R1 and Ry1, and to the junction of Ry1 and control lever dot contact T. A direct connection is provided from the junction of R2 and Ry2 to lower 1C, and thence, when Ry1 is actuated, to timing contact M and also, incidentally, to control lever K.

The illustrated output circuit means comprises the two leads 40 and 42 which are connectible via normally open, or lower, relay contacts 1A and 2A in parallel. The output leads 40 and 42, one of which may be grounded, may be connected to any suitable type of transmitting device or line capable of responding selectively to open and closed circuit conditions between the leads. As illustrated, closure of either relay switch 1A or 2A, or both, produces marking condition of the output circuit means, spacing condition being produced when both 1A and 2A are open.

Operation of the system of Fig. 1 is as follows. In idle condition of the system both relays Ry1 and Ry2 are unactuated, as shown. During code transmission, rotor 30 is driven continuously at a suitable constant speed, selected by adjustment of transmission 34. Rotor contacts M and S are thereby alternately periodically grounded, effectively instantaneously, generating timing signals by which the generated code is controlled. As will appear, the marking period of a code character can start only at a time directly determined by grounding of marking contact M, and spacing can start only at a time determined by grounding of spacing contact S. The rotor speed directly determines the keying speed, the rotor period being equal to one keying cycle, and the time between successive contacts at M and S, or at S and M, being one baud. According to the baud principle there are approximately 24 keying cycles per average word. Therefore, with motor 32 operating typically at 1750 R. P. M., and with transmission 34 set for a 1 to 1 speed ratio, the keying speed is about 73 words per minute, an ample maximum speed for manual operation.

To generate a dot, control lever K is closed to dots and held there until rotor 30 next contacts M. A circuit is thereby completed from the positive pole of B via R1, Ry1, closed dot contact T, lever K and closed timing contact M to ground. That circuit, although closed at M only momentarily, actuates Ry1. Relay actuation closes lower 1B, completing a relay holding circuit through Ry1 to ground, and holding the relay in actuated condition. Timing contact M and rotor 30 are so constructed that the circuit through M is closed only long enough to fully actuate the relay and establish its holding circuit at the highest available rotor speed. In practice that contact time is very brief, and the contact is in full effect instantaneous. As soon as the holding circuit is established through Ry1, opening of timing contact M or of the control dot contact T has no immediate effect on the system. Actuation of Ry1 closes 1A in the output circuit, thereby shifting the output to marking condition to start dot marking at a time substantially simultaneous with the timing signal at M. The simultaneous closing of lower 1C has no effect, even during grounding of M, except to draw a limited current through R2.

The output circuit remains in marking condition, regardless of any movement of K, until timing rotor 30 grounds spacing contact S. That closes a short circuit around Ry1, from its junction with R1 via closed upper 2C, timing contact S and grounded rotor 30. The holding circuit via 1B is disabled by that short circuit, and Ry1 is de-actuated. R1 limits the current through the described short circuit to a convenient value. De-actuation of Ry1 opens 1A, shifting the output circuit to spacing condition. The output has been marking for just one baud, the correct mark period for a dot.

The system automatically completes the dot by maintaining the output circuit in spacing condition for one baud after the timing signal at S. That action results, in the present embodiment, because no further relay actuation can take place until the ensuing timing signal is generated at M, just one baud later. Thus a complete dot is generated, with equal mark and space intervals.

If control lever K is held closed to the dot contact until the moment when timing rotor next contacts M (or if, having been opened, it is again in position closed to dots at that moment) a second dot will be generated in the manner just described. Continued closure of the dot contact produces a continuous series of correctly timed dots. Each dot may be said to be initiated in response to the timing signal at M by closure of the control lever to dots at the moment of that signal. The position of the control lever at any other time is immaterial. To produce an accurately timed dot, it is only necessary to close K to dots at any arbitrary time during the preceding keying cycle and to hold it there until generation of a timing signal at M. The control key may then be opened immediately (in order to key a dash, for example) and the dot that has been initiated will be completed automatically.

To produce a dash, control lever K is closed to dash contact H and held until the next timing signal at M. A relay actuating circuit to ground is then completed from the positive pole of battery B via R2, Ry2, closed dash contact H, control lever K, closed timing contact M and grounded rotor 30. Ry2 is thereby actuated, closing lower 2B to establish a relay holding circuit to ground. Simultaneous closure of lower 2A shifts the output circuit to marking condition, starting the dash. At the same time, lower 2C is closed, completing a circuit from timing contact S to the junction of Ry1 and dot contact T. Therefore, when rotor 30 next grounds contact S, one baud after the start of the dash, a relay actuating circuit is momentarily completed from the positive pole of B via R1, Ry1, closed lower 2C, and grounded contact S. (The circuit by which grounding of contact S terminates dot marking by de-actuating Ry1 is open at upper 2C.) The resulting actuation of Ry1 is maintained, as described for dot production, by the holding circuit through lower 1B. The resulting closure of lower 1A in the output circuit has no immediate effect, since 2A is already closed. Marking output is merely continued.

That actuation of Ry1 also closes lower 1C, completing a circuit from the junction of R2 and Ry2 to timing contact M. Therefore, when rotor 30 next grounds M, two bauds after the start of the dash, Ry2 is short circuited and de-actuated. However, the resulting opening of 2A in the output circuit does not terminate marking, since 1A remains closed by continued actuation of Ry1. But de-actuation of Ry2 restores the circuit via upper 2C from S to the junction of R1 and Ry1. When rotor 30 next grounds S, three bauds after the start of the dash, the holding circuit through Ry1 is shorted out via upper 2C, de-actuating Ry1. Contact 1A in the output circuit is thereby opened, restoring spacing condition after three bauds of continuous marking, the correct marking period for a dash. (See Fig. 20 (A), described below in connection with Fig. 2.) Since the output circuit cannot again be shifted to marking until actuation of one of the relays is made possible by the next timing signal at M, a spacing period of one baud is generated, completing the dash.

As in dot production, the position of the control lever during the progress of a dash is immaterial. Once the dash is started by actuation of Ry2 in response to one timing signal at M, the control lever is entirely ineffective to alter the output until completion of the dash at the second following timing signal at M. During the momentary grounding of M at the midpoint of the dash, closure of the control lever to dots is ineffective, since Ry1 is already actuated; and its closure to dashes is ineffective to prevent the described de-actuation of Ry2, since it merely duplicates the holding circuit via 2B. The short circuit via lower 1C effectively reduces the junction of R1 and Ry1 to ground potential and dominates any circuit that can be completed through Ry2. During the second and third bauds of a dash, while Ry1 is actuated, an incidental circuit is completed from control lever K via closed lower 1C to the junction of R2 and Ry2. During the second baud of a dash, while both relays are actuated, closure of the control lever to either the dot or the dash contact (which contacts are grounded through the respective relay holding contacts 1B and 2B) completes a short circuit around Ry2, de-actuating Ry2. However, that action merely anticipates the described de-actuation that would otherwise occur from the grounding of M at the end of that baud, and does not affect the output of the system.

The general statement can be made that once a dot or a dash has been started, no movement of the control lever can interfere with correct completion of the character. Furthermore, successive characters, whether of like or unlike kind, are correctly timed with respect to each other. To produce a correctly timed following character it is only necessary to have the control lever in the appropriate position at the moment that the preceding character is concluded. Furthermore, following the last character of a letter, an inter-letter space of exactly two bauds is produced merely by having the control lever in idle position at the conclusion of the letter (preventing the start of an immediately following character), and then closing it to the appropriate side, to initiate the first character of the following letter, at any time during the entire following keying cycle. The next character will then start, in response to a timing signal at M, just two bauds after the conclusion of the preceding character. Inter-word spaces of two full keying cycles are similarly controlled. The key is merely held in idle position, after completion of a word, for any convenient time period that is more than one keying cycle and less than two. By that procedure, the timing signal at M that occurs one keying cycle after completion of the last character of the preceding word produces no change in the system, but the next following timing signal at M starts the first character of the next word. In similar manner, a space may be produced having a length precisely equal to any desired integral multiple of one keying cycle, such, for example, as three cycle spacing to correspond with the standards established for automatic tape transmission and syphon recording at the receiving end for later visual translation to script or typed copy. The operator thus has the very generous flexibility of one full keying cycle in the time at which he must close the key to initiate a character, a letter or a word; and yet the output circuit is shifted to marking condition in accurately timed relation to the preceding character, letter or word.

An important feature of the invention, as embodied in the system of Fig. 1, is the use of two trigger circuits that are capable of being selectively tripped. One trigger circuit, here referred to as the dot trigger, comprises Ry1 and its associated circuitry. The dot trigger is normally in idle condition with the relay unactuated. It may be tripped to relay-actuated condition by simultaneous closure of T and M to produce a dot, and also by simultaneous closure of lower 2C and S to complete production of a dash; and is always cleared via upper 2C and S to end marking. The other trigger circuit, here referred to as the dash trigger, comprises Ry2 and its associated circuitry. It is tripped to produce a dash by simultaneous closure of H and M, and is cleared via lower 1c and M.

The dual use of the dot trigger, which is preferably employed both in dot and in dash production, promotes economy and simplicity. However, it is emphasized that the invention, while permitting such dual function with its inherent advantages, is not at all dependent upon such dual use of the dot trigger. For example, as illustrated in Fig. 1A, dot trigger Ry1 may be utilized only for dot production, while an auxiliary dash trigger is provided for dash completion. Ry1 of Fig. 1A is connected as in Fig. 1, except that its clearing circuit omits relay switch upper 2C and there is no actuating circuit via lower 2C. Ry3 in Fig. 1A is connected like Ry1 in Fig. 1 except that it has no actuating circuit via dot contact T. The clearing circuit for dash trigger Ry2 is under control (at 3C) of Ry3 in Fig. 1A, rather than of Ry1, as in Fig. 1. Operation of the system of Fig. 1A will be obvious from the circuit and from the described operation of Fig. 1.

In other embodiments to be described, the dual function of the dot trigger can be similarly dispensed with without departing from the spirit of the present invention. In the claims, for clarity of expression, the dot control circuitry and the dash control circuitry may be spoken of as separate elements of the claimed combination without intending any limitation as to whether or not those circuitries have components in common.

Figures 2, 3:
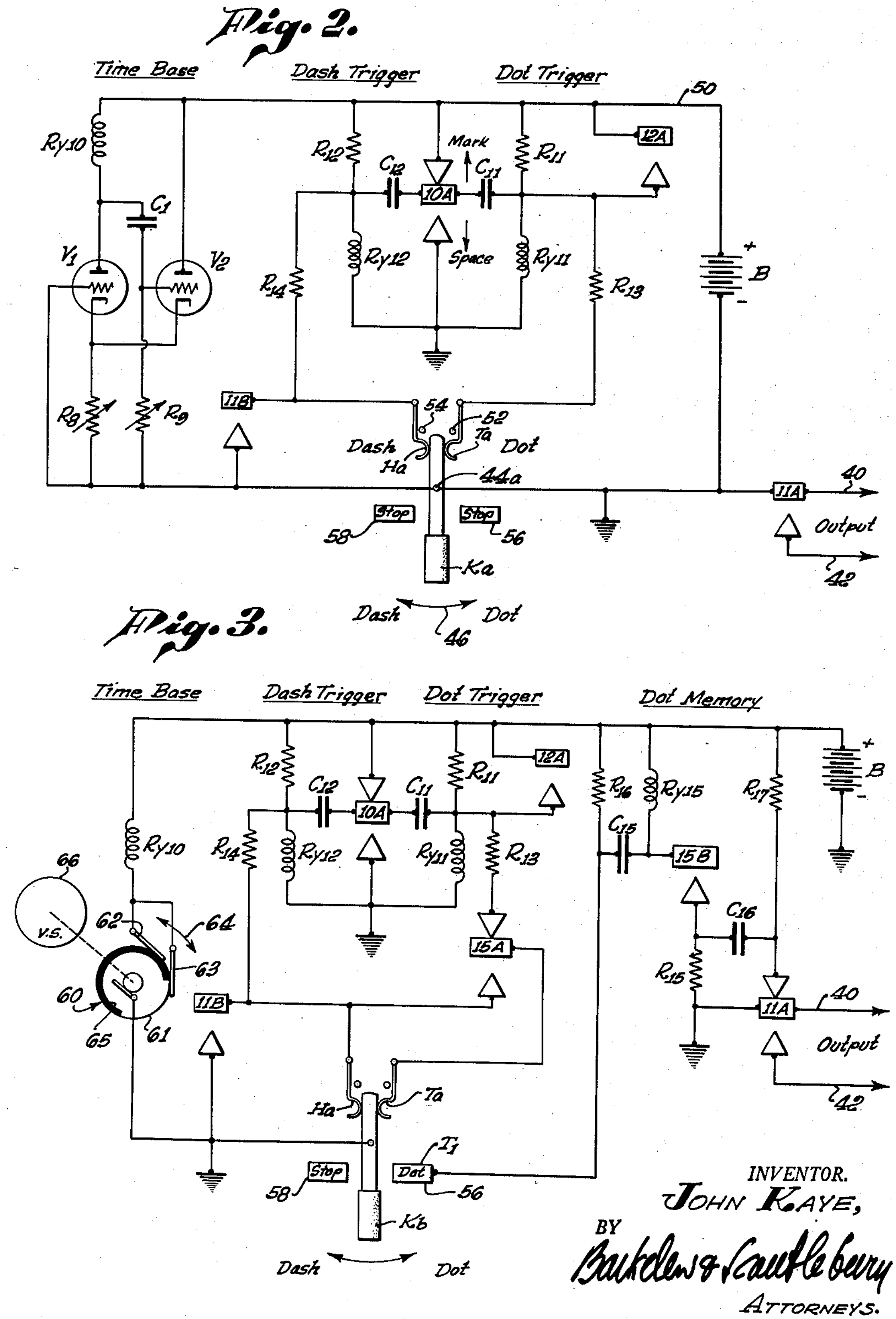
Fig. 2 is a schematic diagram illustrating another embodiment of the invention.
Fig. 3 is a schematic diagram illustrating a modification of Fig. 2, including a type of memory function.

Fig. 2 shows in schematic form another illustrative embodiment of the invention, providing functions in many respects equivalent to those already described in connection with Fig. 1, but in a somewhat different manner. A typical power source is again represented for definiteness as a battery B with its negative pole grounded and its positive pole connected to a power bus 50.

In the system of Fig. 2, the timing signals are generated by a free-running oscillator of multivibrator type comprising control grid electronic tubes V1 and V2, which are shown illustratively as separate triodes but may, of course, be enclosed in one envelope, and may be multi-grid tubes, such, for example, as pentodes, or may be gas type tubes, connected, for example, in the familiar plate to plate capacity coupled relaxation oscillator circuit. The multivibrator is here employed to alternately actuate and deactuate relay Ry10, and is representative of the many available devices for generating a periodic square wave suitable for that purpose. The cathodes of both tubes are connected to ground through common cathode resistor R8, which is variable. The plate of V2 is connected directly to bus 50, and that of V1 is connected to bus 50 through relay coil Ry10, which acts as a plate resistor. The grid of V1 is directly grounded, and that of V2 is connected to ground via variable resistor R9 and to the plate of V1 via condenser C1. The value of R8 is within the range for which the grid of V1 is biased to cutoff by the voltage drop in R8 when V2 is conducting; but for which, when V2 is not conducting, the voltage drop in R8 due to current through V1 and Ry10 in series gives tube V1 merely an operating bias, less than cut-off.

As the tube V1 becomes conducting, a negative pulse is generated at its plate, due to increasing voltage drop in Ry10, and is transmitted via C1 to the grid of V2, sharply cutting off V2. C1 charges relatively slowly through R9, reducing the effective negative bias on V2 until that tube begins again to conduct. The additional voltage drop in R8, caused by incidence of current in V2, raises the potential of both cathodes, producing increased negative bias on V1 and abruptly reducing its current. A positive pulse is thereby transmitted from the plate of V1 through C1 to the grid of V2 more than compensating the raised cathode potential of V2, and sharply accelerating the current increase in V2. The described effect is cumulative until V1 is completely cut off and V2 is strongly conducting. C1 again charges gradually through R9, lowering the grid of V2 and thereby reducing the current through that tube and the voltage drop across R8, until V1 again starts to conduct. That lowers the plate of V1, transmitting a negative pulse via C1 to the grid of V2 and sharply accelerating the transfer of conduction from V2 back to V1, as already described. This oscillation of conduction between V1 and V2 continues as long as the circuit parameters are suitable for maintaining the described potential and pulse relations.

During periods of conduction in V1, current is drawn through *Ry*10, actuating the relay. When V1 is cut off, the relay is de-actuated. The period of the oscillation depends primarily upon the product of C1 and R9, and is conveniently controllable by variation of R9, larger values of R9 giving a longer period of oscillation. That effect is employed to control the keying speed of the system. As will appear, one full cycle of oscillation of multivibrator V1, V2 corresponds to one keying cycle or two bauds.

Increase of R8 increases the negative bias on the grid of V1, tending to delay the start of conduction in V1, and thereby to reduce the fraction of the oscillation period during which V1 conducts. (Increase of R8 similarly tends to delay the start of conduction in V2, but that effect is much less than the effect on V1, since, with V2 cut off, current through R8 is limited by *Ry*10.) Thus variation of R8 provides convenient adjustment of the ratio between the actuated and de-actuated periods of *Ry*10. That effect of variation of R8 may be employed to control the mark to space ratio in the final code output of the system.

The single movable contact 10A of *Ry*10, is connected to one side of each of two condensers, C11 and C12, and is shifted periodically, in response to the described periodic actuation of the relay, between upper and lower contacts 10A, which are connected respectively to battery bus 50 and to ground. Current flows continuously from bus 50 to ground through two parallel circuits, one of which includes R11 and *Ry*11, and the other R12 and *Ry*12.

Control lever *Ka*, which is permanently grounded, is swingable about a pivot 44*a* from idle position (illustrated in Fig. 2) alternatively counterclockwise to dot position and clockwise to dash position, as indicated by the arrow 46. Those positions are preferably definitely defined, as by fixed stops 56 and 58, respectively. The spring dot and dash contacts *Ta* and *Ha*, respectively, yieldingly engage opposite sides of one arm of lever *Ka* in its normal position, but are limited in their movements toward the arm by the stops 52 and 54, respectively, so that when *Ka* swings to dot position dot contact *Ta* is lifted by its stop out of lever contact, and when *Ka* swings to dash position dash contact *Ha* similarly is disconnected from the lever.

The junction of R11 and *Ry*11 is connected to the other side of C11 and also via R13 to the control lever dot contact *Ta*, which is grounded through the control lever when the latter is at idle or at dash-signalling position. The junction of R12 and *Ry*12 is similarly connected via R14 to control lever dash contact *Ha*, which is grounded when the lever is in idle or dot-signalling position.

Normally open relay switch 11B is connected between ground and the junction of R14 and dash contact *Ha*, providing a direct connection in parallel with that contact whenever *Ry*11 is actuated. Normally open relay switch 12A provides a direct connection, when *Ry*12 is actuated, between bus 50 and the junction of R11, *Ry*13, short circuiting R11. The output circuit is controllable entirely by *Ry*11 through the single switch 11A, relay actuation corresponding to marking output. As illustrated in Fig. 2, output leads 40 and 42 are connected via lower 11A for marking upon actuation of *Ry*11, and are disconnected for spacing upon relay de-actuation. The connection between output relay switch armature 11A and ground is optional. The output circuit may be grounded as shown in Fig. 2 or floating as shown in Fig. 1.

Each of the relays *Ry*11 and *Ry*12 is adjusted to have a relatively large ratio between the current at which it will just become actuated and the current at which it will just become deactuated. The various components and the battery voltage are adjusted so that with R13 shunting Ry11 the current through *Ry*11 is held by R11 approximately half way between relay actuating and deactuating values. Current through *Ry*12 is held at a similarly median value by R12 when R14 is in parallel with the relay.

As *Ry*10 is periodically alternately actuated and de-actuated, C11 and C12 are periodically connected, upon relay de-actuation, in shunt via upper 10A across R11 and R12, respectively; and, upon relay actuation, via lower 10A across *Ry*11 and *Ry*12, respectively; tending to short out those pairs of elements momentarily at the instant of completion of the respective connections. That tendency is increased by the fact that at the instant of application across a resistance or relay, each condenser is charged oppositely to the voltage drop standing in that element. The shorting effect, however, is very short-lived, since the condenser is quickly discharged and recharged to the equilibrium potential of its new connection.

The values of C11, C12, R11 and R12 are so selected, with relation to other components of the system, that *Ry*11 and *Ry*12, if actuated, are always de-actuated by closure of lower 10A, regardless of whether or not the relays are shunted by R13 and R14, respectively (that is, regardless of the position of switch 11B and of control lever *Ka*); and that *Ry*11 and *Ry*12, if deactuated, are actuated by closure of upper 10A only in absence of the respective shunting resistors R13 and R14. If those resistors are in the circuit at the moment of closure of upper 10A, the relays remain unactuated. And, because of the described relatively rapid discharge of condensers C11 and C12, the relays do not respond to a late signal from the control lever. If one of the shunting circuits should be opened at *Ka* even a fraction of a millisecond after closure of upper 10A, the condensers are already so nearly discharged that the relays remain unactuated.

The following component values have been found to meet the requirements already described for a system of the type shown in Fig. 2, and are given as an illustration and not as a limitation upon the system.

| | |
|---|---|
| Voltage source B | 175 volts D. C. |
| Ry11 and Ry12 | 7000 ohms |
| R11 and R12 | 14,000 ohms |
| R13 and R14 | 7000 ohms |
| C11 and C12 | 1 to 2 microfarads |

With those values, Ry11 and Ry12 are so adjusted that they require 12 to 15 milliamperes of current for actuation, and that they become de-actuated only if the current drops below about 4 milliamperes. The circuit provides steady relay current of about 5 milliamperes through each relay with its shunting resistor in circuit and about 8.3 milliamperes with the shunt open. The latter figure permits relay actuation on condenser charging current upon closure of upper 10A, while the former figure does not provide sustained actuation, although the relay armature may move somewhat against its spring. Either steady relay current is normally sufficient for holding (once actuation is established) but is insufficient to maintain actuation against closure of lower 10A.

With the circuit parameters selected as described, operation of the system is as follows. With Ry11 and Ry12 de-actuated and control lever Ka in idle position, the continuing timing action of Ry10 shifts 10A periodically between upper and lower positions, alternately charging and discharging C11 and C12, but leaving the relays unactuated. Closure of Ka to dots opens dot contact Ta and increases the steady current through Ry11 by removing its shunt R13. The next following closure of upper 10A actuates Ry11, for the reasons already described, and the steady current through R11 and Ry11 maintains actuation of Ry11 even if R13 is immediately thereafter returned to the circuit by movement of Ka away from dot position. Actuation of Ry11 closes lower 11A, shifting the output circuit to marking to start a dot. (The simultaneous closure of lower 11B merely parallels the circuit through Ha, shunting Ry12, and has no practical effect during dot production.) The next following closure of lower 10A, one baud later, de-actuates Ry11, opening lower 11A and restoring the output circuit to spacing condition. The marking period is thus accurately equal to one baud, regardless of any movement of the control lever after marking has started. Moreover, the output circuit cannot again be shifted to marking until the next closure of upper 10A, assuring completion of the dot with a correctly timed space. Continued closure of Ka to dots results in continued generation of correctly spaced dots, each marking period starting at a closure of upper 10A and ending at the next following closure of lower 10A.

Closure of control lever Ka to dashes opens dash contact Ha, removing shunt R14 from Ry12 and causing that relay to be actuated by C12 upon the next closure of upper 10A. Lower 12A is immediately closed, applying the full battery voltage across Ry11 for quick operation of that relay, even though shunted, which closes 11A, shifting the output circuit to marking to start a dash. The necessity of operating two relays in succession to start a dash can be avoided, if desired, by adding to the circuit of Fig. 2 an additional switch contact controlled by Ry12 and wired in parallel with 11A in the output circuit (compare Fig. 1). However, such an additional contact can be dispensed with without appreciably affecting the relative starting time of dots and dashes by employing at 12A a following spring contact that closes after only approximately 10 percent of full armature travel on actuation, and maintains contact for approximately 90 percent of full armature travel on de-actuation. The very slight delay in closing that type of contact at 12A can be substantially made up by the fact that Ry11 is actuated more rapidly after closure of 12A (as for dashes) than after closure of upper 10A (as for dots).

At the first closure of lower 10A following the start of a dash, Ry12 is deactuated, opening 12A. However, Ry11 cannot be deactuated so long as 12A is closed; and, following closure of lower 10A and before the opening of 12A, C11 is sufficiently fully charged by the battery potential via 12A, that it is ineffective to deactuate Ry11 after 12A opens. That is particularly true if 12A is of the following spring type already described. Accordingly, Ry11 remains actuated on current through R11, maintaining the output circuit in marking condition. Marking continues until the next following closure of lower 10A, when Ry11 is deactuated via C11 (12A being then open), opening 11A after three bauds of marking. One baud of spacing is then assured, since neither relay can be actuated again until the next following closure of upper 10A. A following dot or dash is produced in correct timed relation to the completed dash merely by holding control lever Ka in the appropriate position at the moment of that closure of upper 10A.

As in the system of Fig. 1, the control lever is effectively disabled during marking output. Opening of dot contact Ta can have no effect, since Ry11 is then already actuated; and opening of dash contact Ha does not remove shunt R14 from Ry12 because the shunt circuit is completed through closure of lower 11B. Hence the closure of upper 10A that occurs in the middle of a dash cannot disturb the system by reactuating Ry12, regardless of the control lever position. On the other hand, 11B cannot close in time to prevent the described actuation of Ry12 at the start of a dash, since (even with the described structure of 12A) the armature of Ry12 has already received its primary actuating impulse from C12 before 12A closes to actuate Ry11.

In the modification just described, the timing signals that control the code output may be considered to comprise the periodic circuit closures at upper and lower contacts 10A. Although those circuits, once completed, are maintained for substantially one baud, they can be effective for controlling the system (by altering the condition of actuation of Ry11 or Ry12) only immediately after closure. Hence the timing signals are effectively instantaneous in the sense already discussed.

It will be seen that the entire switching means 10A together with Ry10 and multivibrator V1, V2, may be replaced by a single rotary switch such as 28 of Fig. 1. For example, continuously driven rotor 30 may be connected to the junction of C10 and C11, timing contact M to bus 50, and timing contact S to ground. So long as the electrical connections at M and S are maintained long enough to permit relay actuation, the remainder of the system of Fig. 2 will operate in the manner already described. However, if such a rotary switch is employed with the system of Fig. 2, contacts M and S need not be sharply limited in angular extent, as is desirable in Fig. 1, since the described condenser action will make the contact closure effectively instantaneous.

Alternatively, the timing signals in the system as shown in Fig. 2 may be considered to comprise the periodic shifts of conduction back and forth between V1 and V2. The alternating conduction and non-conduction through V1, for example, are in many respects equivalent to alternate opening and closing of a switch such as a commutator switch. Any suitable type of periodically actuated switch may, indeed, be substituted for the multivibrator as a means of driving Ry10. Such a switch is shown illustratively at 60 in Fig. 3, incorporated in a system similar to that of Fig. 2 (see below). A grounded commutator 61 is continuously driven as by variable speed motor 66, and has an insulating sector 65 extending through an angle somewhat greater than 180°. Two brushes 62 and 63 are connected in parallel to one side of Ry10 and engage the commutator, at least one brush being adjustable about the communtator axis, as indicated by arrow 64, to vary their angular separation which is approximately equal to the angle by which insulating sector 65 exceeds 180°. That structure is illustrative of the many possible types of periodically operated switch providing a variable ratio of open-circuit and closed-circuit periods. The switch action at 60 in Fig. 3 is in many respects equivalent to that provided by the multivibrator of Fig. 2.

If the switching action of tube V1 (or equivalent) in Fig. 2 is considered to constitute the series of timing signals for the system, then Ry10, its contacts at upper and lower 10A, and the action of condensers C11 and C12 may be considered collectively as means for rendering the timing signals (which are intrinsically of a continuing nature) effectively instantaneous in their action upon the rest of the system. Whatever the viewpoint, the system has, like that of Fig. 1, the important advantage that marking output can begin only at a time directly determined by one type of effectively instantaneous periodic timing signal; and can end only in direct response to another type of such signal.

Ry11 may be considered as part of a dot trigger circuit which is tripped by C11 action upon closure of upper 10A provided Ta is open. Opening of Ta acts to sensitize the dot trigger, which can then be tripped in response to a timing signal at upper 10A, and which is cleared in response to a timing signal at lower 10A. Correspondingly, Ry12 may be considered part of a dash trigger circuit that is sensitized by opening of Ha (provided 11B remains open). When so sensitized, the dash trigger is tripped in response to a timing signal at upper 10A, and is cleared only one baud later by closure of lower 10A. Further typical alternative types of trigger circuits, sensitizable under selective control, and trippable in response to a timing signal when sensitized, will be described.

As in the system of Fig. 1, the dot triggeer plays a dual role, controlling dot marking and completing dash marking. In fact, in Fig. 2 the dot trigger not only completes dash marking, but (in the system as shown) controls directly its entire duration. That distinction, however, is not fundamental, since it is removed by providing an additional output switch in parallel with 11A and controlled directly by Ry12, as mentioned above. Moreover, as already indicated, an auxiliary dash trigger may be provided to operate the output circuit under control of the primary dash trigger, thus relieving the dot trigger of that function.

An alternative view of the functioning of Fig. 2 considers Ry11 as a marking trigger, which directly controls both dot and dash marking; and considers Ry12 as a selector circuit, determining by its condition whether the character produced is to be a dot or a dash. That selection is here accomplished by closure of 12A, which disables the normal clearing of Ry11 so long as Ry12 remains actuated. As will appear, other modifications to be described are describable as to their functions from more than one viewpoint.

The distinction between the systems of Figs. 1 (or 1A) and 2 in their detailed manner of dash production is shown schematically in Fig. 20. Vertical lines in that figure denote the times at which successive timing signals of types M and S occur during the course of a typical dash. The generally horizontal solid and dashed lines indicate the respective conditions of the dot and dash triggers of the various illustrative embodiments of the invention, identified by figure numbers at the left of Fig. 20. Upper position of the line indicates actuated or tripped condition of the corresponding trigger circuit; and lowered position indicates idle or cleared trigger condition.

Fig. 20 summarizes clearly the fact that in the system of Fig. 1 (or 1A) dash marking is started by the dash trigger, joined after the first baud by the dot trigger (or by the auxiliary dash trigger). At the start of the third baud of marking the dash trigger is cleared, and the dot trigger alone continues marking until cleared at the end of the third baud. On the other hand, in the system of Fig. 2 (or 3, see below), actuation of the dash trigger immediately causes tripping of the dot trigger, the latter remaining actuated throughout the marking period of the dash. The dash trigger remains tripped only long enough to prevent normal clearing of the dot trigger at the end of the first baud; and is then cleared, restoring the normal clearing circuit of the dot trigger.

Fig. 3 illustrates a code keying system based on that of Fig. 2, but including the important additional feature herein referred to as "dot memory." The primary function of dot memory is to give the operator even greater freedom in keying lever manipulations than that already described in connection with the systems of Figs. 1 and 2. In those systems, when keying a dash followed by a dot, as in the letters N, D, G, etc., the control lever is held in dash position until the dash actually starts, and two full keying cycles are then available in which to transfer the lever to the dot position to generate the following dot with correct timing. That lever transfer from dashes to dots may take place at any time within two keying cycles without affecting the accuracy of the code output. (See Fig. 4, described below.)

However, in keying a dot followed by a dash, as in the letters A, J, K, etc., only one keying cycle is available, after start of the dot, in which to transfer the control lever to dashes. If that transfer is started before the actual beginning of the dot, the dot will be omitted; and if the transfer is not completed before completion of the dot, one keying cycle later, the dash will not start at the correct time, but (for example) will start one keying cycle late. Although that limitation upon the operator's freedom is very generous by any previously available standard, it has been found that even greater freedom of movement, particularly in keying a dash that follows a single dot, reduces fatigue and increases effective keying speed very markedly. By providing for dot memory, the invention permits the control lever to generate a dot signal (a signal calling for subsequent dot output); and then to be shifted from dot to dash position even before the actual start of the signalled dot. The system then produces the dot and the following dash with correct timing. By making that possible, dot memory provides a particularly important new type of additional keying freedom, which is typical of what can be accomplished in accordance with the broader principles of the invention. Other typical extensions of keying freedom are described below, particularly in connection with Figs. 5 and 7.

More specifically, typical dot memory circuitry (which may assume a great variety of specific embodiments) preferably performs the following specific functions in addition to, or as a part of, the broader concept of the dot memory function.

(*a*) Stores a dot signal in response to momentary contact of the control lever on the dot side.

(*b*) Disables the normal control agency of the system (e. g. the manual control lever) whenever a dot signal is so stored.

(*c*) Initiates a dot in response to the stored dot signal as soon as timing and other conditions permit.

(*d*) Returns to idle condition after the dot has been so initiated.

Figure 4:
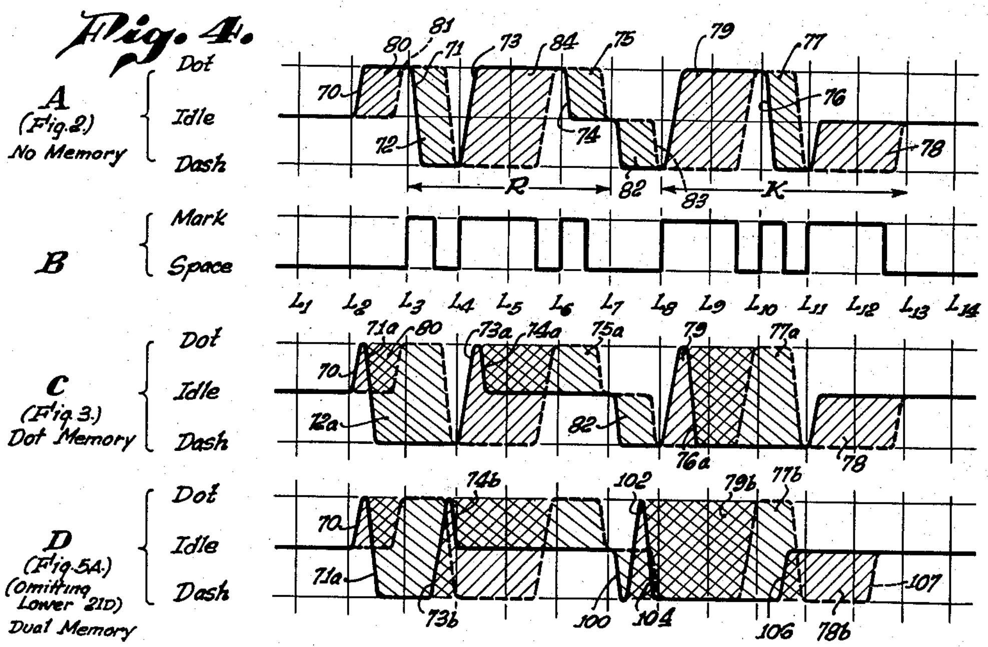
Fig. 4 is a diagram illustrating the action of typical forms of memory function and their reaction with the selection function.

With such circuitry incorporated in a code keying system, the operator may signal for a dot by momentary closure of the control lever to dots at any time within one keying cycle before the dot is to start (or at any time within the two keying cycles occupied by an immediately preceding dash). The control lever then need not be held closed to dots until the dot has actually started, as in Figs. 1 and 2. Once the dot has been signalled, the lever may be shifted immediately to idle position, or to dash position in preparation for a following dash. The dot signal is stored in the memory circuit, and becomes effective to initiate a dot as soon as the preceding character or space has been completed. Immediate shift of the control lever to dashes cannot produce a dash in place of the desired dot, since the control lever is disabled during storage of the dot signal. After the dot has been started, the memory circuit is cleared (returned to idle condition), restoring normal functions to the control lever, which can therefore produce a dash, another dot, or a space, depending upon the lever position, as soon as the dot has been completed. Whereas memory clearance preferably takes place immediately upon the actual start of the stored dot, it is ordinarily only necessary that the memory circuit be cleared, restoring the system to its normal control, before completion of the dot. Fig. 4 illustrates diagrammatically the gain in freedom of manual timing by the operator that results from dot memory, and will be explained after discussion of the illustrative dot memory circuitry of Fig. 3.

As illustrated in Fig. 3, a dot memory relay, R*y*15, is wired for actuation whenever control lever K*b* is moved from idle to dot position. Control lever stop 56 is employed as an auxiliary dot contact T1, making electrical contact with the control lever only when the latter is in dot position. Contact T1 is connected to power bus 50 via series connected C15 and R*y*15, and also via a parallel connection through current-limiting resistor R16. The junction of C15 and R*y*15 is connected via normally open relay contact lower 15B to ground via R15, and also to power bus 50 via series connected C16 and R17. In addition to the output circuit control at lower 11A, shown also in Fig. 2, which closes the output circuit between lines 40 and 42 for marking output when R*y*11 is actuated, an upper contact 11A is provided, by which the junction of C16 and R17 is grounded by deactuation of R*y*11. The circuitry just described controls actuation of R*y*15, while the effect of that relay is exerted upon the rest of the system primarily via a double throw relay switch, upper and lower 15A. Upper 15A is inserted into the previously described connection (Fig. 2) between dot contact T*a* and R13. And a new connection is provided between control contacts H*a* and T*a* via lower 15A. No further modification is required in the system of Fig. 2 to adapt it to the dot memory feature, and the remainder of the system as shown and identified in Fig. 3, corresponds directly in arrangement and operation to that of Fig. 2 except for the illustrative substitution of rotary switch 60 (already described) for multivibrator V1, V2. It may be noted that in Fig. 3 as illustrated, the output circuit is necessarily grounded via the armature of 11A, in order to provide the described action of upper 11A. If a floating output circuit is desired (as in Fig. 1) the function of upper 11A in Fig. 3 can of course be performed by an additional switch, mechanically controlled by R*y*11 and electrically isolated from the output switch lower 11A. Corresponding remarks apply, but will not be repeated, with regard to other embodiments to be described.

With R*y*15 unactuated and control lever K*b* in idle position, C15 is discharged at the potential of bus 50. Closure of grounded K*b* to dots charges C15 from the full battery potential primarily through T1 and R*y*15, actuating the relay and thereby closing a holding circuit for the relay through lower 15B and R15 to ground. If T1 is then opened, as by shifting K*b* back to idle position, C15 discharges through R16, which limits the rate of discharge to such a value that continued actuation of R*y*15 via the described holding circuit is not affected. Repeated closure of T1 only produces another current pulse through R*y*15 in relay actuating direction, again leaving the continued actuation of R*y*15 unaffected. Whenever dot relay R*y*11 is, or becomes, unactuated, as shown in Fig. 3, C16 is connected via upper 11A directly across R15, and is charged to the voltage standing in that resistor due to the relay holding current.

Actuation of memory relay R*y*15 opens at upper 15A the circuit through R13 normally shunting R*y*11, so that R*y*11, if not already actuated, will be actuated (in the manner already described) at the next following closure of upper 10A, initiating a dot. That action will take place regardless of whether K*b* is held closed to dots. The momentary dot signal has been effectively stored by the actuation of R*y*15 and the resulting opening of upper 15A.

If, at the moment of actuation of R*y*15, dot relay R*y*11 is already actuated, for example if the marking period of a dash is in progress, the opening of upper 15A will not interfere in any way with completion of the dash, since its only possible effect is to facilitate actuation of R*y*11. However, when the dash has been completed, and R*y*11 is once more unactuated, the stored dot signal will result in re-actuation of Ry11 at the next closure of upper 10A (clearing the dot memory, as will be described). Moreover, that closure of upper 10A will coincide with completion of the spacing interval of the dash. Thus, the signalled dot will immediately follow the dash that was in progress at the time the dot was signalled.

Immediately upon storage of a dot signal by Ry15, as described above, lower 15A is closed. R14 is then connected to both control contacts Ha and Ta, and is therefore grounded whatever the position of the control lever. (As Kb is moved from dots to dashes, for example, Ta is closed before Ha is opened.) Therefore the R14 shunt circuit across Ry12 cannot be opened, and a dash cannot be initiated. Control lever Kb is thus disabled so far as its dash function is concerned. And Kb is also effectively disabled as to its dot function, since neither opening nor closing of T1 has any effect on the system so long as Ry15 is actuated; and opening of Ta (now connected via lower 15A to R14) can have no effect because Ha remains closed. Kb remains thus disabled as long as Ry15 remains actuated.

When the signalled dot is finally initiated by actuation of Ry11 upon closure of upper 10A, lower 11A shifts the output circuit to marking. Upper 11A is simultaneously opened. C16 and R17 are thereby effectively connected in shunt across Ry15, drawing momentarily so much current through R15 that the voltage across Ry15 is no longer sufficient to maintain its actuation. C16 is preferably enough larger than C15 that the above action is independent of the condition of control contact T1. The memory relay is therefore deactuated, opening the holding circuit at lower 15B and "clearing" the memory circuit. The resulting return of upper and lower 15A to normal position restores the primary control circuits to their normal dependence upon control lever Kb. Control lever Kb can control the production of successive dots by holding Ta open continuously; and opening of Ha will initiate a dash as usual in response to any closure of upper 10A (so long as a dash is not already in progress with 11B closed).

It is pointed out, in particular, that after the memory circuit has been cleared, that circuit can preferably respond to another dot signal only if it is a completely new signal. The memory circuit (in the present embodiment) is not recycled merely by continued closure of Kb to dots. More specifically, Ry15 can be actuated again only by a shift control contact T1 from open to closed condition. Mere continued closure of T1, continuing during and after clearance of the memory circuit (deactuation of Ry15), does not again actuate Ry15, since the capacitative coupling via C15 can transmit only a voltage pulse. However, after momentary return of Kb to idle (or to dash) position, discharging C15 through R16 at a rate insufficient to actuate Ry15, a new dot signal, made by re-closing T1 after the memory circuit has been cleared, will again actuate Ry15 in the manner already described.

Continued closure of Kb to dots, although not recycling the memory relay, does produce a continuous series of dots. At the start of the marking interval of a dot that has been produced via the memory circuit, upper 15A closes. At the end of the spacing interval of the same dot, upper 10A is closed by the time base Ry10. At that moment the action of the system is completely controllable by the control key. For example, if Kb has been held at dot position continuously since first signalling the dot just completed, shunt R13 is open at Ta, and a second dot is therefore initiated by actuation of Ry11, as already described in connection with Fig. 2. Dots will continue in that manner as long as Ta remains open.

On the other hand, if Kb has been transferred to dash position at any time prior to the end of the first (stored) dot, closure of upper 10A at the end of the dot actuates Ry12 instead of Ry11, initiating a dash, again as described for Fig. 2. With Kb in idle position, closure of 10A has no effect, and the dot is followed by a space. At any time during that space (or during a dash such as that just referred to) another dot signal may be made by momentarily closing T1. That new signal is then stored by actuation of Ry15, and appears as a dot after completion of the space (or of the dash) that was in progress at the moment the signal was given.

Recycling of the memory circuit on continued closure of T1 can easily be provided, for example by removing R16 from the system and replacing C15 by a direct connection from T1 to the junction of Ry15 and 15B. However, it is found in practice that with such recycling it may be difficult for the operator to terminate a series of dots correctly, since the control lever must then be moved away from dot position before the start of the last dot of a series. It is more convenient for most operators to maintain the control lever at dot position until the last dot of a series is heard (as in the system as described and illustrated in Fig. 3). The primary advantage of the memory function results from the remarkable freedom of timing that it permits in injecting single dots into a sequence of dashes and spaces.

Fig. 4 illustrates typical keying requirements for producing the illustrative series of mixed characters composing the code letters "R" and "K" in a system in accordance with the invention, with (Fig. 4C) and without (Fig. 4A) the dot memory feature. Vertical lines L1 to L14 represent the time boundaries between successive keying cycles. As indicated in Fig. 4B, the characters to be produced comprise a dot-dash-dot sequence of characters, followed by a space of one keying cycle, and then a character sequence dash-dot-dash. In Figs. 4A and 4C, and also in Fig. 4D which is discussed later in connection with Fig. 5A, the solid and dashed lines illustrate the successive shifts of control lever position between idle, dot (upper) and dash (lower) positions without and with dot memory, respectively. The solid lines represent such shifts when all movements of the lever are made approximately as early as is permissible, and the dashed lines represent the corresponding shifts when all movements are made approximately as late as possible in each instance. Areas shaded with lines slanting upward to the right represent the available freedom in timing for lever shifts toward dot position; lines slanting downward to the right, for shifts toward dash position.

The initial lever shift 70 to dot position is unaffected by dot memory, and must occur within the keying cycle after L2 and before L3 in both systems. However, without dot memory the lever must be at dot position at L3, and can be shifted (71) to dash position only after L3; whereas with dot memory only momentary closure to dots is required, and the lever may then be shifted at once to dashes (71a). In both systems the lever must be at dash position at L4, since no dash memory function is provided. The additional flexibility of lever movement provided by dot memory is clearly indicated by the larger shaded area 72a in Fig. 4C, as compared with area 72 in Fig. 4A.

Lever movement to dot position (73, 73a) following initiation of the dash is again unaffected by dot memory, but the return to idle position may be made at once (74a) with dot memory. Without the memory feature, dot contact must be maintained until after dot initiation at L6, and the lever must then be returned to idle before L7. The relative restriction of that movement is indicated by comparison of shaded area 75 with the larger area 75a that is available with dot memory.

In production of the letter K the keying requirements are the same with and without dot memory, with the single important exception of the marked difference of flexibility in shifting from dot to dash position (lines 76 and 76a in Figs. 4A and 4C), clearly shown by comparison of shaded areas 77 and 77a. The advantages of dot memory in keying other combinations of characters will be understood from the above illustrative examples.

Fig. 5 illustrates a further embodiment of the invention, but employing distinctive circuit details and embodying the additional feature of dash memory of a limited type, as well as dot memory somewhat similar to that already described in connection with Fig. 3.

The free running time base in the system of Fig. 5 comprises a continuously driven rotary switch 28a having a rotary contact 30, as in Fig. 1. Contact 30 may be driven by any suitable means, such, for example, as the variable speed motor of Fig. 3 or the motor and variable speed transmission of Fig. 1. Contacts S and M in Fig. 5 correspond in broad function with the similarly identified contacts of Fig. 1. An additional contact D is provided, so located that rotor 30 engages it during each revolution after engaging contact S and before engaging contact M.

In Fig. 5 rotor 30 is normally isolated from ground, but may be grounded through one or more of the normally open, parallel-connected switches 21C, 22A, 23A and 25A that are actuated respectively by the four relays of the system. Ry21 is connected on one side via R21 to power bus 50 and battery B, and on the other side to timing contact M and also via holding contact lower 21B to ground. A connection from timing contact S via upper 22C to the junction of R21 and Ry21 serves to deactuate the relay in response to a timing signal at S, provided Ry22 is not actuated.

Ry22 is connected on one side via R22 to the battery, and on the other side to ground through two parallel circuits, via holding contact lower 22B and via upper 21D, upper 25C and control lever dash contact H, the control lever K being itself continuously grounded.

Ry23 is connected directly between bus 50 and control dot contact T. Thus, swinging of lever K to dot position actuates Ry23, which becomes deactuated immediately upon opening of the relay circuit at T, since no holding circuit is provided.

The dot memory relay Ry25 is connected via R25 to bus 50 and via holding contact lower 25B to ground. A relay actuating circuit is provided via condenser C25 to ground via lower 23B, upper 23B serving to discharge the condenser. A somewhat similar circuit for de-actuating Ry25 connects the junction of R25 and Ry25 to ground via C26 upon closure of lower 21E, while closure of upper 21E discharges the condenser.

The output circuit, as shown, is controlled entirely by Ry21. As shown typically in Fig. 5, output leads 40 and 42 are connected for marking output by closure of lower 21A.

The switches operated by Ry23 may alternatively be controlled directly by lever K, for example as illustrated in Fig. 5A. Relay switch 23A may be eliminated by simply providing a connection 89 from rotor 30 directly to control dot contact T, as in Fig. 5A, and that may be done whether or not Ry23 and its double throw switch 23B are retained. The latter switch may, for example, be replaced by a pair of spring contacts, shown illustratively in Fig. 5A at 90 and 92, which are selectively engaged by an insulated portion 94 of control key Kc when the latter is swung to dot and dash position, respectively, and which are otherwise held free of Kc as by stops 91 and 93, respectively. As illustrated, contact 90 is grounded; contact 92 is connected (in place of upper 23B) to the junction of Ry25, C25 and relay switch 25B; and control lever portion 94, insulated from the main grounded portion of the lever as by a spacer 97 of insulating material, is connected, as by a flexible lead 95, to the other side of C25. With such an arrangement, and with the described connection 89 from T to rotor 30, Ry23 may be entirely eliminated. Operation of the system as thus modified will be obvious from the following description of Fig. 5. However, it is preferred in general to maintain mechanical simplicity of the control lever, and, in particular, to permit all parts of the control lever to be at ground potential. (That latter preference is, for example, sacrificed for the sake of other types of simplicity in the system of Fig. 1.)

In idle condition of Fig. 5 all relays are unactuated, as shown, and rotor 30 is isolated from ground by the normally open switches 21C, 22A, 23A and 25A. To produce a dot, control lever K is shifted momentarily to dot position, closing dot contact T, at any time during the preceding keying cycle, or, if a dash is in progress, during the preceding two keying cycles. Such closure of T actuates Ry23, which immediately performs two distinct functions. Lower 23A is closed, grounding rotor 30. That action continues only while K is closed to dots (since Ry23 has no holding circuit). Also, actuation of Ry23 opens the short circuit on condenser C25 at upper 23B and grounds one side of the condenser through closure of lower 23B. C25 thereupon charges through R25 and Ry25, actuating Ry25.

That actuation of dot memory relay Ry25 closes the relay holding circuit via lower 25B, storing the dot signal by continuation of relay actuation regardless of the position of K. That signal is made effective primarily by closure of 25A, which applies a ground to rotor 30 in parallel with already closed 23A. The latter has provided a temporary ground for rotor 30 during the millisecond or so required for actuation of the memory relay, relieving the speed requirements that would otherwise apply to Ry25 to insure production of a dot by rotor contact at M (see below) even when T is closed at the last possible moment. Once 25A is closed, contact at 23A is no longer required. In actual practice, the control lever may therefore be shifted away from dot position as quickly as is physically possible without affecting production of the signalled dot. In addition to thus storing the dot signal, actuation of Ry25 opens upper 25C, isolating dash contact H and effectively disabling the control lever during dot signal storage.

If rotor 30 is grounded, as via 25A, when it engages timing contact M, a relay actuating circuit is momentarily completed to ground through R21 and Ry21, actuating that relay, which locks to ground through holding contact 21B. Actuation of Ry21 closes lower 21A, shifting the output circuit to marking condition to start a character, a dot in the present instance. At the same time the memory circuit is cleared, since Ry25 is deactuated by the momentary application of discharged C25 in shunt across it by closure of lower 21E. However, the functions performed by actuation of Ry25 during dot signal storage are immediately taken over by actuation of Ry21 during dot marking. Thus closure of 21C maintains ground on rotor 30, and opening of 21D continues the isolation of control lever dash contact H.

When grounded rotor 30 next engages timing contact S, Ry21 is short circuited via closed 22C and is de-actuated, opening holding contact 21B. That opens 21A, shifting the output circuit back to spacing condition after just one baud of marking. At the same time, dash control is restored to control lever K by closure of 21D, and ground is lifted from rotor 30 by opening of 21C (at least if K is in idle position).

If K has been held continuously at dot position, a second dot is initiated at the next following timing signal at M independently of the dot memory relay, since rotor 30 remains grounded via 23A. Memory relay Ry25 is recycled (once the memory circuit has been cleared at the start of dot marking) only if K is at least momentarily opened, and is then re-closed to dots. That movement of K acts via Ry23 first to discharge C25 by momentary closure of upper 23B and then to again ground C25 via lower 23B, drawing actuating current through Ry25 in the manner and with the results already described. While it is possible to produce successive dots of a series by such reactuation of the dot memory circuit, it is ordinarily more convenient merely to hold K closed to dots throughout the series until the start of marking for the last dot.

The value of R25 is preferably so chosen that, when lower 21E closes at the start of marking, C25 charges through R25 in a time that is negligibly short compared to one baud. It is then possible to actuate Ry25 by closure of T to store a dot signal substantially immediately after the start of a dash; or to re-actuate Ry25 by re-closure of T substantially immediately after the start of a preceding dot. When a spacing cycle precedes the desired dot, the effective period of dot memory starts as soon as rotor 30 has left M, one keying cycle ahead of the dot.

Closure of K to dashes, as already stated, has no effect if a dot signal is in storage (since 25C is open), or if Ry21 is actuated for marking output (since 21D is open). Otherwise, closure of dash contact H completes the described actuating circuit through Ry22, which is then held actuated by closure of 22B. Actuation of Ry22 grounds rotor 30 by closure of 22A, with the result that marking output is initiated in response to the next following timing signal at M in the manner already described for dot production, namely, by actuation of Ry21. However, when marking is thus initiated as a result of actuation of Ry22, upper 22C is opened, isolating contact S, so that the described deactuation of Ry21 does not occur at the first following timing signal at S. Therefore marking continues beyond one baud.

During the second baud of marking, rotor 30 engages and momentarily grounds contact D, short-circuiting Ry22 and deactuating the relay. That opens the relay holding circuit through 22B and also closes 22C, re-connecting S to the junction of R21 and Ry21. At the same time, the circuit via 22A by which rotor 30 was grounded for the initial actuation of Ry21 is opened; but ground is maintained on the rotor via closed 21C. Contact of the grounded rotor at M has no effect, but the next timing signal at S, just three bauds after the start of marking, short-circuits and deactuates Ry21 via closed 22C, shifting the output circuit back to spacing condition by opening 21A. See Fig. 20(C). The output cannot again be shifted to marking until the next timing signal at M, insuring the full spacing period of one baud to complete the dash.

During the marking period of a character, the dash control contact H is isolated at open 21D. Therefore, during a dash, after Ry22 has been deactuated by rotor contact at D, it cannot be re-actuated by closure of H until after the marking period has been ended by deactuation of Ry21 at S. However at any time during spacing output, including the spacing baud of a dot or dash, closure of H actuates Ry22 (provided a dot has not previously been signalled and stored by actuation of memory Ry25, isolating H at 25C). If Ry22 is thus actuated while rotor 30 is between S and D, it is ineffective (in itself) to produce a subsequent dash, since rotor contact at D again deactuates the relay (in spite of the holding circuit via 22B) by grounding the junction of R22 and Ry22. However, if the control lever closure of H that actuates Ry22 occurs after rotor 30 has passed D and before it has reached M, a form of dash memory occurs. Ry22 is then held in actuated condition by the holding circuit via 22B, effectively storing the dash signal. Even if control lever K is moved away from dash position while rotor 30 is still between D and M, the rotor will remain grounded via closed 22A until it reaches M, and will therefore initiate a dash in the manner already described. Accordingly, with the system as shown in Fig. 5, to produce a dash, K must be in dash position at some time after rotor 30 leaves D, but need not be held continuously to dashes until the rotor reaches M, as would be true without dash memory. With a dash signal stored in Ry22, a following dot signal can be effectively stored in Ry25 only after the dash marking has started and C25 has become substantially fully charged via lower 21E (see above). The system of Fig. 7, for example, avoids that limitation.

The particular type of dash memory just described is inherent, in the sense that it is provided without the need of any appreciable special circuitry that has not other important function. It is further characterized by the relatively limited time during which it is effective (while rotor 30 is between D and M) in contrast to the period of (at least) an entire keying cycle for which the dot memory (in the illustrative form including Ry25) is effective. A further distinctive feature is the fact that the inherent dash memory, as described, recycles following a dash and is thus effective to produce a following dash unless control lever K is released from dash position before rotor 30 passes contact D during the spacing baud of the first dash. To prevent production of another dash, lever K must be released before that contact at D. When that is done, Ry22, deactuated by that contact, is not again actuated before the following timing signal at M.

By mounting contact D adjustably as to angle, as by a slot 37a in the manner already described for contact S, the operator may be provided with optional control of the compromise between the available release period (between S and D) and the period of effective dash storage (between D and M). It will be noted that as D is shifted toward S, increasing the dash memory period, it is necessary to release the control lever to prevent successive dash output more and more quickly after completion of the marking period of the last dash. But that increase in the effective period of dash memory also permits release of the control lever longer in advance of the start of marking of the last dash, without preventing that dash from appearing. Actually, the total time available for lever release to terminate a series of dashes is not changed by adjustment of D. But shifting D toward S (for example) shifts that available time period forward with respect to the time of actual dash production at 21A. The period available for lever release extends for two full keying cycles, namely, between the two passages of rotor 30 over contact D that occur just before and just after the marking period of the dash that is to terminate the series. The possibility of conveniently shifting that release period relative to the dash marking period, as by movement of D, to accord best with the personal keying habits and preferences of the operator is a useful subsidiary advantage offered by the illustrative system of Fig. 5.

The system of Fig. 5, by comparison with that of Fig. 1, illustrates how the transfer of dash production functions to the dot trigger may be carried a step farther than in Fig. 2. In Fig. 5 the dash trigger is relieved of any action at all at the start of dash marking. The time signal control of the start of dash marking acts directly on dot trigger Ry21, initiating marking without affecting the dash trigger. It is because the dash trigger is thus relieved of any action at the start of dash marking that it becomes capable of performing the additional function of limited dash memory.

In spite of the differences of function between Ry22 of Fig. 5 and, say, Ry2 of Fig. 1, there is a sense in which both may properly be called dash triggers. Actuation of Ry22, like that of Ry2, determines that a marking period (being initiated or to be initiated later) shall be of dash length rather than of dot length. That function is essentially one of selection. Actuation of the dash trigger stores, during the first baud of dash marking, the information that marking is to be continued for two more bauds. That information is made effective in different detailed manners in different embodiments of the invention; but in each instance it has the result of producing a dash mark rather than a dot mark.

In Fig. 1, Ry2 performs that selection function together with a dash timing function that is analogous to the dot timing function of Ry1. The terms dot trigger and dash trigger are particularly appropriate there. In Fig. 5, Ry22 performs the dash selection function and also a dash memory function, while Ry21 times both dots and dashes. Under that condition the terms dot and dash trigger, although still valid in a certain sense, may appear misleading because they imply a parallelism that is not present.

For that reason the alternative terminology already suggested in connection with Fig. 2 is particularly appropriate for the system of Fig. 5. From that viewpoint, Ry21 may be considered a marking trigger and Ry22 a dash selection and memory circuit. That alternative terminology is pointed out particularly as representing a typical alternative viewpoint that may be relied upon in claiming the invention. However, in the drawings it seems preferable to favor consistency of terminology so far as possible to facilitate comparison of the various embodiments. The terms dot and dash trigger are used throughout (except in Fig. 7, to be described) but without implying any limitation upon the manner in which the invention may be claimed.

As a further illustration of the various manners in which the several functions of a system may be distributed among its physical components, it is pointed out that the two functions of dash selection and dash memory, while preferably performed by the same trigger circuit, as shown typically in Fig. 5, may alternatively be divided between two trigger circuits, for example in the manner shown in Fig. 5B. The latter figure also illustrates a specific manner in which distinct circuits may be provided for timing dot and dash marking in a system like Fig. 5 (as well as in Fig. 1, see Fig. 1A). For clarity of discussion, dot memory is omitted in Fig. 5B, but may be included in the general manner already shown in Fig. 5.

In Fig. 5B the circuitry for producing dots is like that of Fig. 5 with three exceptions. Omission of dot memory permits connection of dot contact T directly to timing arm 30, eliminating coupling relay Ry23. Since Ry21 in Fig. 5B is not utilized for dash production, its clearing circuit is a direct connection between S and the junction of R21 and Ry21. And a selecting switch 28C under control of Ry28, to be described, is inserted in the actuating circuit from M to Ry21.

The dash circuitry of Fig. 5B includes Ry22, which carries the same numeral as Ry22 of Fig. 5 to emphasize that the primary functions of the two are the same, namely to extend the marking period beyond that of a dot, so that a dash will be produced. Dash memory in Fig. 5B is performed by Ry28, which is actuated in the same manner as Ry22 of Fig. 5 (except for omission of 25C in its actuating circuit). Actuation of Ry28 prepares the system for actuation of Ry22 in response to a timing signal at M. That is accomplished by grounding timer arm 30 via 28A and by shifting 28C to lower position, isolating Ry21 and completing an actuating circuit from M to Ry22. The clearing circuit of Fig. 5 from D to the junction of R22, Ry22 is extended in Fig. 5B to the junction of R28, Ry28, and thus serves to clear both Ry22 and Ry28. Momentary closure of K to dashes stores a dash signal by actuation of Ry28, with the result that Ry22 is actuated in response to the next timing signal at M. Dash marking is thereby started by closure of 22D in the output circuit.

Completion of dash marking is performed in Fig. 5B independently of the dot trigger by Ry27, which is directly actuated by closure of 22A (simultaneously with the start of dash marking) and is held by closure of 27B. Actuation of Ry27 holds ground on timer arm 30 by closure of 27C and continues marking by closure of 27A. A clearing circuit for Ry27 from S includes series switch 22C. That switch is open during the first timing signal at S, but is then closed by deactuation of Ry22 via D. The next timing signal at S, three bauds after the start of marking, finds 22C closed. Ry27 is therefore deactuated, ending dash marking.

It will be seen that in Fig. 5B, as in Fig. 5, actuation of dash trigger Ry22 performs the selective function of prolonging marking to produce a dash rather than a dot. In Fig. 5B, in contrast to Fig. 5, Ry22 has no dash memory function, but does directly time the start of dash marking. The end of dash marking is timed by auxiliary dash trigger Ry27, entirely independently of dot trigger Ry21.

Fig. 5A illustrates four clearly distinguishable modifications of Fig. 5, which may be introduced independently or together, but which are shown in a single diagram for economy of drawing. One such modification, already described, is the substitution of contacts 90 and 92, directly operated by control lever Kc, for Ry23 of Fig. 5 and its relay switches 23A and 23B. That modification involves no change in the functional operation of the system.

A second modification illustrated in Fig. 5A comprises the introduction of a normally open relay contact, controlled by Ry21, into the holding circuit of Ry22 in series with 22B. That additional switch is shown as lower 21D, but can alternatively be an entirely independent switch of Ry21. That simple change completely eliminates the dash memory function, just described. With that modification, the holding circuit for Ry22 can function only if Ry21 is actuated (to close lower 21D), that is, only during marking output. Therefore, to produce a dash, control lever K must be in dash position, holding Ry22 actuated, at the moment of a timing signal at M, but may be released immediately thereafter, when the holding circuit of Ry22 becomes effective. The contact at M actuates Ry21 via closed 22A, and thereby closes lower 21D, completing the holding circuit of Ry22. From that point on, the dash is completed as already described. A second dash will be produced only if K is closed to dashes when rotor 30 contacts M at the completion of the first dash. Dot production is not affected.

A third modification, illustrated in Fig. 5A, comprises insertion of a normally open relay switch 21F into the line shown in Fig. 5 connecting contact D to the junction of R22 and Ry22. That has the effect of isolating contact D except during marking output (actuation of Ry21). That does not affect the primary function of contact D, which is to deactuate Ry22 during the second marking baud of a dash, since 21F is then closed. However, during spacing output 21F is open and prevents deactuation of Ry22 at D.

In a system omitting dash memory, for example as described in connection with lower 21D of Fig. 5A, a switch such as 21F has only the relatively minor function of avoiding chattering of Ry22 as rotor 30 passes over D while the control lever is held to dashes during spacing output (and with no dot signal in storage). Under those conditions, in the system omitting 21F, Ry22 is deactuated via D and re-actuated again via the control lever as soon as D is opened. The additional switch 21F, by isolating D under those conditions, prevents useless relay operation.

In a system that includes inherent dash memory, as in Fig. 5, a switch such as 21F in Fig. 5A has the further effect of extending the period of effectiveness of dash memory. That dash memory is made effective for storing a dash signal, when the signalled dash is preceded by a character, during the entire spacing baud of that character; and when the signalled dash is preceded by a full keying cycle of spacing, the dash memory is effective throughout that keying cycle. That follows simply from the fact that rotor contact at D is ineffective to deactuate Ry22 during spacing output. (The dash memory would be effective also during the last marking baud of a character, except that during marking output control lever dash contact H is necessarily isolated, as at upper 21D, to prevent accidental conversion of a dot into a dash.) Since contact at D does not limit the period of dash memory with the system under discussion (typically the system of Fig. 5 plus relay switch 21F as shown in Fig. 5A), the operation of such a system is independent of the exact angular position of contact D. As in a system without dash memory, it is only necessary that rotor 30 contact D after leaving S and before reaching M.

To make fully effective the combination of so extensive a dash memory as has just been described and the dot memory circuit comprising Ry25, it is desirable to provide an interlock in the latter circuitry that will permit clearing of the dot memory circuit upon starting of a dot (as already described), but will prevent such clearing of the dot memory upon starting of a dash. For example, a double-throw relay switch controlled by Ry22 may be introduced into the line that connects the junction of R25 and Ry25 to C26. Such a modification is shown illustratively in Fig. 5A as switch 22D, which is so connected that with Ry22 unactuated the circuitry is effective as shown in Fig. 5, but that actuation of Ry22 disconnects C26 from Ry25 and connects it instead to battery B via a current limiting resistor R26. (An alternative circuit for accomplishing the same function is shown at 32C in Fig. 7.) The effect of that modification will be understood by considering its introduction into Fig. 5 together with the switch 21F, already discussed (and without lower 21D of Fig. 5A). Fig. 4D represents the keying movement required to produce the typical letters R and K with such a system, the solid lines representing the earliest permissible lever movement, and the dashed lines the latest. In keying letter "R," for example, (dot-dash-dot) the keying requirements for the first dot are not affected by the presence of dash memory. After signalling the first dot, the control lever may be moved (71a) at once to dash position as before. But the dash memory, becoming effective at the conclusion of dot marking, permits lever movement away from dash position (73b) during the last half of the dot, and without waiting for actual start of the dash as was necessary without dash memory (line 73a of Fig. 4C). The final dot may then be signalled even before the start of the dash, and the control lever returned at once to idle position (74b) to await automatic completion of the letter.

In keying the letter K, which comprises dash-dot-dash and is the second letter represented in Fig. 4, the control lever can be closed momentarily to dashes (line 100) at any time after the start (at L7) of the last full keying cycle of spacing output preceding the required letter. That movement actuates Ry22, which locks to ground via 22B (lower 21D, although shown in Fig. 5A, is not included in the system under consideration). The dash thus signalled will start in response to the next timing signal at M (at L8 in Fig. 4D). In the meantime the control lever may be shifted along line 102 to dot position, actuating Ry25 to store a dot signal. The lever can then be shifted immediately back to dashes (line 104), and held there without immediate effect while the system produces the first signalled dash, and, immediately following, the signalled dot.

The stored dot signal is not released by clearing of the dot memory circuit at the start of dash marking (at L8), because upper 22D (Fig. 5A) is then open and C26 merely charges from the battery through R26 without affecting Ry25. During the second baud of the dash, Ry22 is deactuated by rotor contact at D, clearing the dash memory circuit. That closes upper 22D, transferring the positive side of C26 back from B to the junction of R25 and Ry25, but without deactuating the latter. At the end of the dash marking period C26 is again discharged at upper 21E, and thereby prepared for its normal role of deactuating Ry25 at the start of dot marking. The dot signal is still safely stored, with resulting ground on rotor 30 via closed 25A. Therefore the timing signal at M that ends the spacing period of the dash (at L10 in Fig. 4) actuates Ry21, starting the marking period of the signalled dot. That actuation of Ry21 finally clears the dot memory by momentarily shorting Ry25 via closed upper 22D, C26 and lower 21E.

During those operations, the closed dash contact H has been ineffective because isolated at one or both of 21D and 25C. Upon completion of the marking period of the dot, those switches are again both in closed position, permitting actuation of Ry22 to store the signal for the second dash. As soon as that signal has thus been stored, the control lever may be returned to idle position as indicated by line 106 in Fig. 4D; and must be so returned, as at 107, before completion of the marking period of the second dash in order to avoid production of a third dash. Thus two full keying cycles are available for that final release, since it may occur at any time within area 78b between lines 106 and 107. That period is longer by half a keying cycle than the corresponding release time 78 of Fig. 4A or Fig. 4C. The time available for signalling the dot (area 79b) is lengthened also by half a keying cycle as compared to Fig. 4C, while the period (area 77B) available for signalling the second dash is increased by a full keying cycle.

Figs. 6 and 7 illustrate further embodiments of the invention, which may be considered to be partially derived from Figs. 5 and 5A. In Fig. 6 only dash memory is provided, and there is no dot memory. In the system as shown in Fig. 7, not only has a primary dot memory been added, corresponding in many respects to that of Fig. 5, for example, but secondary dot memory and secondary dash memory are also provided. The simpler system of Fig. 6 will be described first.

In Fig. 6 the free-running time base is provided by a cam mechanism which is merely illustrative of any suitable means for intermittently and alternately closing two independent circuits including contacts M and S, respectively. As illustrated, spring fingers 120 and 122 are alternately deflected by cam 124 into electrical contact with M and S, respectively. Cam 124 is continuously driven by suitable means, such as a motor 66. Finger 122 is directly grounded, providing a continuous ground for the S function, and avoiding the necessity for holding the ground on rotor 30 during marking output. Finger 120 is insulated from the cam as by an insulating spacer 125, and is connected directly to control lever dot contact T, and also via normally open relay switch 32A to ground.

Ry31, which corresponds generally to Ry21 of Fig. 5, is connected in series with R31 between battery bus 50 and timing contact M, and has a holding circuit to ground via lower 31B. The output circuit is controlled by 31A, which is shown illustratively as a double throw switch that connects lines 40 and 42 (as in previously described embodiments) and also opens lines 40 and 43 when Ry31 is actuated. An output device requiring open circuit for marking output may be connected between lines 40 and 43, or a device requiring closed circuit for marking may be connected between lines 40 and 42. That type of output circuit may be provided, if desired, as a part of other embodiments of the invention.

Ry33, which has no holding circuit, is connected in series with R33 between bus 50 and timing contact S, and serves as a convenient coupling means for operating several contacts simultaneously. All the contacts, to be described, that are controlled by Ry33 might alternatively be directly cam operated in the same general manner that contact S is cam controlled.

A circuit for de-actuating Ry31, and thereby terminating marking output, leads from the junction of R31 and Ry31 to ground via lower 33A and upper 32B in series. That circuit becomes effective upon momentary actuation of Ry33 provided Ry32 (to be described) is unactuated. A similar deactuating or disabling circuit for Ry33 is provided from the junction of R33 and Ry33 to ground via a normally closed relay switch controlled by Ry31. As illustrated, and for economy of switch structure, upper 31B is utilized as that switch. That circuit prevents actuation of Ry33 at S unless Ry31 is actuated, that is, except during marking output.

Ry32 is connected in series with R32 between bus 50 and dash control contact H via normally closed relay switch 31C (compare 21D in Fig. 5). A holding circuit to ground is provided for Ry32 via lower 32B from the junction of Ry32 and 31C. That holding circuit, once established, is therefore independent of Ry31; but it can be established by actuation of Ry32 at H only if Ry31 is unactuated with 31C closed, that is, only during spacing output. Deactuating circuitry for Ry32 is provided from the junction of R32 and Ry32 to ground via C32 and upper 33B, lower 33B serving to discharge C32. That circuit is effective only upon shifting of Ry33 from actuated to unactuated condition, which occurs whenever (during marking output with upper 31B open) the cam-controlled timing contact at S is broken. The dependence of that action upon upper 31B being open corresponds generally in function to the described action of 21F in Fig. 5A.

To produce a dot, grounded control lever K is held closed to dots, grounding T and finger 120, until a timing signal at M closes the actuating circuit for Ry31, which locks to ground at lower 31B, starting dot marking output at 31A. Opening of 31C isolates dash control contact H, preventing the dot from being accidentally changed to a dash; and opening of upper 31B, opens the disabling circuit of Ry33. One baud later, the timing signal at S momentarily grounds S, actuating Ry33. That closes lower 33A, shorting and deactuating Ry31 (upper 32B being closed). Marking is thus terminated, and cannot begin again before the next timing signal at M, one baud later, thus insuring completion of the dot space.

To produce a dash, K is closed momentarily to dashes, grounding H, at any time during spacing output and not more than one keying cycle ahead of the timing signal at M at which the dash is desired to start. That actuates Ry32 (31C being closed during spacing output), which locks to ground via lower 32B. The control lever may then be returned to idle or dot position without interfering with production of the signalled dash; but no effective dot signal can be generated until completion of the dash, since no dot memory is provided.

The described actuation of Ry32 applies ground to finger 120 by closure of 32A, insuring actuation of Ry31 and the start of marking output at the next timing signal at M. Actuation of Ry32 also opens upper 32B, disabling the described deactuating circuit of Ry31 which includes the now open lower 33A. Therefore the next timing signal at S, although momentarily actuating Ry33, does not deactuate Ry31, but allows marking output to continue. However, that momentary actuation of Ry33 closes lower 33B, discharging C32. When Ry33 is again deactuated by opening of S, discharged C32 is connected between ground and the junction of R32 and Ry32, deactuating Ry32. That opens 32A, lifting the ground from finger 120, and preventing production of another character unless signalled at the appropriate time at K. It also restores the deactuating circuit of Ry31 by closure of upper 32B. The next timing signal at S, three bauds after the start of marking, completes that circuit momentarily at 33A, deactuating Ry31 and ending the marking period of the dash. At the same time, 31C is closed, permitting another dash to be signalled by closure (momentary or otherwise) of H. That following dash will start in response to the next timing signal at M, after completion of the spacing baud of the first dash. To produce a dot following a dash, dot contact T must be in closed position during the timing signal at M that marks completion of the dash.

The question of appropriate terminology for Ry31 and Ry32 in Figs. 6 and 7 is closed analogous to that already discussed with respect to Ry21 and Ry22 in Fig. 5. It is only necessary to add here that the difference of notation regarding Ry32 in Fig. 5 and 6 ("dash trigger and memory" in Fig. 6, and "primary dash memory" in Fig. 7) represents a difference of emphasis rather than any basic difference of function.

The system of Fig. 7 includes the principal elements of Fig. 6, which have corresponding functions and bear identical numerals, and do not require further detailed description. To the basic system of Fig. 6, including primary dash memory (comprising Ry32), Fig. 7 adds a primary dot memory (corresponding in many respects to the dot memory already described in connection with Fig. 5), comprising Ry35; and what will be referred to as secondary dash memory, comprising Ry36; and also secondary dot memory, comprising Ry37. Ry34 performs switching or coupling functions, primarily in connection with the primary dot memory. Timing contact S is connected and operated as in Fig. 6. However, finger 120, which engages timing contact M, is grounded via 34A and 35A (as well as via 32A) rather than directly via control dot contact T, as in Fig. 6.

A normally closed relay switch 31F controlled by Ry31 is connected across R32, and disables the described deactuating circuit of Ry32 except during marking output (Ry31 actuated). That has the effect of preventing the primary dash memory circuit (Ry32) from being cleared during dot production, while allowing its clearance (as described above) during production of the signalled dash. That is, when S is momentarily closed during dot production, the resulting actuation of Ry33 deactuates Ry31 by closure of 33A (to terminate dot marking) and discharges C32 at lower 33B. That deactuation of Ry31 closes upper 31B, deactuating Ry33 (even before S opens) and simultaneously closes 31F. Therefore by the time upper 33B can close on deactuation of Ry33, there is already a direct charging circuit via closed 31F for C32, and Ry32 is not deactuated. On the other hand, when S is momentarily closed after the first baud of a dash, the actuation of Ry33 does not deactuate Ry31 (since upper 32B is open). Therefore deactuation of Ry33 (on opening of S) finds 31F still open, so that closure of upper 33B is effective to clear Ry32. Such a switch as 31F may also be introduced if desired in the system of Fig. 6, and serves then to extend the effective period of dash memory.

The primary dot memory relay, Ry35, is connected through R35 to battery bus 50 and is provided with a holding circuit to ground via 35B and with an actuating circuit to ground via C35 and lower 34B, effective upon actuation of Ry34. Upon 34B discharges C35 upon deactuation of Ry34. A relay shorting and deactuating circuit to ground is provided via lower 31E and C36, and functions in the same manner as that already described for deactuation of Ry25 in Fig. 5, for example. That deactuation circuit for Ry35 is disabled when Ry32 is actuated (when a dash signal is stored) by closure of 32C, which then shorts R35, so that application of C36 by lower 31E is ineffective. Thus the primary dot memory is cleared by the start of dot marking (actuation of Ry31 with Ry32 unactuated), but is not cleared by start of dash marking (actuation of Ry31 with Ry32 actuated).

The disabling circuits via lower 32C and upper 31F do not provide protective resistances, and hence require only single throw switches. The functionally equivalent circuit of 22D in Fig. 5A utilizes a double throw switch, but offers the advantage that the possibility of a short across voltage source B, caused by accidental simultaneous closure of upper and lower contacts 21E, is avoided by presence of R26 in the circuit.

Coupling Ry34 is connected on one side directly to bus 50, and on the other side is provided with two parallel actuating circuits to ground. One leads via upper 36C to control dot contact T, and serves to actuate Ry34 (and thereby store a dot signal by actuation of Ry35) in response to closure of K to dots, provided Ry36 is not actuated. The other circuit is via upper 37A and C34 to ground, lower 37A serving to discharge C34. Upon deactuation of Ry37 (see below), the secondary dot memory, actuation of Ry34 via upper 31A transfers the secondarily stored dot signal from Ry31 to Ry35 by actuation of the latter (via lower 34B). Ry34 has no holding circuit, but becomes deactuated as soon as dot contact T is opened (in case of actuation via upper 36C), or as soon as C34 becomes substantially charged (in case of actuation via upper 37A).

Ry37, which handles the secondary dot memory, is connected on one side directly to bus 50 and is provided on the other side with an actuating circuit to ground via lower 36C and control dot contact T. If closure of K to dots occurs when Ry36 is actuated (that is, when a dash signal is stored in the secondary dash memory) closed lower 36C directs the dot signal to the secondary dot memory, actuating Ry37, instead of to the primary dot memory via Ry34, as described in the preceding paragraph. A holding circuit for Ry37 leads via 37B to ground, not directly, but via the holding switch 36B of Ry36. The holding circuit of Ry37 is therefore opened, deactuating Ry37, when Ry36 becomes deactuated.

Ry36, the secondary dash memory relay, is connected on one side via R36 to bus 50, and is provided with a holding circuit to ground via 36B (already mentioned) and with two alternative actuating circuits via control dash contact H to ground. One actuating circuit is available via lower 35C whenever Ry35 is actuated (that is, when a dot signal is stored in the primary dot memory). The other is available via upper 35C and lower 31C in series whenever Ry35 is unactuated and Ry31 actuated (that is, during marking output with no dot signal stored in the primary dot memory). Actuation of Ry36 grounds control dash contact H at lower 36A, regardless of the position of K. Deactuation of Ry36 is accomplished by a circuit that may be identical with the corresponding circuit associated with Ry35, except that its switch is controlled by Ry32 instead of by Ry31. As shown, shift of 32D from normal to actuated position applies discharged C37 across actuated Ry36, deactuating that relay. That is, the secondary dash memory is cleared by virtue of a dash signal being stored in the primary dash memory.

Ry32, the primary dash memory relay, has an actuating circuit leading via upper 31C to control dash contact H (as in the simpler system of Fig. 6), but an additional relay switch, upper 35C, is inserted in that circuit, so that the latter is effective only if Ry35 is unactuated. Thus the primary dash memory is actuable from K only during spacing output (upper 31C closed) and in absence of a dot signal stored in Ry35 (upper 35C closed). Otherwise a dash signal generated by closure of H is stored (if at all) in the secondary dash memory by actuation of Ry36 via one of the circuits already described. If, while Ry36 is still actuated, both of the conditions just mentioned become satisfied (that is, if both upper 31C and upper 35C become closed) Ry32 is actuated at once via closed 36A. That actuation, which in effect stores a dash signal in the primary dash memory, also clears the secondary dash memory by applying C37 across Ry36 as described just above. Thus a dash signal stored in Ry36 is shifted to Ry32 whenever upper 31C and upper 35C both become closed (that is, when the output is spacing and the primary dot memory is cleared).

The practical operation of the system can be seen from what has been described. However, the sequencing will be more readily understood from a description of the storage and production of an illustrative code letter, for example the letter "C," comprising dash-dot-dash-dot. Starting with the system idle, and all relays unoperated, that complete letter can be injected into the system by appropriate movements of K, without any attention to the relative timing of those movements. That keying operation may begin at the start of the keying cycle of spacing that comprises the inter-letter space preceding production of the "C." Unless the time base is set to run unusually fast, the control key may even complete the keying operation for the four characters of a "C" and return to idle position before the first dash shows up at the output. Or the letter production may start while the keying is still in progress. In either case (so long as the keying is not very much too slow) the four characters of the letter will be produced in the signalled order and with fully correct time intervals, leaving the entire system again in idle condition.

Starting with the system in idle condition, for example just following the timing signal at M that concludes a preceding letter, K is first momentarily closed to dash contact H, operating Ry32 via closed upper 31C and upper 35C. Ry32 locks to ground via lower 32B, storing the first dash signal in the primary dash memory.

Actuation of Ry32 closes lower 32D, applying discharged C37 to the junction of R36 and Ry36, but without effect, since Ry36 is unactuated. Closure of 32A applies ground to finger 120, in preparation for the start of marking at the next timing signal at M. And closure of 32C disables the deactuating circuit of Ry35. That has no immediate effect, since Ry35 is still unactuated; but if a dot signal should be stored in Ry35 before the start of the dash already signalled (see following paragraph) closure of 32C will prevent loss of that dot signal via 31E as the dash starts.

Closure of K to dot contact T next actuates Ry34 momentarily via closed upper 36C, closing lower 34B and thereby actuating Ry35 by the charging current to C35. Ry35 locks to ground via 35B, storing the first dot signal in the primary dot memory.

Reclosure of K to dash contact H now finds lower 35C closed, due to actuation of Ry35, and therefore actuates Ry36, which locks to ground via 36B. The second dash signal is thus stored in the secondary dash memory.

Reclosure of K to dot contact T similarly finds lower 36C closed, due to actuation of Ry36, and causes actuation of Ry37. That relay locks via 37B to the holding circuit for Ry36 via 36B (and also, incidentally, via closed lower 35C and lower 36A in series). The second dot signal is thus stored in the secondary dot memory. Actuation of Ry37 closes lower 37A, discharging C34 in preparation for momentary actuation of Ry34 upon deactuation of Ry37.

The system is now fully charged with injected signals, and no further change can be produced by operation of control lever K. Closure of the dot contact merely applies ground via lower 36C to already actuated Ry37, and closure to the dash contact merely applies ground via lower 35C to already actuated Ry36. The system only awaits a timing signal at M to start producing the code letter that has been injected. It will be understood that such production may start before all four characters have been signalled, and that the detailed operation of the system will be modified accordingly, but without affecting the ultimate output.

The first timing signal at M applies ground via M to Ry31 from finger 120, which is now grounded via both 32A and 35A. Ry31 is thereby actuated, starting marking output at 31A for the first dash. Ry35 remains actuated, in spite of closure of lower 31E, because 32C is closed.

The next timing signal at S actuates Ry33 momentarily. That is ineffective to deactuate Ry31 by closure of 33A, since upper 32B is open. However, as S opens, deactuating Ry33, closure of upper 33B deactuates Ry32 (31F being open). That closes upper 32B, restoring the circuit for deactuation of Ry31. C37 is discharged via upper 32D, ready to deactuate Ry36 upon the next actuation of Ry32. And 32C opens, removing the short from R35, so that the next actuation of Ry31 can deactuate Ry35.

At the next closure of S, one keying cycle later, Ry31 is deactuated, ending marking at 31A. Ry32 remains unactuated in spite of the resulting closure of upper 31C, because upper 35C is open. Therefore 32A remains open, but finger 120 is still grounded via 35A. At the end of the first dash the primary dash memory has been cleared by production of the first signalled dash. The stored signals for the succeeding three characters remain stored in their respective memory circuits.

The next ground at M actuates Ry31 via closed 35A, starting marking output at 31A for the first dot. Actuation of Ry31 also applies discharged C36 across Ry35, deactuating Ry35 (since 32C is open) and clearing the primary dot memory circuit. That lifts the ground from finger 120 by opening 35A. The respective shifts of 31C to lower position and of 35C to upper position have no immediate effect.

At the next timing signal at S, Ry33 is momentarily actuated (upper 31B being open), closing 33A to deactuate Ry31 and terminate the dot marking period. The resulting closure of 31F shorts R32 and disables the deactuating circuit of Ry32. The simultaneous closure of upper 31C applies ground to Ry32 via closed 36A and upper 35C, actuating Ry32, which locks to ground via lower 32B. And the closure of upper 31B at the same time deactuates Ry33, even before timing contact S opens. However, although deactuation of Ry33 closes upper 33B, discharged C32 charges through closed 31F and does not deactuate Ry32. Closure of upper 31E merely discharges C36.

The actuation of Ry32, just described, closes lower 32D, applying discharged C37 to the junction of R36 and Ry36 to deactuate Ry36 and clear the secondary dash memory. The dash signal that was stored therein has already appeared in the primary dash memory in the form of actuation of Ry32. Opening of 36B upon deactuation of Ry36 also opens the holding circuit of Ry37, deactuating that relay and thus clearing the secondary dot memory circuit. That closes upper 37A, applying discharged C34 to Ry34 and actuating Ry34 momentarily. Discharged C35 is thereby applied to Ry35 via closed lower 34B for long enough to actuate Ry35, which locks to ground via 35B. Thus the dot signal that has just been cleared from the secondary dot memory appears in the primary dot memory.

After that shift of both dot and dash signals from the secondary to the primary memory circuits, finger 120 is again grounded via both 32A and 35A. Therefore the next timing signal at M actuates Ry31 for dash production, and that dash is followed by a dot in substantially the manner already described for the first dash and dot of the letter. The primary dash memory is cleared as before by Ry33 actuation at the first timing signal at S (31F being open during marking output). And the primary dot memory is cleared at the start of dot marking (32C being then open). The system thus returns to idle condition after production of the four signalled characters.

In keying a letter that starts with a dot (rather than with a dash as described above), for example the letter "R," comprising dot-dash-dot, the first dot signal at T is applied via closed upper 36C to Ry34, actuating Ry35 in the manner already described, and storing the dot signal in the primary dot memory. That shifts 35C to lower position, isolating the primary dash memory Ry32 from control lever dash contact H. Therefore the following dash signal at H is applied via closed lower 35C to the secondary dash memory relay, Ry36. Thus, although the primary dash memory system is idle, the first dash signal is stored in the secondary dash memory. That is necessary, in the system as illustrated, to insure that the first character produced shall be a dot rather than a dash.

A second dot signal can then be inserted via T and now closed lower 36C, actuating Ry37. Thus the entire letter "R" may be signalled before appearance of its first character at the output. The system is thereby placed in the same condition that has already been described as occurring during the spacing baud of the first dash of a letter "C." The production of the stored dot-dash-dot is the same in both instances.

After completion of the marking period of the first dot of either a "C" or an "R," the stored dash signal is transferred to the primary dash memory, and the stored second dot signal is transferred to the primary dot memory. Therefore both secondary memories have been cleared and are available for storage of additional signals, if required by the code. Thus another dash signal at H will then be transmitted via closed lower 35C to actuate Ry36, and a following dot signal at T will act via the then closed lower 36C to actuate Ry37. If two such signals are inserted, for example, during the spacing period of the first dot, the system is thereby returned to its fully charged condition, as after signalling of a complete letter "C," and will produce the characters dash-dot-dash-dot in addition to the characters that have already been produced.

It is apparent that the multiple memory circuits as illustrated in Fig. 7 can store sequences of dots and dashes only in alternation. That action provides the most significant potential advantages of memory systems. Successive dots or successive dashes can be obtained merely by holding the control lever to the proper contact until the last of the desired series of like characters starts at output. The primary function of memory is to give the operator greater flexibility in transferring the control lever between contacts, and such flexibility is less needed after a series of like characters than after a single character of one kind.

In practice it is found that provision of secondary memory, although greatly simplifying the keying of certain combinations of characters, ordinarily requires the operator to pay closer attention to inter-letter and inter-word spacings. Since many entire letters can be stored, even at high operating speeds, before production of the letter at the output gets well started, there is in general a waiting period before the inter-letter spacing commences, and there may at first be a tendency to start keying the next letter too soon. However, a flexibility of two full bauds is always available in which the signal for the first character of a letter may be given, and, unless that tolerance is exceeded, the spacing interval of the code output will be strictly correct.

A further embodiment of the invention, shown illustratively in Fig. 8, offers the great advantage of utilizing electronic tubes for substantially all of the switching functions of the system. A single double-throw electromagnetic relay is used for controlling the final output of the system and for generating certain voltage signals in response to shifts of the output between marking and spacing conditions. Those signals can also be generated electronically, if preferred, for example in the manner shown illustratively in Fig. 9, which may be substituted for a portion of Fig. 8 as described below. An important advantage in a system of the type shown in Fig. 8 (or in Figs. 8 and 9) is the elimination of mechanical relays at any points in the system where the limited speed of operation of a relay might in practice limit the keying speed of the entire system. A further advantage in substantially or completely eliminating mechanical relays is the greater stability of adjustment usually obtainable in all-electronic circuits. The single output relay in the system of Fig. 8 entails no appreciable difficulties on either of those counts, and that system ordinarily represents the preferred embodiment of the invention when associated output equipment is to be controlled by opening and closing a circuit. A modification such as Fig. 9 is preferably employed for supplying tone output.

The circuit of Fig. 8 can conveniently be divided into five main sections, all of which are typically, but not necessarily, powered from a common power source such as battery B, the negative side of which may be grounded, as indicated. Those sections, indicated for convenience at the top of Fig. 8, include free-running time base, comprising V1 and V2 and associated circuitry; dot memory, comprising a trigger circuit including V3 and V4, coupling tubes V5 and V6, and a memory clearing circuit including V11; dot trigger V7 and V8, which controls dot production and also plays an important role in dash production; dash trigger V9 and V10, which performs primary control over dash production; and output circuitry, including control tube V12 and output relay Ry41 which shifts the output between marking and spacing conditions. As illustrated, relay switch upper 41A controls the output via lines 40 and 42, while lower 41A simultaneously generates voltage signals to be described.

In the output circuit, V12 has its cathode connected directly to ground, and its plate connected to bus 50 through the coil of Ry41, which therefore acts as plate load. The grid of V12 is grounded via R72, normally providing zero operating bias so that current through V12 normally holds Ry41 actuated with upper 41A open for spacing output. As shown in the drawing, upper 41A is closed, connecting output lines 40 and 42 for marking output. That agrees with the convention already mentioned, that all relays be shown in their unoperated conditions. It is emphasized, however, that in the present instance Ry41 is actuated when the system as a whole is in normal or idle condition, and that the illustrated relay condition corresponds to marking output.

The grid of V12 is also connected to one side of C49 and through that condenser via R69 and R70 to the respective plates of V9 and V7.

When either of the latter tubes becomes conducting by shifting of the trigger circuit in which it is connected (see below), the increased voltage drop across the tube plate resistor R60 or R65 abruptly lowers the potential at the junction of R69 and R70, applying a negative pulse via C49 to the grid of V12, cutting off that tube, deactuating Ry41 and shifting the output circuit to marking condition by closure of upper 41A. The time constant of C49 and R72, for voltage decay from the negative peak amplitude of the pulse to that reduced negative bias at the grid of V12 which just allows sufficient conduction through V12 to reactuate Ry41, is made longer than the longest required marking period (three bauds) at the slowest keying speed to be used. The output remains at marking until both V7 and V9 become non-conductive, by action to be described. A strong positive pulse is then transmitted to the grid of V12, causing heavy conduction for positive reactuation of Ry41 for spacing output.

The timing signals of the system, as illustratively shown, are developed from a voltage square wave generated by an electronic oscillator of multivibrator type, substantially identical in structure and operation to that shown in Fig. 2 and already described. V1 and V2 are connected in parallel between power bus 50 and common cathode resistor R8, the other side of which is grounded. Since the oscillator output in Fig. 8 is utilized primarily as a voltage square wave, rather than as a current wave to operate a relay, as in Fig. 2, Ry10 of Fig. 2 may be replaced in Fig. 8 by any suitable plate resistor for V1, shown as R41. The tubes V1 and V2 are so coupled, as already described, via C1, R9 and R41, that conduction is transferred intermittently and abruptly between V1 and V2, the frequency of transfer being controllable by variation of R9, and the ratio of the conductive period in V1 to that in V2 being controllable by variation of R8.

The output from oscillator V1, V2 is preferably taken in part from the plate of V1 as a voltage square wave such as is indicated schematically in the figure, the negative swings corresponding to periods of conduction in V1 and substantial nonconduction in V2. That square wave is taken from the plate of V1 over line 150 and is differentiated independently in the two parallel circuits C45, R53, and C46, R58, producing in each circuit two alternating series of voltage pulses of opposite polarity, as indicated schematically.

Another periodic timing signal is preferably taken from the cathodes of V1 and V2 as a voltage wave of such form as is indicated typically in the figure, and is differentiated by C42, R44 to produce a series of positive-going pulses alternating with relatively small negative pulses as indicated at the grid lead of V3. The negative pulses are small enough to have no effect on the system, and are not utilized.

The three trigger circuits of the system, as illustratively shown, are basically similar in structure and operation. The memory trigger, dot trigger and dash trigger comprise two tubes each, as enumerated above, having common cathode resistors R53, R59 and R64, respectively. The even-numbered tubes of each pair have their plates connected directly to power bus 50, while the odd-numbered tubes are provided with plate resistors R48, R60 and R65, respectively. The cathode resistors are tied together via line 156, which is maintained at a positive voltage above ground by the voltage drop in R47, which is part of the voltage divider R45, R46 and R47, connected between bus 50 and grounded line 158.

The grids of the even-numbered tubes of each trigger pair have their respective voltages determined by voltage dividing circuits connected between bus 50 and ground and including the plate resistors of the respective odd-numbered tubes. Thus, the grid of V4 is connected to the plate of V3 via R49 and to ground via R50 and R51 in series; and the grids of V8 and V10 are connected to the plates of V7 and V9 via R61 and R66 respectively, and to ground via R62 and R67, respectively. The various components are so selected that the respective grids of the even-numbered tubes are biased beyond cutoff (non-conducting) by the voltage drop in plate resistors R48, R60 and R65, respectively, when the odd-numbered tubes are conducting; and that when those tubes are not conducting the grids of the even-numbered tubes are biased at an operating (conducting) potential in spite of the higher current that then flows through the respective cathode resistors R53, R59 and R64.

The grids of the odd-numbered tubes are tied to the movable contacts of potentiometers R44, R63 and R68, respectively, which are connected between line 156 and condensers C42, C45, and C46, forming therewith the time signal differentiating networks already referred to. The respective cathode resistors are so selected as to provide light self-bias to those grids when current flows only through the odd-numbered tubes and their plate resistors; and to bias those grids beyond cutoff when current flows in the even-numbered tubes, which have no plate load.

With circuit parameters as described, each trigger circuit is capable of two relatively stable operating conditions, namely, with odd-numbered tube conducting and with even-numbered tube conducting, the other tube being cut off in each instance. The idle condition of each trigger is that in which the even-numbered tube is conductive. The trigger circuits may be shifted selectively between their two relatively stable conditions by supplying voltage pulses of suitable polarity, amplitude and duration to the grid of the odd-numbered tube.

Thus, for example, if V8 is conducting and V7 is cut off, a positive going voltage pulse of adequate amplitude applied to the grid of V7 across that section of R63 between the grid and line 156 causes V7 to conduct, increasing the voltage drop across plate resistor R61. That lowers the voltage standing across R62, making the grid of V8 more negative, and reducing the current through V8. The reduction of current in V8 is greater than the current increase in V7, due to the difference in their plate circuits, as well as amplification in V8. The voltage at the common cathode is thereby reduced, effectively raising the positive potential on the grid of V7. The resulting increase of conduction through that tube further lowers the voltage on the grid of V8. As a result, V8 is sharply cut off and V7 becomes fully conducting, and the circuit is stabilized in that condition.

The positive potential that was applied to the grid of V7 may then be removed without affecting that stability. The circuit may be shifted back to its original condition by similar application of a suitable negative voltage to the grid of V7 across R63, reducing its plate current and raising the voltage at the grid of V8, which starts to conduct, producing increased voltage drop across cathode resistor R59, cutting off V7.

The time required for the circuit to stabilize after a shift to either condition is determined by the various circuit parameters, including tube capacities and various distributed capacities. Control voltage pulses whose duration at effective amplitude exceeds the stabilization time of the circuit can be used to transfer conduction between V7 and V8. The components of the differentiating circuit C45 and R63, are so chosen as to produce, from the square wave at the plate of V1, alternately positive and negative pulses of suitable duration. The effective amplitude of those pulses at the grid of V7 is readily controllable by adjustment of R63. Corresponding remarks apply to the other two trigger circuits.

Trigger pulses of given amplitude may be either effective or ineffective in transferring conduction from one tube of a trigger circuit to the other, depending upon circuit parameters. And the parameters can be controlled in such a way as to initiate or prevent transfer of conduction in one direction or the other more or less independently. For example, by increasing R62 relative to R61 and R60, the bias on the grid of V8 is made more positive, increasing the current that flows in V8 when that tube is conducting. The effective negative bias cutting off V7 is thereby increased, so that a positive pulse of greater effective amplitude is required to transfer conduction from V8 to V7. But with V8 cut off, the increased value of R62 does not appreciably affect the cathode potential and merely reduces the effective negative bias on V8, making it easier to transfer conduction back to V8, and requiring a negative pulse of lower effective amplitude for that purpose.

By such parameter adjustments the circuit is so balanced that the negative timing pulses as actually delivered from the plate of V1 to the grids of V7 and V9 are normally sufficient to shift conduction from V7 to V8 and from V9 to V10, respectively; but that the corresponding positive timing pulses (although of substantially equal amplitude and duration) are not normally sufficient to shift conduction from V8 to V7 and from V10 to V9, respectively. Those latter shifts occur only if the circuit parameters are suitably altered by means under manual control of the operator, or under suitable automatic control. However, such shifts, if and when they do occur, are in response to the positive timing pulses described, and can occur only simultaneously with those pulses. Since the means for so controlling the parameters of both the dot and the dash triggers involve, directly or indirectly, the memory trigger V3, V4, it will be convenient first to describe more fully the action and control of that trigger.

The parameters of the memory trigger circuit are so adjusted that the positive timing pulses at the grid of V3 are normally insufficient to transfer conduction from V4 to V3. Such transfer is caused, however, by a timing pulse if the circuit is sensitized, as by suitable reduction of the grid voltage of V4. And transfer of conduction from V4 to V3 may also be caused, independently of a timing signal, by further reduction of the grid of V4. (The relatively small negative pulses at the grid of V3 are insufficient to affect the memory trigger under any condition of the circuitry.)

Resistor R51, which forms part of the described voltage divider determining the potential of the grid of V4, is shunted by a circuit which includes R52 and C53 connected in parallel with each other and in series with dot contact T of grounded control lever K. If the control lever is shifted to dot position while V4 is conductive, discharged C53 is connected to ground, effectively grounding momentarily the junction of R51 and R50. That effectively removes R51 from the voltage dividing network, lowering the grid of V4 beyond cutoff and transferring conduction to V3. That action via C53 takes place independently of any timing signal at the grid of V3. As soon as the memory trigger has stabilized with V3 conductive, K may be released without affecting the trigger action. C54 is preferably connected as shown between dot contact T and ground. When ground is removed from the dot contact, C54 charges through R52 and prevents too abrupt an increase in the grid potential of V4, which might otherwise produce an undesired shift of the memory trigger. The dot signal thus remains stored as a shift of condition of the memory trigger.

If, on the other hand, K is held closed to dots, C53 rapidly becomes charged to the potential across R52. The memory trigger may then be shifted back to its idle condition with V4 conductive (as by the memory clearing circuit to be described). Continued closure of K to dots lowers the grid of V4 somewhat below its normal potential by the presence of R52 as a shunt across R51. But that, by itself, does not stop conduction through V4. To recycle the trigger via C53 in the manner described, dot contact T must be opened, at least momentarily, to allow C53 to discharge through R52, and then must be reclosed, again grounding the discharged condenser. An alternative manner of recycling the dot trigger is provided, utilizing the timing signals at the grid of V3. Continued closure of K to dots, as already stated, lowers the grid of V4 by the shunting action of R52 across R51. While that does not by itself stop conduction in V4, it provides a sufficiently negative bias that the next positive timing pulse delivered to the grid of V3 via C42 and R44 is effective to transfer conduction from V4 to V3.

The dot trigger is shifted back to idle condition only by the memory clearing circuit, comprising V11, R71, C48, lower 41A and R53. V11 is connected directly between positive bus 50 and the common cathodes of V3 and V4 of the memory trigger, so that its plate current flows through R53 (as well as through the much smaller R47). The grid of V11 is tied to ground via R71 and also via a parallel circuit through C48 and relay switch lower 41A. The junction between C48 and lower 41A is connected via R58 to a source of potential close to or above that of the cathode of V11 when conducting. In the present specific circuit such a potential is conveniently obtainable from the junction between voltage dividing resistors R55 and R56, connected in series between ground and bus 50. That connection performs a further useful function described below in connection with coupling tube V5.

When the described circuit is in equilibrium, with lower 41A either open or closed, V11 is biased well beyond cut off by the voltage across R47 and the voltage drop in R53 due to current through either V3 or V4 (whichever is conducting). If lower 41A is open, as during marking output, C48 is charged to substantially the potential standing across R56. If lower 41A is then shifted from open to closed position, as when the output circuit is shifted from marking to spacing condition, the positive side of C48 is grounded, applying a strong negative pulse to the grid of V11. That pulse is without effect, since the tube is already cut off. On the other hand, whenever the output circuit shifts from spacing to marking output, opening lower 41A, ground is removed from the junction of C48 and R58, which thereupon tends to assume the positive potential at the junction of R55 and R56. A positive pulse is thereby applied to the grid of V11, rendering the tube highly conductive for a short period, determined primarily by the time constant of C48 and R71.

The resulting current pulse through V11 and R53 momentarily raises the common cathode potential of V3 and V4. If the memory trigger is in idle condition with V4 conductive, that cathode voltage pulse is ineffective to shift conduction to V3. But if the trigger is in tripped condition with V3 conductive, the increase of cathode potential is sufficient to cut off that tube momentarily and transfer conduction to V4. The memory trigger is thus returned to idle condition whenever the output circuit shifts from spacing to marking. However, once C48 has substantially charged through R71, which typically requires only a few microseconds after the start of marking output, the grid of V11 returns substantially to ground potential, cutting off the tube. The condition of the output circuit has no further effect upon the memory trigger, which may again be tripped under control of lever K (either via C53 action or via a timing signal).

Memory coupling tube V6 is a diode, or equivalent device, with its cathode tied directly to the cathodes of V3, V4 and V11, and its plate connected directly to the grid of V8 of the dot trigger, already described. The potential of the common cathodes is so adjusted (as by voltage divider R45, R46 and R47) that when the memory trigger is idle (V4 conductive) it equals or exceeds the potential of the grid of V8 with the dot trigger idle (V8 conductive). When the dot trigger is tripped (V3 conductive through R48) the common cathode potential is lowered, due to the lower tube current through R53, and diode V6 places the grid of V8 at that lowered potential. With suitable parameters, that lowered grid potential is such as to maintain conduction in V8, but to sensitize the dot trigger in the manner described above so that the next following positive timing pulse at the grid of V7 transfers conduction from V8 to V7. Thus tripping of the memory trigger sensitizes the dot trigger via V6 so that it is tripped by the next following positive timing pulse.

Closure of control lever K to dash contact H ordinarily similarly sensitizes dash trigger (V9, V10) via coupling tube V5. The plate of V5 is connected directly to the grid of V10, and its cathode is tied to the junction of voltage dividing R55 and R56. That junction is also connected via R57 to dash contact H. Closure of grounded K to dashes therefore lowers the cathode of V5 by shunting R57 across R56. Closure of lower 41A similarly connects R58 in shunt across R56 (by the circuit already described in connection with memory clearing tube V11), further lowering the cathode of V5. With the grid of V5 suitably controlled (see below), that tube acts as a diode and transmits its lowered cathode potential to the grid of V10. The parameters are so chosen that conduction through V10 is maintained if either R57 or R58 alone is shunted across R56; but that in the presence of both shunts (with both dash contact H and lower 41A closed) the grid of V10 is lowered to a potential at which a positive timing pulse applied to the grid of V9 is effective to shift conduction from V10 to V9. In other words, the dash trigger can be tripped in response to a positive timing pulse and under control of K, but only if the output circuit is in spacing condition.

A further limitation on tripping of the dash trigger is imposed via the grid of coupling tube V5. The grid of V5 is connected via R54 to a source of potential that is responsive to the condition of the memory trigger, in such a way that when that trigger is in idle condition with V4 conductive the grid of V5 is at approximately the potential of its cathode with both R57 and R58 grounded; and that when V3 of the memory trigger is conductive the grid voltage of V5 is appreciably lowered. A convenient source of such potential is the junction between suitably selected R50 and R51 in the voltage divider already described as controlling the grid voltage of V4. With that connection, as shown in Fig. 8, V5 is conductive and acts as a low resistance polarized connection to the grid of V10 when the memory trigger is idle. But when the memory trigger is tripped to store a dot signal, V5 is biased beyond cutoff, effectively isolating V10 and the dash trigger from control by dash contact H. Thus the dash trigger can be tripped only when no dot signal is stored in the memory trigger.

Finally, a coupling connection is provided between the dash and dot triggers such that return of the dash trigger to idle condition trips the dot trigger. As shown in Fig. 8, that coupling action is performed by C47, which is connected between the plate of V9 and the grid of V7. Shift of conduction from V9 to V10 in the dash trigger (caused by a negative timing pulse via C46 at the grid of V9) sharply raises the plate voltage of V9. A positive going voltage pulse is therefore transmitted via C47 to the grid of V7. Parameters are so adjusted that that positive pulse overcomes the substantially simultaneously negative timing pulse reaching the grid via C45, and is sufficient to transfer conduction from V8 to V7 even in the presence of that timing pulse, and regardless of whether the grid of V8 is lowered via V6 or not.

The performance of the system follows from the above description. For example, with the system in idle condition, to produce a single dot, control lever K is momentarily closed to dot contact T, grounding C53 and applying a negative pulse to the grid of V4 and shifting conduction to V3. A dot signal is thereby stored in the dot memory trigger. That dot signal is made effective by means of the lowered common cathode potential of V3 and V4 (due to reduced current through R53) which is transmitted via V6 to the grid of V8, sensitizing the dot trigger so that the next positive timing pulse arriving from the timing base at the grid of V7 will trip that trigger. At the same time, conduction through V3 and R48 lowers the potential at the junction of R50 and R51, biasing the grid of V5 beyond cutoff and isolating dash contact H from its normal control over the dash trigger via V5 and the grid of V10.

When the dot trigger is tripped, rendering V7 conductive, the abrupt drop in plate voltage of V7 is transmitted via R70, differentiated by C49 and R72, and applied as a negative pulse of relatively long duration at the grid of V12, cutting off that tube and de-actuating Ry41. Switch 41A is thereby shifted to upper position (as shown), closing upper 41A for marking output. Opening of lower 41A removes ground from C48 and applies a positive going voltage pulse to the grid of V11. The resulting current pulse in V11 momentarily raises the cathode of V3, cutting off that tube and shifting the memory trigger back to idle condition. That return of the memory trigger to idle condition permits the grid of V8 to resume its normal potential; but that does not prevent the described tripping of the dot trigger. That trigger has already become stabilized in tripped condition before the memory trigger is cleared via V11, particularly since the latter action involves the relatively slow mechanical movement of relay switch 41A.

Return of the memory trigger to idle condition restores operating bias to the grid of V5, but dash initiation is still prevented by open lower 41A, which prevents R58 from shunting R56. As already stated, shunting action of R57 is insufficient by itself to sensitize the dash trigger via V5.

The dot trigger remains in tripped condition for just one baud, at the end of which a negative timing pulse at the grid of V7 transfers conduction back to V8. A positive pulse is thereby transmitted from the plate of V7 via R70 and C49 to the grid of V12, restoring actuating current through Ry41 and shifting the output to spacing by opening of upper 41A. Simultaneous closing of lower 41A applies R58 across R56, restoring control of the dash trigger to control lever K. The dot is automatically completed by one baud of spacing, which necessarily continues at least until the next positive timing pulse.

A second dot can be produced by opening dot contact T after the signal for the first dot has been stored in the memory trigger, and then closing the dot contact again at any time after the start of the first dot (which clears the memory trigger of the first dot signal) and before the positive timing pulse that is to start the second dot. The action of the system is then the same for the second dot as for the first.

A second dot is ordinarily and preferably produced simply by holding K closed to dots, after signalling the first dot, until the marking pulse for the second dot appears at the dot trigger. R51 thereby remains shunted by R52, lowering the grid of V4 sufficiently that a positive pulse at the grid of V3 will trip the memory trigger. When the memory circuit is so recycled by a positive timing pulse at the grid of V3, it acts (as already described) to sensitize the dot trigger via V6 before the simultaneous positive timing pulse at the grid of V7 has died away. That timing pulse transfers conduction from V8 to V7, starting dot marking. The resultant opening of lower 41A clears the memory trigger (in the manner already described) after it has been tripped for only a few microseconds.

In such a recycling operation for production of successive dots the memory circuit does not perform effectively its usual memory functions, but acts primarily as a coupling device between control lever K and the dot trigger. The system behaves as if no dot memory were present. A series of dots may therefore be terminated by opening dot contact T at any time after marking starts for the last dot desired and before the positive timing signal that would start marking for the next following dot.

To produce a dash, K is closed to dashes and held in that position until the positive timing pulse at which the dash is to start. At that time lower 41A is always closed (for spacing output) and the dot memory trigger is in idle condition (all signalled dots having been completed). Therefore tube V5 is operative and transmits its reduced cathode potential, lowered by grounding of both R57 and R58, to the grid of V10, so sensitizing the dash trigger that it is tripped by the positive timing pulse. The resulting current through V9 and R65 lowers the plate of V9 and transmits a negative pulse via R69 and C49 to the grid of V12, shifting the output to marking in the manner already described for dot marking. A negative pulse is simultaneously transmitted from the plate of V9 via C47 to the grid of V7, but is ineffective, since V7 is already cut off. The current pulse through V11, caused by opening of lower 41A is also ineffective, since the memory trigger is already idle. However, opening of lower 41A opens R58, making it impossible again to trip the dash trigger so long as marking output continues.

One baud after the start of marking, a negative timing pulse arrives at the grid of V9 and transfers conduction back to V10 clearing the dash trigger. A large positive pulse is thereby applied from the plate of V9 via C47 to the grid of V7, tripping the dot trigger (in spite of the negative timing pulse). That action is so nearly simultaneous with the clearing of the dash trigger that the negative wave from the plate of V7 via R70 and the positive wave from the plate of V9 via R69 substantially cancel, leaving the charge on C49 and the negative bias at the grid of V12 substantially unchanged. Marking output therefore continues, the dot trigger effectively taking over control from the dash trigger when the latter becomes idle.

The dot trigger remains tripped for a full keying cycle, until another negative timing pulse arrives at the grid of V7, transferring conduction back to V8. The resulting positive pulse via R70 makes V12 again conductive, shifting the output back to spacing after three bauds of marking. Completion of the dash by one baud of spacing is insured, since neither dot nor dash trigger can be tripped again until the next positive timing pulse. If K is closed to dashes at the time of that pulse, another dash is produced.

Fig. 20 (E) illustrates diagrammatically the sequence of trigger action for dash production that has just been described. It will be noted that the dot trigger is there represented as being tripped only after the dash trigger has returned to idle condition, corresponding to tripping of the dot trigger by virtue of clearing of the dash trigger. (Compare (F) and (G) of Fig. 20, described below.)

To generate a dash followed by a dot, the dash is initiated as described. Immediately after tripping of the dash trigger, control lever K may be shifted to dot position to trip the memory trigger by C53 action. In practice, with suitable choice of C48 and R71, the positive pulse at the memory trigger cathodes, generated by V11 upon commencement of dash marking, will have decayed sufficiently during travel time of K that it is ineffective to prevent tripping of the trigger. The memory trigger will remain tripped, storing the dot signal, throughout the dash that is in progress. Although the dot trigger is sensitized throughout that period by lowering of the grid of V8 via V6, that action does not affect completion of the dash. The first positive timing pulse, after two bauds of dash marking, finds the dot trigger already in tripped condition (due to described action via C47). The second positive timing pulse, at the end of the dash spacing period, finds the dot trigger idle but still sensitized, and therefore trips it, starting the signalled dot. The start of dot marking clears the memory circuit via V11.

If a second dash is to be added, as for a letter "K," the control lever may be returned to dash position immediately after tripping the dot memory (which is substantially instantaneous) and held there throughout the first dash, the dot, and until the start of the second dash, and may then be released. Production of other character sequences will be understood from the described action of the system.

The interaction of the various sections of Fig. 8 may be understood more readily from the block diagram of Fig. 8A. That diagram further illustrates that the system as a whole may be considered as generating a continuous periodic function, here typified by the square wave from the time base, differentiating that function to obtain effectively instantaneous timing signals, and reintegrating the timing signals under selective control to obtain code signals. The control, as here typified, is of two types, involving selection of whether an integrating action is to take place or not, and selection of the type of integration (i. e., the type of signal to be produced). That view of the action of the system, particularly appropriate with respect to Fig. 8, is also applicable to other embodiments of the invention.

Fig. 9 illustrates a preferred manner of modifying the system of Fig. 8 for direct tone output instead of open and closed relay switching for control of associated equipment. Fig. 9 also illustrates a typical manner of replacing Ry41 of Fig. 8 by tube-controlled output circuit means, providing an all-electronic system. It will be understood that a corresponding modification may be made in other illustrative systems described herein. The fragmentary system of Fig. 9 is connected to power bus 50 and ground line 158 of Fig. 8, as well as at the points $x$ and $y$ as clearly indicated in the figures, and replaces output tube V12, R72, Ry41 and relay switch 41A of Fig. 8.

In Fig. 9, tube V12$a$ is operated as a cathode follower, with cathode resistor R75 taking the place of plate load Ry41 of Fig. 8. In idle condition of the system, V12$a$ is given positive operating bias by connection of its grid via R72$a$ to the junction of voltage dividing resistors R73 and R74. R75 serves also as cathode biasing resistor for V13, which is connected in a conventional type of oscillator circuit having a suitable audio frequency. In the typical circuit illustrated, the grid of V13 is connected to ground via R76 and to the tube cathode via blocking condenser C56 and a resonant circuit comprising C164 and winding 164 of transformer 166. The primary winding 168 of the transformer is connected between the plate of V13 and power bus 50, while the secondary 170 is connected across output lines 42$a$ and grounded 41$a$.

With V12$a$ conductive, the voltage drop in R75 biases V13 beyond cutoff, giving spacing output. When a negative voltage pulse arrives at the grid of V12$a$ via connection $y$ from C49 of the system of Fig. 8, due to the described action of that system, V12 is cut off, reducing the cathode potential of V13 until that tube becomes conductive, initiating oscillation at the resonance frequency of C164 and winding 164. The resulting tone output from the secondary of transformer 166 constitutes marking output at 41*a*, 42*a*, and may be transmitted via blocking condenser C156 to any connected device, with or without rectification.

Rectifying tube V14 has its plate connected to the ungrounded side of the transformer secondary, and its cathode, shunted by filtering condenser C57, to the point *x* of Fig. 8, functionally replacing relay switch lower 41A. When oscillator tube V13 is cut off for spacing ouput, V14 effectively opens the circuit via *x*. For use with the modification of Fig. 9, R55, R56 and R57 of Fig. 8 are so chosen that the dash trigger is sensitized (in the sense already discussed) by closure of H when V13 of Fig. 9 is so cut off (that condition corresponding to closure of lower 41A in Fig. 8). For example, R56 may be made equal, for use with Fig. 9, to the equivalent resistance of parallel connected R56 and R58 as used in the system of Fig. 8. Whenever V13 is set in oscillation for marking output, a positive voltage is applied from V14 via connection *x* and R58 of Fig. 8 to the cathode of V5, raising the potential of the latter to such a value that grounding of Ry57 at dash contact H cannot sensitize the dash trigger. That condition therefore corresponds to the condition of the system of Fig. 8 with lower 41A open (for marking).

The positive voltage delivered via lead *x* during marking output is differentiated by C48 and R71 and applied as a positive pulse to the grid of V11. That voltage pulse corresponds to the described pulse delivered to the grid of V11 upon opening of lower 41A in the system of Fig. 8, and performs the same described function of clearing the dot memory circuit at the start of dot marking. A slight time delay, corresponding to that required for mechanical movement of Ry41 in Fig. 8, is provided in Fig. 9 by the charging of C57 through the resistance of rectifier V14. Hence, as already described, the memory circuit is not cleared before the dot trigger is stabilized in tripped condition. Peak alternating current amplitude across winding 170 is made great enough so that an adequate pulse amplitude is delivered via C48 to V11 even from the sloping wave front that is generated across C57 in providing the required delay action.

Fig. 10 illustrates a typical manner in which relays may be combined with vacuum tubes in a system of the general type described. The fragmentary system of Fig. 10 may be substituted for that portion of the preferred system designated in Fig. 8 as the "dot memory" circuitry, including trigger V3, V4 and coupling tubes V5 and V6 and their directly associated circuitry. Memory trigger V3, V4, is replaced by memory relay Ry45 of Fig. 10, which is connected as plate resistor of tube V15. The cathode of V15 is connected via R80 and R81 in series to dot contact T of grounded control lever K. R80 and R81 are so chosen that, with K closed to dots, R80 alone provides operating bias for V15, with its grid grounded via R82; but that R80 and R81 together bias V15 to a current below the actuating value of Ry45. R81 is shunted by two parallel circuits, one through C58 and one through normally open relay switch lower 45B. A connection from the grid of V15 leads directly to C42 of Fig. 8, which is repeated for clarity in Fig. 10, and via that condenser to the common cathodes of time base multivibrator V1 and V2. The cathode of V15 has a further connection via C59 to the junction of voltage dividing R85 and R86, and to lower 41A of Fig. 8, which is also repeated for clarity in Fig. 10. The latter connection performs a function analogous to that of C48, V11 and associated circuitry in the system of Fig. 8.

In the modification shown in Fig. 10, dash control contact H is connected via upper 45A and R83 to the grid of V10 of Fig. 8, that connection taking the place of coupling tube V5 and associated circuitry. A connection is also provided from ground via lower 45C and R84 to the grid of V8, taking the place of coupling tube V6 and associated circuitry of Fig. 8. The remainder of Fig. 8 may remain substantially or entirely unchanged, or may be independently modified, for example in the manner already described and illustrated in Fig. 9.

The overall operation of Fig. 8 is not significantly affected by the modification shown in Fig. 10, the modified memory circuit performing entirely analogous functions. Closure of K to dots causes charging current to flow into C58 through V15 and Ry45, actuating the relay. The resulting closure of 45B applies ground to the junction of R80 and R81, establishing a continuous current through V15 and the relay, holding the relay actuated. This is the tripped memory condition, corresponding to conduction through V13 of Fig. 8.

Actuation of Ry45 opens 45A, isolating dash contact H (see below). Actuation of Ry45 also closes 45C, applying ground to R84 and thereby lowering the voltage at the grid of V8 (Fig. 8), sensitizing the dot trigger for dot initiation at the next positive timing pulse at the grid of V7, as already described for Fig. 8. That tripping of the dot trigger shifts the output relay to marking, opening lower 41A. Charging current through R85, C59 and R80 in series, momentarily biases the tube beyond cutoff, opening the memory relay and returning the memory circuit to idle condition with lower 45B open. The voltage at the junction of R85, R86, the value of R80 are so adjusted that the described memory clearing action occurs, but that the reverse polarity pulse on closure of 41A is insufficient to recycle the memory relay.

Continued closure of K to dots provides a conduction path to ground through V15, R80 and R81 of such resistance as to prevent conduction through V15 sufficient to reactuate Ry45. However, the next positive pulse delivered from the cathodes of V1, V2 (Fig. 8) via C42 to the grid of V15 increases conduction through V15, reactuating Ry45 for successive dot production. With the circuit shown, Ry45 must respond rapidly, so that 45C will close and sensitize the dot trigger before the positive timing pulse at the grid of V7 has decayed too far, since simultaneous timing pulses are utilized to trip the memory relay via C42 and to trip the sensitized dot trigger. In the system of Fig. 8, a corresponding condition applies, but requires no special consideration since the response of the memory trigger circuit V3, V4 is inherently very fast.

Closure of control lever K to dash contact H, provided Ry45 is not actuated, applies ground via closed 45A to R83, lowering the voltage at the grid of V10 of Fig. 8, sensitizing the dash trigger. Arrival of a positive timing pulse at the grid of V9 while K is thus closed to dashes trips the dash trigger as already described, initiating a dash. However, if the memory circuit has been tripped by actuation of Ry45 and has not yet been cleared by the start of the signalled dot, the dash trigger is isolated at open 45A from control lever K, and no dash can be initiated until completion of the signalled dot. Release of Ry45 is slow enough that closure of 45A upon clearing of the memory circuit occurs only after the positive timing pulse (that initiated the signalled dot) has substantially decayed. That delay, inherent in the release action of the relay (in spite of its relatively rapid actuation, mentioned above) functionally replaces the opening of lower 41A in the system of Fig. 8 and the positive voltage generated by V14 in the modification of Fig. 9. In those systems, as already described, dash control is disabled not only during storage of a dot signal, but throughout the marking period of the stored dot. In the system of Fig. 10, isolation of dash contact H continues only a few microseconds into the period of dot marking, due to relay release time.

Fig. 11 shows a further embodiment of the invention, which illustrates another type of trigger circuit for the dot and dash triggers. Also illustrated in Fig. 11 is an alternative type of sequencing for dash production.

The time base circuitry of Fig. 11 comprises V1, V2, C1, R8, R9 and R41, and operates in the manner already described in connection with Figs. 2 and 8. A voltage timing wave of substantially square wave form (Fig. 3A) is taken from the plate of V1 and utilized to control V22 as will be described.

The system of Fig. 11 includes dot memory circuitry, illustratively shown in a form similar to that in Fig. 10, the description of which will not be repeated. In both instances a dot signal is stored by actuation of Ry45, which is maintained by a holding circuit via 45B until cleared by a positive pulse delivered at the cathode of V15 via C59. That positive pulse is generated in Fig. 10 as a result of opening of lower 41A when the output circuit starts marking; and in Fig. 11 as a result of opening of upper 51A at the start of marking (see below). Positive voltage is obtained in Fig. 10 from a voltage divider R85, R86, and in Fig. 11 from a voltage divider comprising R101, R102 and R103 (see below).

The series of positive going voltage timing pulses at the grid of V15, required for the described recycling of the memory circuit for repeated dot production, is obtained in Fig. 11 from the plate of V1, rather than from the common cathodes of V1 and V2 as in Fig. 10. For that purpose, the square wave at the plate of V1 is differentiated to yield a series of alternately positive and negative timing pulses, and that series of pulses is passed through a coupling device that will pass only the positive pulses. As illustratively shown, that coupling device comprises a diode V16 having its plate connected to the junction of C64 and R90, which differentiates the square timing wave standing across R41. The cathode of V16 is connected to the junction of the grid of V15 and its grid resistor R82. A negative timing pulse at the plate of V16 is not transmitted to the grid of V15. On a positive pulse at the plate of V16, the diode conducts and the pulse appears across R82 with a pulse duration determined by R82 and R90 in parallel. The resulting positive voltage pulse at the grid of V15 increases the tube current sufficiently to actuate Ry45 if dot contact T is grounded by K, thus acting to recycle the memory circuit, as already described for Fig. 10.

The final output of the system of Fig. 11 is controlled by relay Ry51, output lines 40 and 42 being connected by lower 51A on relay actuation for marking, and opened upon relay deactuation for spacing. Thus, the relay is unactuated in idle condition of the system, in contrast to some previously described embodiments. Ry51 is connected between positive bus 50 and the plate of V22, the cathode of which is connected via R96 to the junction of voltage dividing R97 and R98, series connected between bus 50 and grounded line 158. The grid of V22 is connected via current limiting resistor R91 to the plate of V1 of the timing multivibrator, from which it receives a voltage square wave of adjustable period representing one keying cycle of the code produced by the system. Parameters are so adjusted that, on negative swings of that timing voltage wave, V22 is biased beyond cutoff; and that on positive swings V22 is given slightly positive operating bias. However, in idle condition of the system, the current through Ry51 and V22 is limited by R96 to a value which can neither actuate Ry51 nor maintain its actuation.

V17 and V18 are typically shown as hot cathode gas triodes, although other types of tube may be used alternatively, such for example, as cold cathode gas discharge tubes employing a starter gap. An important characteristic of such tubes is that initiation of conduction is controlled by the grid (or starter anode) voltage with respect to the cathode, while termination of conduction is controlled by the plate voltage. Conduction will not initiate until the grid (or starter anode) is elevated with respect to the cathode from a lower or negative idle potential which prevents initial ionization. Once initiated, conduction continues independently of the grid voltage until plate potential is removed or lowered below a critical value.

V17 is connected in parallel with R96 between the cathode of V22 and the junction of R97 and R98. R98 is shunted by R99 via normally open switch 45C of the memory relay. The grid of V17 is connected to the movable contact of potentiometer R100, one end of which is connected via C66 to the cathode of V22, and the other end of which is tied to the junction of R102 and R103, which form part of voltage divider R101, R102, R103 between bus 50 and ground. The junction of R101 and R102 is connected via upper 51A to ground, so that the grid of V17 is effectively at ground potential during spacing output, but is at a predetermined positive potential during marking output when Ry51 is actuated. That positive grid potential is so adjusted that even with the cathode lowered by closure of 45C, the resulting net grid bias of V17 normally prevents ionization of the tube.

V18 is connected between the plate of V22 and the junction of voltage dividing R104 and R105, thus providing a circuit in parallel with V22 for current through Ry51. R105 is shunted via a control circuit which includes R109, normally closed switch 45A of the memory relay, and dash contact H of grounded control lever K. The grid of V18 is tied to the movable contact of potentiometer R106, one end of which is connected via C67 to the cathode of V22, and the other end to the junction of voltage dividing R107 and R108.

In idle condition of the system, the square wave supplied to the grid of V22 is reproduced across R96. That replica of the timing wave is differentiated by C66 and R100 and applied as a series of alternately positive and negative pulses to the grid of V17; and by C67 and R106 to the grid of V18. However, the junction of R97 and R98 normally holds the cathode of V17 positive with respect to its grid (grounded via upper 51A); and the junction of R104 and R105 normally holds the cathode of V18 more positive than its grid potential, which is determined by R107, R108. The peak amplitudes of the positive going timing pulses at the grids of V17 and V18 (adjustable by R100 and R106, respectively) are insufficient to initiate conduction in those tubes with the system idle. But those same pulses will initiate ionization of the gas in V17 either when its cathode is lowered by closure of 45C or when its grid potential is raised above idle condition by opening of upper 51A during marking output; and in V18 when its cathode potential is lowered by closure of K to dashes (with 45A closed). Spurious ionization in V17 or V18 as a result of inductive kick from the coil of Ry51 is prevented by C68, connected between the plate of V22 and ground.

Once conduction has been established in either of the gas tubes, it is not stopped by any change that occurs in grid-cathode potential alone. However, when V22 is cut off by the negative swing of the timing wave, the plate voltage of V17 is reduced substantially to zero, terminating conduction in that tube. The plate voltage of V18 is not directly affected by the state of conduction in V22, but is indirectly reduced with increasing current through that tube, due to the voltage drop across Ry51. Parameters are so adjusted that conduction is maintained in V18 whenever V17 is non-conducting, but that with V17 conductive the total current drawn through Ry51 and V22 by V17 and R96 lowers the plate of V18 substantially to or below its cathode potential (even though R105 may still be shunted via dash control contact H), terminating conduction in V18.

For dot production, control lever K is closed to dot contact T, actuating dot memory relay Ry45 in the manner already described in connection with Fig. 10. The resulting closure of 45C sensitizes dot memory trigger tube V17. The next positive pulse delivered via C66 at the grid of V17, coming necessarily at the start of a period of conduction in V22, initiates conduction in V17. The resulting current through Ry51 and V22, added to the current drawn by R96, actuates Ry51, shifting the output circuit to marking condition by closure of lower 51A. After one baud of marking, the negative swing of the timing wave cuts off V22, deactuating Ry51 to end marking output, and also returning V17 to its non-conductive idle condition.

Successive dots are produced under control of the memory circuit in substantially the same manner, recycling of the memory circuit resulting via V15 in response to positive timing signals during continued closure of K to dots.

Closure of K to dash contact H sensitizes dash trigger V18 (provided a dot signal is not in storage with 45A open) by lowering the cathode potential. The next positive timing pulse at the grid of V18 fires the tube, drawing current directly through Ry51, independently of V22 and V16, to actuate the relay and start marking output at lower 51A. The simultaneous opening of upper 51A removes ground from the junction of R101 and R102, establishing a positive potential at the junction of R102 and R103 and reducing the negative bias at the grid of V17. The action sensitizes the dot trigger, but has no immediate further effect, since the positive timing pulse at the grid of V17 has substantially decayed before Ry51 can respond mechanically to the conduction that was produced in V18 by the same timing pulse. The ensuing negative swing of the timing voltage cuts off V22, but has no effect on V18; and the negative timing pulses at the grids of the gas tubes are ineffective. The next positive timing pulse, however, after one keying cycle of marking, fires V17, which draws current through V22 (now again conductive) and Ry51. That current not only maintains relay actuation, but produces in Ry51 sufficient voltage drop to stop conduction in V18. Marking continues for one baud, when it is terminated by the negative swing of the timing wave, which cuts off V22 and thereby ends conduction in V17, just as at the termination of dot marking, already described.

The combined tube and relay memory system of Fig. 11 may be replaced, for example, by an all electronic memory system of the type shown in Fig. 8. In such a combination the relay switches 45C and 45A, by which the memory system in Fig. 11 controls the cathode potentials of V17 and V18, may be functionally replaced by a suitable type of electronic switch. For example, R97 and R104 may be replaced by vacuum tubes whose grid bias, and hence internal resistance, is shiftable under control of the electronic memory circuit. Such control corresponds in many respects to the control of the grid bias of V8 and V10 in Fig. 8 by the electronic memory circuit of that system.

A timing multivibrator of the type shown at V1, V2 in Fig. 8, for example, may tend to produce a square wave in which the ratio of duration of the positive to the negative swings tends to decrease as the keying speed is increased, by reduction of R9. In keying systems that employ an electromagnetic output relay that tendency can be compensated by operating the relay in such a way that it is deactuated for marking output and actuated for spacing output, as is true of Ry41 in the system of Fig. 8, for example. The relay then tends to produce a heavier mark to space ratio as the operating speed is increased, opposing the described tendency of the timing device. By suitable selection and adjustment of the relay, substantially complete compensation is obtained in practice.

Where a relay is not employed in the output circuit, as in Fig. 9, for example, compensation may be obtained, with a timing multivibrator of the type described, by coupling variable resistor R9, which controls the keying speed, to variable resistor R8, which controls the ratio of duration of the positive and negative swings (see above, in connection with Fig. 2). The required coupling, indicated schematically by the dashed line 179 in the timing circuit of Figs. 11 and 13, is such that as the resistance of R9 is reduced, increasing the keying speed, the resistance of R8 is simultaneously reduced, tending to increase the relative duration of the positive swing of the timing output. The ratio of change in R8 and R9 is so selected that the latter effect approximately compensates for the inherent tendency of the circuit to produce relatively shorter positive swings with higher frequency of operation. Such coupling of R9 and R8 is preferably employed in a system modified in accordance with Fig. 9, for example, in which no electromagnetic relay is required in the output circuit; and also in such a system as that of Fig. 11, in which an output relay is used, but is preferably arranged, because of the nature of the system, to be actuated for marking output. In such a system as that of Fig. 11, the ratio of movement of R9 and R8 may be selected to compensate for the parallel tendencies of the multivibrator and relay to give a higher mark to space ratio with increasing speed.

In the system of Fig. 13 to be described, such coupling of R9 and R8 may also be useful. As will be explained in detail, Ry76, which may be considered part of the time base circuitry, and output relays Ry71 and Ry72 are all operated in the direction of actuation for marking, and hence tend to reinforce the effect of the multivibrator if not compensated. That is not true, however, in the system of Fig. 2, for example, where output Ry11 is actuated, but timing Ry10 is deactuated for marking. In such a system the net effect of the two opposed relays may be made appreciable, and may compensate, at least to some degree, the effect of the timing multivibrator.

It may be emphasized that all of the immediately preceding discussion of means for preserving a constant mark to space ratio as the keying speed is varied concerns what may be called a secondary effect. Even without such compensation as has been described, the change of mark to space ratio is small within any moderate range of keying speeds, and the discussion is of practical importance primarily when a very wide range of speeds is desired with maximum convenience of adjustment.

Figs. 12 and 13 represent schematically two illustrative systems which provide both primary dot and primary dash memory, and illustrate additional typical circuit techniques for operating the dot and dash triggers and for insuring correct sequencing in the action of the two memory circuits.

In Fig. 12 dot marking is controlled by a dot trigger comprising Ry61, and dash marking is started by a dash trigger comprising Ry62 and is completed by Ry61. Dot memory is performed by a trigger comprising Ry63, while Ry64 performs a parallel function in dash memory. Ry65 controls sequencing of the memory functions. Ry61, Ry62, Ry63 and Ry64 are connected to positive bus 50 via R111, R112, R113 and R114, respectively; and to ground via R121, R122, R123 and R124, respectively, relay switch upper 61A being inserted between R122 and ground. Ry65 is connected directly to bus 50 and via R125 to ground. The resistances are so selected as to limit normal current through each relay circuit to a value that will hold the relay, once it is actuated, but will not cause actuation. A relay in idle condition with such a steady current in a circuit including impedance to ground can be actuated by momentarily applying a low impedance shunt between its negative terminal and ground; and may deactuated by applying a similar shunt either between its positive terminal and ground or between its negative terminal and positive bus 50.

As shown in Fig. 12, the free-running time base is controlled by a cam 124 driven by a variable speed motor 126, shown as a direct current series motor. The motor speed is controllable by a variable resistance R110 in the motor circuit, which is connected to any suitable current source, shown as the battery B of the system itself. The timing mechanism is similar in some respects to that of Figs. 6 and 7, but includes two electrically independent sets of marking contacts M1 and M2, which are adjusted for simultaneous momentary closure by cam-actuated spring fingers 171 and 172, respectively, once during each cam revolution. A single timing contact S is arranged to be closed momentarily by grounded spring finger 174 at a cam position about midway between successive closures of M1 and M2, the exact relative timing being preferably adjustable, for control of the output mark to space ratio, as by mounting contact S and finger 174 on a plate 176 rotatably adjustable about the cam shaft 170.

Grounded control lever K is shiftable to ground dot contact T and dash contact H selectively. Dot contact T is connected via upper 65A to spring finger 171, via lower 63A to ground, and via parallel-connected R115 and C73 to the negative terminal of dot memory Ry63. Dash contact H is connected directly to spring finger 172, via lower 64A to ground, and via parallel-connected R116 and C74 to the negative terminal of dash memory Ry64. Timing contact M1 is connected directly to the negative terminal of dot trigger Ry61 and via lower 62B to timing contact S. Timing contact M2 is connected directly to the negative terminal of dash trigger Ry62, with by-pass connection to ground via C75.

The described connections provide actuating circuits of two types for dot trigger Ry61. That relay is actuated for dot production upon closure of M1 if Ry15 is unactuated and if either T or lower 63A is closed; and is actuated during dash production by closure of S, lower 62B being closed. Dash trigger Ry62 is actuated for dash production by closure of M2 if either H or lower 64A is closed. Marking output over lines 40, 42 results from actuation of either Ry61 or Ry62 by closure of lower 61A or lower 62A, respectively.

The described connections also provide actuation of the dot and dash memory triggers upon initial closure of T and H, respectively, via circuits which do not reactuate the memory triggers upon continued closure of the respective control contacts. R115 is of such value that R115 and R123 in parallel do not provide sufficient current to actuate Ry63. In idle condition of the circuit, C73 is discharged by R115 and, upon initial closure of T to signal a dot, charges through Ry63 and R113, providing momentarily a low impedance path to ground. Ry63 is thus actuated, and is held by the steady current through R123 and, incidentally, through R115 and closed lower 63A. Closure of the latter switch performs primarily the memory function of holding ground on finger 171, by which a dot signal, stored by actuation of Ry63, is made effective independently of continued closure of T. Similarly, initial closure of H draws charging current for discharged C74 through Ry64 and R114, actuating Ry64 to store a dash signal. That storing is made effective by closure of lower 64A, which holds ground on finger 172 until closure M2 initiates the dash by actuation of Ry62.

Alternatively, the memory relays Ry63 and Ry64 may depend entirely for holding action upon the holding circuits through R115, 63A and R116, 64A, respectively, R123 and R124 being omitted from the system as shown in Fig. 12. R115 and R116 are then reduced in value sufficiently to provide adequate holding, but are still large enough to prevent re-actuation of the relays in response to continued closure of K. The circuit as illustrated, and including R123 and R124, offers the advantages that the memory relays can be made to respond to very brief closure of control lever K, and that somewhat more latitude is permitted in the circuit constants of the relay deactuating circuit via C76 (to be described).

Dot trigger Ry61 is deactuated by the short circuit that is caused by closure of S unless upper 62B is open (as it is during the first baud of dash marking). Dash trigger Ry62 is deactuated by opening of its holding circuit at upper 61A. That occurs at the end of the first baud of dash marking when Ry61 is actuated via closed lower 62B and timing contact S. That sequence is illustrated in Fig. 20(G), where actuation of the dot trigger is shown to precede deactuation of the dash trigger. C75 maintains actuation of Ry62 just long enough after the actual opening of upper 61A to insure full actuating armature travel of Ry61 before lower 62B opens, and to maintain marking at 62A till lower 61A closes.

The memory triggers Ry63 and Ry64 are cleared by application of discharged C76 between the positive terminals of the respective relays and ground. That occurs in each instance at the start of marking of the signalled character. During spacing output (Ry61 and Ry62 deactuated) C76 is shorted via upper 61B and upper 62C. Shifting of Ry61 to actuated condition at the start of dot marking applies discharged C76 via lower 61B between ground and the positive terminal of Ry63, shorting and deactuating the dot memory relay. Similarly, actuation of Ry62 at the start of dash marking applies discharged C76 via lower 62C and upper 61B (not yet opened by actuation of Ry61 via lower 62B) between ground and the positive terminal of Ry64, clearing the dash memory.

If a dot signal is in storage in Ry63 during dash production, that dot signal is not lost by actuation of the dot trigger at the second baud of dash marking. Such actuation of Ry61 applies C76 across Ry63 (as at the start of dot marking) but C76 is already charged to junction potential of Ry64, R114 (by the closure of lower 62C at the start of the dash), and has no effect on the junction of Ry63, R113. Moreover, the delay caused by C75 in the deactuation of Ry62 insures that upper 62C cannot close in time to again discharge C76 before 61B shifts to lower position.

C76 is preferably considerably larger than C73 and C74. R113 and R114 can then be smaller than R123 and R124, and do not interfere with the described actuating pulses drawn by C73 and C74. The negative terminals of Ry61 and of Ry63 are preferably approximately equi-potential points under idle conditions of the system, and the same applies to the negative terminals of Ry62 and Ry64. The idle condition making and breaking of timing contacts M1 and M2 then has no deleterious effect. In the system as shown in Fig. 12, limited current is drawn by timing contact S even in idle condition of the system. That can be prevented if desired by introducing between upper 62B and the junction of Ry61, R111 a normally open relay switch of following type controlled by Ry61. Such a switch will be closed whenever S is required to deactuate Ry61, and will not affect other functions of S.

Sequencing relay Ry65 is actuated whenever a dash signal is stored in absence of storage of a preceding dot signal. When so actuated, it acts to insure that the next character produced will be a dash. If a dot signal is stored first, later storage of a dash signal fails to actuate Ry65, and the system then automatically produces the signalled dot first, followed by the dash.

That sequencing control is accomplished in the present embodiment by very simple means. Ry65 is connected as already described in series with R125, which provides steady holding current. An actuating circuit from the junction of Ry65, R125 to ground via lower 64B and upper 63B shorts R125 and actuates Ry65 whenever Ry64 is actuated and Ry63 is deactuated (whenever a dash signal is stored in absence of a stored dot signal). A connection from the junction of Ry65, R125 via upper 64B to positive bus 50 shorts and deactuates Ry65 upon deactuation of Ry64 (upon the start of actual production of the stored dash). The sequence control by Ry65 is carried out entirely through the single switch 65A, already described, between M1 and ground. It may be noted in passing that the two relay switches upper 63B, in the actuating circuit of Ry65, and lower 63A, in the holding circuit of cam finger 171, although shown as separate armatures for clarity of illustration, may utilize a single double throw armature of Ry63.

The operation of the system of Fig. 12 will be fully understood from two examples of typical character sequences, dash-dot as in the letter "N," and dot-dash as in the letter "A." If a dash is signalled first, with no dot in storage, momentary closure of H charges C74, actuating dash memory Ry64. That not only closes lower 64A, holding ground on finger 172 and thus making effective the dash signal, but also closes lower 64B, actuating Ry65 via 63B (which is still closed since no dot has been stored). Ry65 is held by steady current through R125, and will not be deactuated by opening of 63B. As will appear, Ry65 controls the sequence in which characters are produced. When actuated, Ry65 insures that the next character will be a dash rather than a dot.

A dot may now be signalled, even before the start of marking for the previously signalled dash, by momentary closure of T. That charges C73 through Ry63, actuating the dot memory relay, which is held by closure of lower 63A, storing the dot signal. However, neither the closing of 63A nor the momentary closure of T can ground finger 171, since 65A is open. Therefore the next cam-actuated closure of timing contacts M1 and M2 finds finger 171 open and only finger 172 grounded. The result is actuation of dash trigger Ry62 via M2 and closed 64A, initiating production of a dash, the first-signalled character. Dash marking is started by closure of lower 62A, and the dash memory is cleared by shifting of 62C to lower position, which applies discharged C76 across Ry64 and R124. The simultaneous closure of lower 62B prepares the actuating circuit for Ry61 via S.

Deactuation of dash memory Ry64 shifts 64B to upper position, shorting and deactuating Ry65, thus returning the sequence control to idle condition, in accordance with the absence of a stored dash signal. Switch 65A is thus shifted to closed position, establishing an actuating circuit for Ry61 via M1 for production of a dot as the next character. That closure of 65A ordinarily takes place only after M1 has reopened and so does not actuate Ry61 immediately. With very fast relays, however, and relatively slow keying speeds there may be a possibility that the triple relay sequence (Ry62, Ry64, Ry65) may respond to closure of M2 before M1 has reopened. That possibility can be prevented, for example, by inserting between upper 64B and bus 50 a normally closed relay switch (say, upper 62D) controlled by Ry62. Ry65 will then not be cleared by closing of upper 64B until the additional switch has been closed by deactuation of Ry62, which occurs after the start of the second baud of marking.

Actuation of Ry61 via S and lower 62B at the end of the first baud of the dash shifts 61A to lower position, deactuating Ry62 and continuing marking via upper and lower 61A, respectively. The next closure of M1 and M2, one baud later, is ineffective, M1 because Ry61 is already actuated, and M2 because, although it may momentarily actuate Ry62 if K happens to be closed to dashes, the holding circuit for that relay is open at upper 61A. The next closure of S, after three bauds of marking, finds 62B in upper position and Ry61 is deactuated, ending marking after three bauds. The stored dot signal has not been disturbed by closure of lower 61B, since C76 had already been charged to junction potential via lower 62C. During the spacing period of the dash, however, both upper 61B and upper 62C are closed, so that C76 is again discharged, ready to clear the dot memory at the start of dot marking.

At the next closure of M1 and M2, finger 171 is grounded via upper 65A and lower 63A, and Ry61 is therefore actuated, starting dot marking at lower 61A, and clearing the dot memory by closure of lower 61B. The next closure of S deactuates Ry61, ending dot marking and returning the system to idle condition with all relays unactuated.

If a dot signal is stored first, followed by a dash, actuation of Ry63 in response to the dot signal at T opens 63B in the actuating circuit of Ry65. Hence, when Ry64 is actuated in response to the later dash signal, closure of lower 64B does not actuate Ry65, and upper 65A therefore remains closed. Under that condition, closure of timing contacts M1 and M2 finds both fingers 171 and 172 grounded via 63A and 64A, respectively. Therefore Ry61 and Ry62 are both actuated substantially simultaneously. Ry62, however, is almost immediately returned to idle condition by opening of upper 61A. Closure of lower 62C, if it occurs at all, cannot take place before upper 61B has opened, and is therefore ineffective to deactuate Ry64. Closure of lower 61B, on the other hand, performs its normal function of clearing dot memory trigger Ry63. Thus the system, with both a dot and a dash in storage, acts normally to produce a dot first, and will instead produce a dash first only if directed to do so by actuation of sequence control relay Ry65. By utilizing a system that is inherently biased toward production of one type of character, the sequencing control is required to handle only one type of signal, and is thereby simplified.

After the first-signalled dot has been started, as just described, by actuation of Ry61, and the dot memory has been cleared by deactuation of Ry63, there remains a dash signal in storage (continued actuation of Ry64) in absence of a previously stored dot signal. That is the condition that calls for actuation of sequence control Ry65, and, in fact, that relay is actuated immediately upon clearance of the dot memory by closure of upper 63B (lower 64B being already closed). Another dot signal may now be stored by re-closure of T; but since Ry65 is now actuated, such a signalled dot will be produced only after the dash that is already in storage, in the manner already described for the sequence dash-dot.

Fig. 12B illustrates diagrammatically, in the manner of Fig. 4, the keying freedom offered by a system such as that of Fig. 12, which includes full dual memory rather than the special type of dual memory represented typically in Fig. 5.

In the system of Fig. 12, for example, the first dot and the dash of an "R" may both be signalled by only momentary contact of K to the appropriate control contact, permitting immediate return of K to neutral (line 73c of Fig. 12B). The second dot may then be signalled (line 73d) as soon as marking has started for the first dot and C73 has discharged through R115. In the system of Fig. 5A (omitting lower 21D) the second dot cannot be signalled (line 73b of Fig. 4D) until after completion of the marking period of the first dot, when the dash memory becomes effective. And in keying the letter "K" in the typical system of Fig. 12, the second dash may be signalled (line 104a of Fig. 12B) as soon as marking for the first dash has started and C74 has discharged through R116; and requires only momentary contact of the control lever, which may then be returned immediately to neutral (line 106a in Fig. 12B). On the other hand, with only the so-called "inherent" dash memory of Fig. 5 or 5A, the second dash signal is not stored until completion of marking of the immediately preceding dot, and the control lever cannot be returned from dash position (line 106 of Fig. 4D) until after that time.

In Fig. 12 the memory clearing circuitry, comprising C76, 61B and 62C directs a clearing pulse to the dash memory in response to any actuation of Ry62 and directs a clearing pulse to the dot memory in response to actuation of Ry61, only if that actuation is for dot production and not if for completion of dash production. An alternative circuit for performing the memory clearing function is indicated in Fig. 12A. Relay switch 61B is connected as in Fig. 12, except that lower 61B is brought to the movable contact of a switch 65B, controlled by sequencing Ry65. Lower 65B is connected (like lower 62C in Fig. 12) to the junction of Ry64, R114; and upper 65B (like lower 61B in Fig. 12) to the junction of Ry63, R113.

With that arrangement, memory clearance may be considered to be always initiated in response to actuation of Ry61, by application of C76 (discharged at upper 61B) to lower 61B; and to be directed selectively either to the dot memory or to the dash memory according as sequence control Ry65 is unactuated (upper 65B closed) or actuated (lower 65B closed). Thus the sequencing relay performs the dual role of selectively controlling the sequence of characters at the output and also controlling the sequence of memory clearances to conform with that output. The sequencing relay clears one or other of the memory circuits after that memory's contents have been delivered, under control of the same sequencing relay, to the transmitting circuitry.

With the memory clearing system of Fig. 12A, the dash memory is not cleared until the end of the first baud of dash marking, when Ry61 is actuated at S. That delay of one baud in memory clearance (as compared to Fig. 12), prevents storage of a second dash (to follow an intervening dot) until after the first baud of a first dash, and thus may limit the distance ahead of the output that the operator can work. An advantage of the circuit of Fig. 12A is the elimination of the third armature on Ry62, with the result that no relay requires more than two armatures.

In Fig. 13 V1, V2 and Ry76 comprise the multivibrator time base already familiar in Fig. 2. Ry77 and Ry78 are coupling relays, connected directly between positive bus 50 and control contacts T and H, respectively, without holding circuits. The coupling relays may be replaced by a relatively complex contact assembly on control lever K, for example of the general type indicated in Fig. 3. Ry71 and Ry72 are dot and dash triggers which control output at lower 71A and lower 72A in a manner closely similar to that of Fig. 12. Ry73 and Ry74 handle dot and dash memory in a manner somewhat similar to that described for Ry63 and Ry64 in Fig. 12. And Ry75 performs the same type of sequence control as Ry65 in Fig. 12. The detailed circuitry for actuation and deactuation of the various relays is quite different in the two systems. In particular, whereas the timing contacts M1, M2 and S of Fig. 12 are inherently instantaneous in their action, the timing switches 76A and 76B in Fig. 13 are continuing in their action, remaining closed throughout the first baud of each keying cycle. Their action is made effectively instantaneous, however, by the condenser circuits through which they act.

Ry71 is connected in series with R131 and lower 76A between ground and positive bus 50. R131 is shunted by C81, which is normally shorted via upper 76A. Ry71 is shunted via the series of normally closed relay switches 71B, 72B, 73B and 77B, the last two of those switches being in turn shunted via lower 75A. With 76A in upper position, Ry71 is, of course, deactuated, and C81 is discharged through R131 and closed upper 76A in parallel. Actuation of 76A ordinarily draws charging current for C81 through the described series of relay switches, which are normally all closed, and Ry71 is not affected. If any one of the switches of that series is open (and not shunted via 75A) closure of lower 76A actuates Ry71 by charging current to C81, and the relay is held by steady current through R131 (which is insufficient by itself for relay actuation). Opening of upper 71B acts functionally as a holding circuit for Ry71, preventing deactuation of Ry71 even though all other contacts of the chain become closed. After one baud of marking output at lower 71A, Ry71 is deactuated by opening of lower 76A, upon deactuation of timing Ry76. C81 discharges immediately through closed upper 76A, and is ready for another cycle of operation.

Dash trigger Ry72 is connected between ground and bus 50 in series with normally closed upper 71A and R132, which provides steady current sufficient for holding but not for relay actuation. At the start of each keying cycle, C82 (which has been discharged via upper 76B) is connected in shunt across R132 via timing switch lower 76B, and Ry72 may then be actuated on charging current to C82, but only in absence of the short across Ry72 which is normally present via the series of switches 72A, 74A and 78B. Opening of any one of those switches results in actuation of Ry72 at the next closure of lower 76B, starting marking output at lower 72A. Opening of upper 72A allows closure of all other chain contacts without deactuating Ry72. The relay is held by steady current through R132 regardless of the position of 76B, but is deactuated by opening of upper 71A.

Memory triggers Ry73 and Ry74 are connected in respective holding circuits through R133, R143 and R134, R144, respectively, and are provided with actuating circuits broadly equivalent to that just described for Ry72. Those actuating circuits momentarily shunt R143 and R144 through C83 and C84, respectively, upon closure of 77A and 78A, respectively. Switches 77A and 78A may be provided with back contacts for rapid discharge of C83 and C84, respectively (as shown for 76A and 76B). However, condenser discharge in the illustrated memory actuating circuits takes place sufficiently rapidly through shunting resistors R137 and R138, which are still large enough to prevent relay actuation by steady current through parallel-connected R137, R143 and through R138, R144, respectively.

Deactuation of Ry73 (clearance of dot memory) is accomplished by shunting the relay via C85 upon closure of lower 71B at the start of dot marking. Deactuation of Ry74 is similarly produced at the start of dash marking by shunting the relay via C86 by closure of lower 72B (upper 71B being then closed). Those two deactuating circuits are coupled by R135 and R136, connected in series between the junctions of C85, 71B and C86, 72B. A connection from the junction of R135, R136 via R139 to positive bus 50 charges both condensers during spacing output to the potentials standing across R133 and R134, respectively. The polarity of that charge is such as to aid the relay deactuation just described. During dash production, after the dash memory has been cleared via C86 by closure of lower 72B, C85 becomes charged (slowly enough to avoid deactuation of Ry73) through R135, R136, lower 72B and upper 71B to a voltage that is substantially the junction potential of Ry73, R133 (see below). Therefore later actuation of Ry71 (which occurs at the start of the third baud of the dash), although applying C85 directly across Ry73, is ineffective to deactuate the relay. Thus a stored dot signal is not lost during dash production in spite of actuation of the dot trigger.

The resistance of R135, R136 in series is high enough (and R133 and R134 are small enough), that the memory relays are not deactuated by the shunting action of C85 or C86 in series with the two resistors. Thus, closure of lower 71B deactuates Ry73 by direct shunting action of C85; but the simultaneous application of C86 in series with R135, R136 across Ry74 is ineffective. Similarly, upon closure of lower 72B, C85 is applied in series with R135, R136 across Ry73, but is ineffective. During the first two bauds of dash marking, with lower 72B and upper 71B closed, R139 and R136 act as a voltage divider between bus 50 and ground. The voltage to which C85 then becomes charged is less than the full potential of junction R133, Ry73 by the voltage standing at the junction of R139, R136. However, by suitable proportioning of the latter two resistors, the voltage at their junction can be made close enough to ground that the later grounding of C85 via lower 71B (for completion of dash marking) draws insufficient additional charge to C85 to deactuate Ry73. For that purpose the upper limit on R139 is the value at which the condensers charge during one baud of spacing just sufficiently for relay deactuation. The lower limit for the sum of R135, R136 has already been stated, but R136 may be smaller than R135, or even zero.

Sequencing Ry75 is connected between bus 50 and ground in series with upper 73B and lower 74B, with a holding contact lower 75B in parallel with 73B only. The action of that circuit is operationally equivalent to that described for Ry65 in Fig. 12. Ry75 functions entirely through the single switch lower 75A, already mentioned, closure of which bypasses and functionally disables 73A and 77B in the control chain of Ry71.

In operation, closure of dot contact T actuates coupling Ry77 for the duration of the contact. The control chain of Ry71 is thereby opened at 77B (75A being assumed open), sensitizing the dot trigger for actuation by closure of lower 76A at the next timing signal for marking. That action starts dot marking at lower 71A. Actuation of Ry77 also closes 77A, actuating Ry73 immediately. That stores the dot signal, which is made effective by opening of 73A, duplicating and continuing the temporary effect of open 77B and insuring eventual production of the signalled dot regardless of the position of K. The dot memory circuit is cleared at the start of dot marking by closure of lower 71B, as already described. Dot marking is ended one baud after it starts, upon opening of 76A.

A dash signal at H actuates Ry78, opening 78B in the control chain of Ry72 to sensitive the dash trigger. At the same time the dash memory Ry74 is tripped by closure of 78A, duplicating the temporary effect of 78B by opening 74A, and releasing K. The next closure of timing contact 76B trips the sensitized dash trigger by actuating Ry72 via C82. Dash marking is thereby started at lower 72A. The shifting of 72B to lower position performs the dual function of sensitizing the dot trigger (but not before C81 has charged through lower 76A and the closed switch chain) and clearing the dash memory via C86. Marking continues at lower 72A for a full keying cycle, since opening of timing contact 76B does not deactuate Ry72.

At the start of the third baud of dash marking, closure of lower 76A actuates Ry 71 (sensitized by opening of upper 72B). The resulting shift of 71A to lower position deactuates dash trigger Ry72 and continues marking under control of the dot trigger, as indicated diagrammatically in Fig. 20 (H). Condenser C87 holds Ry72 actuated until lower 71B is positively closed. Closure of lower 71B does not affect a stored dot signal (if any), since C85 is already charged via R139, R136. Dash marking is terminated after three bauds by opening of lower 76A, which deactuates Ry71.

Neither memory circuit is recycled by continued closure of the control lever (continued actuation of Ry77 or Ry78), since the steady currents through Ry73 and Ry74 are insufficient for relay actuation without the described charging current pulses to condensers C83 and C84. However, continued closure of T or H produces successive dots or dashes by holding 77B or 78B open. Termination of such a series of like characters is obtained simply by opening the control contact at K at any time after the start of marking for the last character desired and prior to the mark timing signal which would initiate a succeeding character.

If dot and dash signals are stored consequtively before production of either character starts at the output, the sequence of character production is controlled by 75A. If a dot is signalled first, actuation of Ry75 is prevented by opening of 73B before 74B closes. Hence 75A remains open, and dot production proceeds as already described. Due to the later stored dash signal, 74A is open, sensitizing Ry72. That relay may be actuated partially or wholly by closure of lower 76B at the start of the dot. But that actuation is only momentary, due to immediate opening of upper 71A, and has no effect on the system. In particular, lower 72B cannot close to clear the dash memory before upper 71B has opened, disabling the clearing circuit.

When a dash signal is stored first, Ry75 is actuated via lower 74B and closed upper 73B, and is held via 75B even after 73B has been opened by subsequent storage of a dot signal. Hence 75A is closed in response to the dash signal, preventing the dot trigger circuit from being sensitized in response to the later dot signal upon opening of 73A and 77B. A dot signal at T is stored by actuation of Ry73, but closure of 75A disables both the dot contact T and the actuated dot memory from producing the signalled dot. The next closure of timing contacts lower 76A and lower 76B trips only the dash trigger Ry72. That starts dash marking at lower 72A, closes lower 72B to clear the dash memory Ry74, and opens upper 72B to sensitize the dot trigger for completion of the dash. In the circuit as shown in Fig. 13, that sensitization of the dot trigger for dash completion clearly cannot be affected by closure of 75A.

However, it may be noted that in any case 75A is opened immediately after the start of dash marking, since clearing of dash memory Ry74 opens the holding circuit of Ry75 at 74B. Thus lower 75A might be returned directly to ground, instead of to upper 72B as shown, without interferring with dash completion during the simple sequence of dash-dot. Moreover, even if a second dash signal is generated at H immediately after the start of the first dash, re-actuating Ry74 via C84 (which discharged through R138 while H and 78A were open for production of the dot signal at T), that actuation of Ry74 does not reactuate Ry75 in the presence of the earlier stored dot signal. Ry75 is actuated only after completion of the first dash and after the start of dot marking, when clearance of the dot memory via C85 closes 73B. Hence 75A is always open during dash production (subject only to the release time of Ry74 and Ry75) and would not interfere with dot trigger action for dash completion even if it bridged the entire chain of switches instead of only 73A and 77B.

The description thus far has been directed particularly to problems of manual keying and their solution in accordance with the invention. In code transmission from a previously prepared code record, such for example as a punched tape, many of the same problems arise, and the invention accordingly has utility for automatic as well as manual code keying. The illustrative embodiments to be described will provide a clear understanding of that aspect of the invention and of the many types of detailed instrumentation by which it can be carried out.

A presently known type of code record is illustrated in Fig. 14A. A flexible tape 200, which may be of paper, for example, is provided with a continuous row of sprocket perforations 202, uniformly spaced along the longitudinal axis of the tape. Those perforations are provided primarily as a means for advancing the tape under accurate control, as by a sprocket whose teeth enter the perforations. Perforations 202 may also be considered as time markers, providing an accurate linear scale which corresponds in a definite manner to a time scale of the recorded code. As commonly used, the spacing between adjacent sprocket perforations 202 corresponds to one keying cycle of the recorded code.

Tape 200 also carries two rows of code designations, an upper row of marking designations 204 (as seen typically in Fig. 14A) each of which represents by its longitudinal position with respect to perforations 202 the time at which a code marking period starts; and a lower row of spacing designations 206, similarly representing times at which code spacing periods start. Code designations 204 and 206 are typically punched holes, and the code may typically be read from the moving tape by means of two resilient brushes which are spaced laterally of the tape to correspond to the two rows of holes, and which close respective electrical contacts with a base plate. Circuitry is provided by which closure of electrical contact through a hole 204 actuates an output circuit to start marking, while closure of contact through a hole 206 actuates the output circuit to shift it to spacing condition.

As illustrated, the time scale of spacing designations 206, as determined relative to time markers 202, is offset one baud in the direction of tape travel (to the left in Fig. 14) relative to the time scale of marking designations 204. That relative displacement of the time scales for marking and spacing designations is compensated by corresponding relative displacement of the code reading contacts already mentioned. Thus, although the marking and spacing perforations for a particular dot (for example 204*a* and 206*a*) lie directly opposite each other on the tape, they function as if the spacing perforation 206*a* trailed the marking perforation 204*a* by one baud (half the distance between sprocket perforations 202), and thus nominally produce a correct dot marking period one baud long. Similarly, marking and spacing designations for a dash (for example 204*b* and 206*b*), with longitudinal spacing on the tape of only one keying cycle, produce a dash marking period of three bauds.

The timing accuracy of code transmitted by previously known means from uniformly moving tape such as 200 depends upon the accuracy of relative location of the individual marking and spacing designations 204 and 206, longitudinally of the tape. Hence to produce accurate, and hence easily and reliably readable, code, the tape punching mechanism must be highly accurate and therefore relatively expensive. And if tape that has been punched under direct control of received signals is then used to re-transmit the signals, as at a relay station, any initial inaccuracy of timing is retained, and any inaccuracy introduced during previous transmissions (as by static and the like) is cumulatively preserved.

In accordance with the present invention, a code record such as tape 200 may be used to control code keying systems of the general type already described. The code transmitted in that manner does not depend for its timing accuracy upon the exact longitudinal position on the record of the code designations. Those designations are employed for the sole function of selecting code characters, and the timing function is accomplished by independent means. Thus any inaccuracy of placement of a code designation on the record (so long as it does not exceed certain well-defined and generous limits) is fully corrected by the keying system. That permits more economical production of the code record, since the required precision is greatly reduced; and it prevents cumulation of timing errors upon retransmission at a relay station. Moreover, such keying permits the use of a simplified tape.

A preferred form of simplified record tape for use with code keying systems in accordance with the present invention is illustrated at 210 in Fig. 14B. The body of the tape and the sprocket perforations, as illustratively shown, are the same as in the conventional tape of Fig. 14A; and two rows of code designations are provided. However, the meaning of those designations is different, and only half as many are required. Each code designation 214 of the upper row (as shown) represents a dash, and each designation 216 of the lower row represents a dot. The time scales of the two rows of code designations are preferably not offset (as described for tape 200), but each designation lies (for example) directly opposite the sprocket hole corresponding to the keying cycle at which the indicated character is to start. No direct indication is required of the time at which marking stops, thus eliminating half of the designations of the conventional tape.

All of the illustrative tape reading mechanisms is to be described have the special advantage (which, however, is not necessary for carrying out the invention in its broader scope) that tape of the types shown in Figs. 14A and 14B can be used interchangeably. Furthermore, the modified tape of Fig. 14C can be used equally well, the principal distinctive characteristic of that form being that continuous series of like characters are represented by continuous designations (for example slots), rather than by a series of discrete spaced designations.

Figs. 15 and 16 illustrate, somewhat schematically, a simple type of mechanism that may be used in conjunction with a system such as that of Fig. 1, for example, for producing code from record tape of any one of the types of Fig. 14. Sprocket 230 is driven at a uniform speed by any suitable means, not shown, and carries sprocket teeth 232 adapted to engage perforations 202 of a record tape, shown typically as of type 210 (Fig. 14B). The tape is thereby moved at uniform speed along a tape guide, indicated generally at 235, over a flat plate 237. Two spring contact fingers 234 and 236 are mounted, as on a support 238 of insulative material, in positions to contact plate 237 through tape perforations such as 214 and 216, respectively, as the tape moves along guide 235. Fingers 234 and 236 may directly contact the upper face of metal plate 237 which supports the record film. However, it is preferred to provide a contact insert of suitable material, as indicated at 240, set in plate 237 and insulated therefrom as by a section 241 of insulative material. Separate inserts may be provided for each finger, but for many specific circuit systems it is sufficient to provide a single common insert. Wire 248 represents a typical electrical connection for such an insert.

For operation with the system of Fig. 1, for example, fingers 234 and 236 of Figs. 15 and 16 may typically be connected, as by wires 244 and 246, respectively, in parallel with dash and dot contacts H and T, respectively, of Fig. 1. Wire 248 from contact insert 240 is connected in parallel with control lever K of Fig. 1. Contact of the spring fingers with insert 240 then performs, under control of the record tape, all functions performed in the system of Fig. 1 by manual lever K. The manual lever may be omitted entirely, or may be retained in the system for alternative performance of the selection function.

Timing signals, generated as already described by contact of rotating arm 30 with timing contacts M and S, may be produced in definite time relation to the movement of a record tape by providing suitable mechanical correlation between the speed of rotation of shaft 31 in Fig. 1 and that of sprocket shaft 231 in Figs. 15 and 16. For example, the shafts may be geared together so that, for every revolution of sprocket 230, arm 30 performs as many revolutions as there are teeth 232 on the sprocket, assuming that the sprocket holes in the tape are spaced by one keying cycle. Such gearing is indicated schematically as gearbox 245 in Fig. 16. The relative rotational positions of shafts 31 and 231 are so determined that arm 30 contacts M at the moment when each code perforation, properly placed on the record tape with relation to sprocket holes 232, is directly centered under the corresponding one of contact fingers 234, 236.

Operation of the system of Fig. 1, when controlled by a code record in the manner just described, is in direct accordance with the description already given for manual control, and will be clearly understandable from that description. In particular, it will be seen that it is immaterial whether a code perforation is precisely placed on the tape, so long as it produces contact of the finger with insert 240 during a time period that includes the relatively brief and accurate timing contact at M. For example, if each code perforation is of such a size as to extend longitudinally of the tape a distance corresponding to about one baud, the longitudinal position of any such perforation may be inaccurate by nearly one-half baud in either direction without causing any inaccuracy whatever in the resulting code output.

Fig. 15 further illustrates an alternative means of generating timing signals directly from a cam driven in timed relation with sprocket 230. For purposes of illustration the sprocket teeth 232 are employed as electrical contacts. Mark and space timing contacts 250 and 252 are yieldingly mounted, as by spring fingers, on a frame member 253 of insulative material. Contacts 250 and 252 are so positioned as to make alternating contact with teeth of the rotating sprocket. The timing contacts are mutually insulated and are preferably individually mounted, as by means of curved slots 254 in their mounting brackets 255, for adjustment through at least a short angular range about shaft 231. The mark and space contacts are connected, as by wires 256 and 258, respectively, in parallel to, or to replace, timing contacts M and S of Fig. 1. Sprocket 230 is grounded as by a brush 249 indicated schematically in Fig. 15.

Marking timing contact 250 is adjusted to engage a sprocket tooth momentarily at approximately the midpoint of the duration of contacts made by fingers 234 and 236 through correctly located dash and dot perforations, respectively. Spacing timing contact 252 is then adjusted to engage a sprocket tooth at such time as to yield the proper mark to space ratio at the output of the system. The timing function is then performed in proper correspondence to the selective function performed by fingers 234 and 236.

Fig. 17 represents in schematic form a system based on that of Fig. 11, but adapted to be controlled by a code record via switch contacts 234 and 236, and utilizing, for example, such a structure as is shown in Figs. 15 and 16 (and included for clarity in Fig. 17 as a fragmentary schematic section transverse of the record strip 210) for driving and reading the code record. Timing signals are generated in the illustrative system of Fig. 17 by actuation of timing switch 260. Cam 262 is driven in timed relation to sprocket shaft 231*a* as by a gear box 245*a*. Cam lobes 263, of which four are shown illustratively, engage a cam follower 264 on the pivoted switch lever 265, swinging the lever downwardly against the yielding force of spring 266, and opening switch 260 once during each keying cycle. With the typical code records illustrated in Fig. 14, that means one actuation of switch 260 for each sprocket hole 202. Cam lobes 263 are so formed as to maintain each closure of switch 260 for approximately half a keying cycle. The ratio of closed to open time of switch 260 controls the mark to space ratio of the final code output, and is preferably adjustable, for example by screw-threaded adjustment of one of the switch contacts in its insulated support, as shown typically in Fig. 17.

The intermittent action of switch 260 in Fig. 17 corresponds to the alternating periods of conduction and non-conduction in the plate circuit of tube V22 of Fig. 11 (there controlled by timing multivibrator V1, V2), and performs the timing function in analogous manner by alternately permitting and preventing current flow through *Ry*51 and tube V17, and by producing positive timing pulses at the grids of V17 and V18. The rotational positions of cam 262 and of sprocket 230*a* on their respective linked shafts are such that closure of timing switch 260 occurs as switch fingers 234 and 236 are approximately centered (longitudinally of the record strip) in their respective code perforations in the record.

Record reading switch fingers 234 and 236 perform their respective functions of controlling dash and dot production, in the illustrative system of Fig. 17, through dash and dot coupling relays *Ry*80 and *Ry*81, respectively. *Ry*80 requires only a single normally open relay switch, shown as lower 80A, and can be eliminated if desired by utilizing contact between finger 234 and plate 273*a* (suitably insulated) to perform directly the function performed in Fig. 17 by 80A. Similar elimination of *Ry*81 is possible, but involves more complex structure at 236, since *Ry*81 controls a double throw switch 81A.

In Fig. 17 the main features of the system are taken directly from Fig. 11 and bear the same identifying symbols. A few minor changes in the wiring require no detailed description, since they do not affect the operation. With regard to control functions, in Fig. 17 relay switches lower 80A and upper and lower 81A perform, under control of the record strip, functions that are analogous to those performed in Fig. 11 by manual control lever K acting through memory circuitry including *Ry*45. The actual memory functions of that memory circuitry are omitted as unnecessary in Fig. 17, but can be included if desired.

Relay switch 45C of Fig. 11 is replaced by lower 81A in Fig. 17. Lower 81A closes upon actuation of *Ry*81 by closure of switch 236 in response to a dot designation on record strip 210. The cathode of tube V17 is thereby lowered, sensitizing the tube, which is ionized by the next positive timing voltage pulse at its grid, produced by closure of timing switch 260. Production of a dot follows as described for Fig. 11.

Switch 45A and control contact H of Fig. 11 are replaced in Fig. 17 by series connected upper 81A and lower 80A. Closure of that circuit sensitizes dash trigger tube V18 in response to a dash code designation at switch 234, initiating a dash at the next positive timing pulse at the grid of V18. That dash is completed as already described for Fig. 11. Presence of upper 81A in the described sensitizing circuit prevents dash initiation by closure of code reading switch 234 unless switch 236 is open. That permits the use of a code record of the type shown in Fig. 14A interchangeably with that of Fig. 14B or 14C. That is, closure of switch 236 alone (as by a perforation 216 of Fig. 14B) or co-existing closure of switches 234 and 236 (as by perforations 204a and 206a of Fig. 14A) produces a dot by closure of lower 81A, and cannot produce a dash because upper 81A is open; closure of switch 236 alone (as by perforation 204b of Fig. 14A or 214 of Fig. 14B) produces a dash by closure of 80A, upper 81A remaining closed. If operation by records such as Fig. 14A is not required, upper 81A may be omitted, and the armature of 80A connected directly to ground. Coupling relays Ry80 and Ry81 can then be eliminated particularly readily in the manner already indicated.

A code record such as that of Fig. 14C is directly usable in the system of Fig. 17, since the presence or absence of a code designation can have no effect on the system except in conjunction with a marking timing signal (and in absence of previously initiated dash marking). Thus the longitudinal extension of code perforations to form slots connecting code designations representing immediately successive characters of the same type, as in Fig. 14C, has no effect on the transmitted code.

Code designations of many different types may be substituted for the illustrative perforations described. For example, the areas designated 204, 206, etc. in Fig. 14 may represent deposits of conductive material on a generally insulative medium, areas of thickening in a tape of otherwise uniform thickness, or areas of material having a coefficient of friction markedly different from the remainder of the record medium. From the description of the typical example already discussed it will be understood how those and many other particular types of record may be "read" in accordance with the invention.

For high rates of code transmission it may be preferable to avoid mechanically actuated switches. Figs. 18 and 19 illustrate, partly schematically, an illustrative system for reading a typical record tape photoelectrically and for transmitting the recorded code electronically. No intermittent movements of mechanical parts are involved, and the maximum speed of transmission, which is limited only by electrical circuit factors, may be made very high.

As illustrated in Fig. 18, the record tape 210, representing any suitable type of code record such as those of Fig. 14, is driven along a guide groove 235a formed in the top plate 281 of a housing 280. A retaining plate 283 is suitably formed to retain the record strip in its guide, and is preferably hinged, as indicated at 289, to facilitate insertion of the strip. The record strip is moved longitudinally along guide 235a at uniform but preferably adjustable speed, as by rotation of a sprocket 230b having sprocket teeth 232 that engage uniformly spaced sprocket perforations in the record strip in the manner already described. In Fig. 18 a variable speed motor is shown at 290, coupled directly to sprocket shaft 231b, and represents typical driving means for the sprocket.

The interior of housing 280 is divided, as by a partition 282, into two substantially light-tight compartments, which enclose respective light sensitive devices P1 and P2. Those devices may be of any type adapted to convert changes of light intensity into corresponding electrical variations. They are shown typically as conventional photoelectric tubes whose resistance to an applied direct current potential varies in response to light received through an end wall of a cylindrical envelope. Alternatively, for example, P1 and P2 may represent self-generating phototubes of light sensitive crystal devices of the transistor type, appropriate changes then being made in the associated circuitry to be described.

P1 and P2 are shown mounted in position to receive light from a common light source, illustrated as a lamp 285, through the respective code perforations 236 and 234 of a code record of any of the types shown in Fig. 14. Light apertures 284, 286 and 284a, 286a are provided in top plate 281 and in retaining plate 283, respectively, in oblique alinement with the respective rows of record perforations. Optical means such as lenses and mirrors may be provided if desired to facilitate formation of light beams from lamp 285 and projection of such beams through the code perforations to the respective light sensitive devices. However, it is a characteristic advantage of the invention that the intensity of the beam at each light sensitive device may be allowed to increase and decrease relatively gradually as a record perforation crosses the light beam. It is not necessary to produce a sharply defined response to each record aperture, nor to control accurately the time of that response. Therefore any apparatus may be used which, like the very simple embodiment illustrated, provides adequate illumination of each light sensitive device when a code perforation is centered over it, and cuts off substantially all light when the perforation has moved a full diameter in either direction from that position. That condition is adequate to provide the function of code selection.

Code timing is controlled with relation to a timing scale on the record strip. The sprocket perforations are preferably utilized as that timing scale, electrical timing signals being generated in timed relation to the movement of the sprocket teeth. In the particular embodiment illustrated in Figs. 18 and 19, an alternating current generator 292 is coupled to sprocket shaft 231b by any suitable coupling means, indicated at 294, by which the relative azimuths of the sprocket and the generator armature are adjustable. The generator is so arranged as to provide one full cycle of alternating current output for each sprocket tooth (i. e. for each code timing and keying cycle), taking account of the drive ratio between the generator and sprocket. For example, with the direct drive typically shown in Fig. 18, generator 292 may have twice as many poles as there are teeth on sprocket 230b. Coupling 294 is adjusted so that marking timing pulses, developed from the generator output by circuitry to be described, occur as the code perforations 234 and 236 are approximately centered over their respective light sensitive elements P2 and P1.

In Fig. 19 is shown in schematic form an illustrative electronic system of a suitable type for translating electrical impulses, derived from a record by the apparatus of Fig. 18, into code output that corresponds to the code record. The system of Fig. 19 is based upon that of Fig. 8 with the modified tone output circuitry shown in Fig. 9. The time base and dot memory circuitry and manual control means of Fig. 8 and the rectifying circuit (V14) of Fig. 9 for supplying memory clearing impulses have been omitted from the system of Fig. 19. The omitted time base circuitry is replaced by generator 292 and the pulse shaping and clipping circuits including tubes V25 and V26. The dot memory and manual control circuits are replaced by phototubes P1 and P2 and their associated circuitry. Dot trigger V7, V8 and dash trigger V8, V9 of Fig. 8 and output tube V12a and the tone output circuit of Fig. 9 are repeated basically unchanged in the system of Fig. 19, and require no further description than has already been given.

Rotation of generator 292 in timed relation to sprocket 230b, as described, produces typically a periodically varying voltage of sinusoidal wave form (A) across the generator winding 300. That voltage is applied via the relatively high resistor R150 to the grid of tube V25. Voltage divider R152, R153 determines the cathode potential of V25, providing a small grid bias that is adjustable by variation of R153. That adjustment determines the point on the positive half cycle of the generator output at which the net grid voltage becomes zero. At more positive voltages the grid draws current, causing the voltage to appear as voltage drop across R151. The wave form at the grid of V25 is therefore clipped at a definite level as indicated at 301 of (B). The amplified and inverted wave across plate load resistor R151 is of the form indicated at (C). The dotted lines 302 in wave form (C) represent the type of clipping that may result at the plate if the negative voltage swing at the grid goes beyond cutoff. However, it is mechanically advantageous to employ at 292 a relatively low voltage permanent magnet generator and to make use of the amplification of V25, clipping the negative swing by V26 instead of relying on V25 for both positive and negative clipping.

In the circuit shown, the periodic signal of form (C) developed across plate resistor R151 is applied through C90, R154 to the plate of clipping diode V26. The positive clipping level of the diode is set by connection of its cathode to the junction of voltage divider R155, R156. The resulting voltage wave is substantially a square wave, as indicated at (D). That wave is differentiated by C45, R63 and by C46, R68, and is applied as alternating positive and negative timing pulses to the grids of V7 and V9 in the manner and with the results already fully described in connection with Fig. 8. Variation of R153 alters the level of clipping at 301 in (B), (C) and (D), but does not affect the clipping level at 303 in (D) because of the blocking action of condenser C90. Therefore the relative duration of the positive and negative swings of wave (D) is controllable by variation of R153, and determines the mark to space ratio of the final code output for reasons already familiar in connection with Fig. 8.

Sensitization of the dot and dash triggers in the system of Fig. 19 is accomplished as in Fig. 8 by selectively lowering the grid potentials of V8 and V10, respectively. However, control of those grid potentials is exercised by light sensitive elements P1 and P2 rather than by manual action as in Fig. 8. In the system as shown, phototubes P1 and P2 are polarized by connection across the main battery B in series with respective cathode resistors R160 and R161.

Amplifying tubes V31 and V32 have their plates connected via resistors R162 and R163 to the grids of V8 and V10, respectively. The tube grids are connected directly to the cathodes of P1 and P2, respectively, and their cathodes are tied to the junctions of voltage dividers R164, R165 and R166, R167, respectively, which holds the tubes approximately to cutoff when P1 and P2 are dark. Coupling tube V27, which is connected directly in parallel with R166 and has its grid tied to the cathode of P1, is similarly cut off when P1 is dark. Two or more tubes may be connected in parallel as described for V27, to secure more positive action of the type to be described.

Light striking P1 through a dot perforation 236 of the record tape produces a positive potential across R160 and thereby lowers the plate resistance of both V31 and V27. The reduced resistance of V31 lowers the grid of V8 by an amount that is so controlled, for example by suitable selection of R162, as to sensitize the dot trigger so that conduction will be transferred from V8 to V7 in response to a positive timing pulse at the grid of V7, initiating production of a dot.

The simultaneous reduction of V27 plate resistance raises the potential of the junction of R166, R167, biasing V32 well beyond cutoff and disabling the normal control over V32 by P2. Therefore, even if conventional record tape is being used, so that light is simultaneously transmitted to P2 by a code perforation 234 (compare 204a and 206a of Fig. 14A) intended for initiation of dot spacing, no dash signal is transmitted by P2 because of the blocking action of V27. On the other hand, when a dash perforation 234 is unaccompanied by a dot perforation 236 (compare 204b of Fig. 14A) the increased conduction through P2 lowers the plate resistance of V32 and sensitizes dash trigger V9, V10 by lowering the grid of V10 sufficiently to transfer conduction to V9 at the next positive timing pulse at the grid of V9. That initiates production of a dash, which is completed in a manner already familiar from the description of Fig. 8. During dash production, the illumination of P1 through a perforation (such as 206b in Fig. 14A) normally intended for initiation of dash spacing does not affect the output, since it can at most sensitize the dot trigger for tripping by the positive timing pulse that occurs after the second baud of marking. But at that time the dot trigger has already been tripped via C47 in response to clearing of the dash trigger If it is not required to use conventional record tape interchangeably with such preferred types as are shown in Figs. 14B and C, the preceding considerations do not apply, and coupling tube V27 may be omitted.

As already explained, the timing pulses are generated in such time relation to the movement of the record tape that the positive timing pulses occur approximately as code perforations 234, 236 are centered in their respective light beams. Any reasonable displacement of a code perforation from its correct longitudinal position in the record tape merely displaces in time the period of trigger sensitization. So long as that period includes the instantaneous positive timing pulse, such displacement cannot affect the time at which the trigger circuit is tripped, and therefore cannot affect the timing of the code output.

From the description of Figs. 18 and 19 it will be obvious that the code designations, illustratively described as tape perforations, may alternatively be of any type that changes the light transmitted or reflected by a record medium. For example, a translucent tape may carry ink designations which reduce the transmitted light. Tubes such as P1 and P2 may then be inverted electrically, and may act to hold V31 and V32 beyond cutoff until the light is interrupted by a code designation.

With particular reference again to manual keying systems, the potential advantages, already described, of providing a memory function, whether single or multiple, are most fully realized in systems employing a free running time base. However, very considerable advantages are obtainable by introducing the memory function into systems of certain other types, including systems described in the prior art, which do not utilize a free running time base, and which therefore cannot provide the full advantages of the present invention. The systems referred to may be characterized broadly as those capable of timing the start of marking of a character in correct relation to the marking period of an immediately preceding character of the same or different type.

Such systems typically utilize a timing device set in operation in timed relation to the marking period of one character, and acting to control the time at which the following marking period starts when the operator calls for an immediately following character. The timer thus functions broadly to control the length of the spacing period of the first character. Such a timer may, for example, be set in operation either at the start or at the end of marking of the first character, or in some other definite time relation. The detailed action is immaterial, so long as the relative timing of immediately successive characters is determined without specific timing control by the operator. In previously known systems of the type here described, there is no automatic control of the length of inter-word and inter-letter spaces. Once the spacing period of the final character of a letter or word has been completed, the timing control of the system becomes completely idle. The operator is entirely dependent upon himself in timing the start of the first character of the following letter or word. That condition may be visualized from Fig. 4, which represents typical freedom of movement of the control lever in various systems in accordance with the present invention. The system represented in Fig. 4A includes a free-running time base, but no memory function. The shaded areas 80 and 82 indicate the timing freedom available in such a system for signalling the first character of a letter or word. That freedom is completely absent in previous systems of the type here discussed. The control lever must be moved to signal the start of a letter or word at precisely the correct time, that is, along the dotted line 81 or 83 of Fig. 4A. Although such systems permit a certain timing freedom in signalling the start of immediately following characters (for example, areas 72 and 79 in Fig. 4A), it is difficult in practice to utilize that freedom when there is no freedom at all in other keying operations. In particular, there is a tendency, after signalling a final dot that follows a dash (for example, movement 73 of Fig. 4A), to return the control lever to idle position (movement 74) before the actual start of the signalled dot. That leads to the dropping of the final dot of the letter, a well recognized difficulty in previously available keying systems.

One illustrative group of such devices includes the three related systems described in the magazine QST by F. A. Bartlett, page 27, October 1948; by Richard H. Turrin, page 48, January 1950; and by Roy E. Brann, page 33, February 1951. Each of those systems utilizes the equivalent of two timers, both set in operation at the start of marking for each character. One timer measures the marking period of the character, automatically shifting the output to spacing at the end of its set time period. That set time period is different for dots and for dashes, selection between the two settings being made automatically in accordance with the direction of movement of the control lever by which marking was initiated. The second timer measures the total duration of the character, including both marking and spacing periods. It also is settable for two different time periods, corresponding to the total duration of dots and dashes, respectively. The second timer acts to prevent the start of a following marking period until the end of the set time period, that is, until both marking and spacing have been completed for the first character. If at the end of that time the control lever is in position to signal a following character, whether a dot or a dash, the system acts to start that following character at once in correct time relation to the preceding character. However, if the control lever is not maintained in signalling position for the following character until completion of the first character, but is accidentally returned to idle position before the actual start of the following character, then the latter will not start at all, but will be dropped. That difficulty is particularly marked, as has already been pointed out, in keying a single dot that follows a series of dashes, as in the letters G and P, for example. That tendency to drop terminal dots is entirely overcome by providing dot memory in accordance with the present invention.

Fig. 21 represents schematically an illustrative embodiment of dot memory in a typical system of the class referred to, based particularly on the article by Turrin, identified above. As illustrated, grounded control lever K acts through dot and dash coupling relays Ry91 and Ry92, connected directly between positive bus 50 and dot contact T and dash contact H, respectively. The two switches controlled by each of Ry91 and Ry92 may alternatively be actuated directly by a suitably modified control lever structure. The dot memory circuit proper is shown at the left of Fig. 21 and includes Ry93 connected via R173 to positive bus 50 and via parallel-connected R174 and C95 and then via parallel connected relay switches lower 91B and lower 93B to ground. Closure of K to dots closes 91B, actuating Ry93 by charging current to C95. Steady current via R174 and holding contact 93B is sufficient to hold Ry93, but not to actuate it. A memory clearing circuit is provided that will deactuate Ry93 upon the start of marking output. As shown, actuation of marking relay Ry95 (to be described) shunts Ry93 to ground via lower 95B and C96, the latter having been discharged during spacing output via closed upper 95B.

The two timing devices of the system comprise the vacuum tubes V44 and V45, whose grids are tied together and connected via R180 to a common timing network that includes C94 and variable R181 connected in parallel between R180 and ground. The plates of V44 and V45 are connected to positive bus 50 via Ry94 and Ry95, respectively, and their cathodes are established at suitable respective potentials above ground by means of voltage dividers R184, R186 and R185, R187, respectively. The cathode potential of V45 is thereby held higher than that of V44, and is preferably variable, as by variation of R185. In idle condition of the system both tube grids are held at substantially ground potential via R180 and R181, cutting off the tubes and holding Ry94 and Ry95 deactuated. Ry95 controls lower 95A in the output circuit, normally held open for spacing output. Ry94 controls upper 94A, which normally provides a connection from the triple junction of R180, R181, C94 via R190 to a control network, which is enclosed by the dotted line 320 in Fig. 21 for convenience of identification.

That control network includes switch 93A, with its armature connected via line $k$ to 94A, described above; switch lower 92A, connected between upper 93A and line $h$, which leads to a source of positive potential, shown as bus 50; and lower 91A, connected in parallel with lower 93A to line $t$, which leads to a source of less positive potential, shown as a variable point on R193, connected in series with R192 between bus 50 and ground.

It will be convenient first to describe the operation of the system apart from the memory circuit, considering, for example, that the latter circuit is opened temporarily at Ry93, so that 93A remains continuously in upper position, as shown. Then coupling relays Ry91 and Ry92 in effect operate only 91A and 92A, respectively, under direct control of K. (Since the coupling relays have no holding circuits, they cannot both be actuated at the same time, and 91A and 92A cannot both be closed.) The action of the latter switches under that condition will be seen at once to be the same as if control network 320 were replaced by an ordinary control lever, armature K being connected to line $k$, dot contact T to line $t$, and dash contact H to line $h$. Closure of K to dashes in either instance connects $k$ to $h$. With 94A normally closed, that charges C94 to full battery potential through R190, rendering both vacuum tubes strongly conductive and actuating Ry94 and Ry95. Actuation of Ry95 closes 95A, starting marking output. Actuation of Ry94 opens 94A, isolating C94 from control by control lever K (or by network 320). The two timers are thus set in operation under the common control of the discharge of C94 through R181. As the tube grids become less positive, first V45 and then V44 will be cut off, successively deactuating Ry44 and Ry45. The time of deactuation of each relay depends upon the tube cathode potentials, and is determined by the point on the RC charge curve at which the net grid bias reaches effective cutoff for the respective tubes. The resulting deactuation of Ry95 stops marking output at 95A; and the later deactuation of Ry94 closes 94A and restores control of the system to the control lever (or to control network 320), so that a succeeding character can be initiated.

Closure of K to dots connects $k$ to $t$, producing the same action just described for dash production, except that C94 is originally charged to a less positive potential, determined by the setting of potentiometer R193. Therefore C94 will require less time to discharge sufficiently to cut off V45, and will also require less time to cut off V44. Hence the dot marking period is shorter than that for dashes; and the total character time (until closure of 94A permits another character to be initiated) is also shorter. The time for discharge of C94 from the potential at which V45 is cut off to that at which V44 is cut off is substantially independent of the initial charge, so that the dot and dash spacing periods are approximately equal for any given adjustment of the system. That is an advantage in utilizing the common timing network C94, R181 to control both tubes. However, the two timers may be made entirely independent, if preferred, by suitable duplication of parts. Keying speed is adjustable primarily by variation of R181. Variation of R193 controls primarily the dot to dash ratio, and variation of R185 primarily the mark to space ratio.

Turning now to the operation of the memory circuit shown illustratively in Fig. 21, closure of K to dots while the circuit is idle produces a dot substantially as already described. Immediately upon closure of 91A, C94 is charged via closed 94A, initiating dot production by actuation of Ry95. The simultaneous closure of 91B may be effective to actuate Ry93 momentarily on charging current to C95, but the immediately following closure of lower 95B at the start of dot marking so lowers the potential at the junction of Ry93 and R173 that Ry93 is immediately deactuated again. Continued closure of K to dots draws insufficient steady current to reactuate Ry93. If the control lever is held to dots until 94A closes at the end of one complete dot, another dot is initiated via closed 91A.

If K is closed to dots while the circuit is not idle, for example during the spacing period of a previously signalled character, 94A is open, and closure of 91A is therefore not immediately effective. Ry93 is then fully actuated by closure of 91B, and remains actuated on holding current through R174 and 93B even if dot contact T is immediately reopened. That has two primary effects. Lower 93A remains closed, completing a circuit between $k$ and $t$, and insuring that a dot will be initiated immediately upon closure of 94A at the end of the spacing period of the character in progress. And upper 93A remains open, isolating $k$ from $h$ regardless of the condition of 92A, and thereby disabling control dash contact H and preventing accidental initiation of a dash in place of the already signalled dot. (Except for that dependence upon upper 93A, dash production takes place as already described.) At the start of dot marking, closure of lower 95B clears the memory circuit, restoring normal control to dash contact H. Closure of T during marking output of a previously signalled character has the same effect as that just described, provided only that enough time has elapsed since the start of that marking period for C96 to become sufficiently fully charged via lower 95B to permit normal actuation of Ry93.

It will be understood that any system behaving functionally like that upon which Fig. 21 is based may be provided with dot memory circuitry. In particular, any such system that utilizes a conventional control lever having an armature connection $k$ and single dot and dash connections $t$ and $h$, respectively, can be connected to the memory circuitry shown in Fig. 21 simply by inserting control network 320 in place of the control lever with the indicated connections $k$, $t$ and $h$.

If the system in which the dot memory is to be embodied employs a different type of control lever contact assembly, the circuitry may require suitable modification. For example, Patent 2,517,538, issued on August 8, 1950, to H. Beecher, discloses a keying system in which the control lever armature K is grounded, in which primary dot and dash contacts 2 and 3 are connected in parallel to the system, and in which either an auxiliary dot contact 1 (Figs. 1, 3, 4, 6, 7, and 8)

or an auxiliary dash contact 4 (Figs. 2 and 5) is utilized. Modification of such a system to include dot memory of the broad illustrative type shown in Fig. 21 requires only the insertion of a control network, broadly similar to 320 but suitably modified, for Beecher's control lever. Fig. 21A shows such a modified control network 320*a* suitable for use in a system such as Beecher's Fig. 1, for example, lead $k$ being then connected to ground, lead $t+h$ being connected to his system in place of control lever dot and dash contacts 2 and 3, and lead $ta$ being connected to his system in place of auxiliary dot contact 1. Fig. 21B shows a modified control network 320*b* adapted for connection in a system such as Beecher's Fig. 2, for example, leads $k$ and $t+h$ being connected as stated for Fig. 21A, and lead $ha$ being connected to his system in place of auxiliary dash contact 4. In each instance the dot memory and coupling circuits may be of the type shown in the left hand portion of Fig. 21, relay switch 95B being operated by, or in substantial synchronism with, the output relay of the main keying system, identified in the typical systems of Beecher as *Ry*.

From the above description of Fig. 21, it will be evident that dot memory circuitry offers substantially the same sort of keying continuity within each letter in systems of the type just described as in systems embodying a free-running time base in accordance with the present invention. That improvement in keying freedom may be seen, for example, from a comparison of Fig. 4C with Fig. 4A; but with the difference, already suggested, that for systems without a free-running time base areas 80 and 82 are eliminated from those figures and that area 72*a* of Fig. 4C is no larger than area 72 of Fig. 4A. The particular improvement of preserving terminal dots results primarily from the greatly increased freedom of timing for the return of the control lever to idle position after signalling a terminal dot. The earliest permissible time for that movement is represented by the lines 74, 74*a* in those figures, and the increased timing freedom is clearly represented by the increased size of area 75*a* in Fig. 4C as compared with area 75 in Fig. 4A, as will be fully understood from the description already given of those figures in connection with the system of Fig. 3.

Fig. 22 shows schematically a typical circuit by which dual memory can be provided in a system of the broad type of that in Fig. 21. For clarity of description, the basic keying system, apart from memory, is the same in Fig. 22 as in Fig. 21, but with control network 330 substituted for network 320 of Fig. 21. The dual memory circuitry of Fig. 22, although differing in detail, is similar in principle to the corresponding portions of the system of Fig. 12, and need not be described in detail. Coupling relays *Ry*101 and *Ry*102, which have no direct counterpart in Fig. 12, may be eliminated in Fig. 22 by suitable control lever structure. The memory clearing circuits illustratively shown in Fig. 22 are of the type shown in Fig. 12A and already described.

Control network 330 of Fig. 22 isolates line $k$ from both $t$ and $h$ in idle condition of the system. With sequencing relay *Ry*105 and both memory relays *Ry*103 and *Ry*104 unactuated, closure of control lever K to dots makes a dot signal effective by connection of $k$ to $t$ via upper 105*a* and closed 101A; and closure of K to dashes connects $k$ to $h$ via upper 105A, upper 103A and closed 102A. With dot memory *Ry*103 actuated and sequencing *Ry*105 unactuated (whether dash memory *Ry*104 is actuated or not) $k$ is connected to $t$ via upper 105A and lower 103A independently of control lever position: closure of K to dots under that condition merely duplicates lower 103A by closure of 101A, and closure of K to dashes is ineffective since the circuit through 102A is open at upper 103A. With sequencing relay *Ry*105 actuated, a dash signal is made effective by connection of $k$ to $h$ independently of the control lever condition and also independently of the condition of dot memory *Ry*103: all three switches 101A, 103A and 102A are rendered ineffective by isolation from $k$ at open upper 105A. A short between $t$ and $h$ cannot occur by simultaneous closure of 101A and 102A, since *Ry*101 and *Ry*102 have no holding circuits and cannot be actuated simultaneously.

In operation of the system represented in Fig. 22, if the circuit is initially idle (all previously signalled characters completed), closure of K to dots immediately initiates production of a dot by closure of 101A; or closure of K to dashes immediately initiates production of a dash by closure of 102A. At initiation of a dot in that manner, dot memory *Ry*103, may be momentarily pulsed by closure of 101B, but is immediately cleared when shunted by discharged C106 upon closure of lower 95B at the start of dot marking, upper 105C remaining closed. At initiation of a dash in that manner, dash memory *Ry*104 is actuated by closure of 102B, closing 104A and thereby immediately actuating sequencing *Ry*105. That shifts 105C to lower position, switching the clearing circuit for dash memory clearance upon closure of lower 95B at the start of dash marking. C106 is sufficiently large to overcome C103 or C104, and is not disabled for clearing the dash memory even if 95B reaches lower position slightly before 105C has left its upper position. Completion of the initiated character by action of timer circuits V44 and V45 takes place as already described in connection with Fig. 21. An immediately following character of the same type is preferably produced by continued closure of K to the corresponding contact T or H, thereby continuing the connection of line $k$ to line $t$ or line $h$. The memory circuitry remains idle during such a series of like characters.

If, during production of a previously signalled dash, K is closed to dots, 101A is closed at once, but is ineffective because 94A is open. At the same time, dot memory *Ry*103 is actuated by closure of 101B, and is held at 103B. The resulting closure of lower 103A makes the dot signal effective by connecting line $k$ to line $t$ and holding that connection until 94A closes at the end of the dash in progress. Meanwhile K may be shifted to dash contact H to signal a following dash (see below). The resulting closure of 102A cannot prevent production of the already signalled dot, since 102A is disabled by open upper 103A.

If, during production of a dot, and with dot memory *Ry*103 idle, K is closed to dashes, 102A closes at once, but is ineffective because 94A is open. At the same time, dash memory *Ry*104 is actuated by closure of 102B and is held at 104B. The resulting closure of 104A actuates sequencing relay *Ry*105 via 103C (no dot signal being stored). Closure of 105B holds *Ry*105 actuated independently of later opening of 103C, but subject to continuing closed condition of 104A. Actuation of *Ry*105 shifts 105A to lower position, connecting line $k$ to line $h$ in preparation for dash initiation as soon as 94A closes at the end of the dot in progress.

Meanwhile K may be returned to dot position, actuating Ry103 to store a dot signal. That signal is held, regardless of the position of K, until both the dot in progress and the previously signalled dash have been completed. The start of marking of that dash applies C106 (discharged during spacing of the preceding dot) via lower 105C across Ry104, clearing the dash memory relay. Deactuation of Ry104 opens 104A, deactuating sequencing relay Ry105. Charging current to C105, connected in parallel with 104A, holds Ry105 actuated long enough to insure complete and positive deactuation of Ry104 before lower 105C opens. Deactuation of Ry105 returns the clearing circuit to condition for clearing the dot memory at the start of the following marking period, and also restores normal control of the system proper by closure of upper 105A. If a dot signal has already been stored, as indicated above, or is made during the course of the dash, the resulting closure of 103A prepares the system by connection of line *k* to line *t* for initiation of a dot upon closure of 94A at the end of the dash in progress. If no dot signal is made, a second dash may be produced via 102A by continued closure of K to dashes.

If a dash is signalled while a previous dot signal is in storage (Ry103 actuated), the dash signal is stored by actuation of Ry104. However, under that condition Ry105 is not actuated, since its actuating circuit is open at 103C. Therefore 105A remains in upper position, maintaining line *k* in connection with line *t* via 103A until the end of whatever character (normally a dash) is in progress. At the end of that character, 94A closes, initiating an immediately following dot in response to the dot signal in storage (closure of 103A). The start of dot marking closes lower 95B, applying discharged C106 via closed upper 105C across Ry103 and clearing the dot memory. Clearing of Ry103 closes 103C, actuating sequencing Ry105 via already closed 104A. Actuation of Ry105 closes lower 105C, preparing the clearing circuit for dash memory clearance; and also in effect hands over control of the system proper to the dash signal, already stored as actuation of Ry104. That signal is made effective by closure of lower 105A, causing initiation of a dash at the end of the dot in progress.

Certain differences between the memory circuitry of Figs. 12 and 22 will be pointed out specifically. The primary function of the sequencing relays, Ry65 in Fig. 12 and Ry105 in Fig. 22, is broadly to insure that when dot and dash signals are made in a certain sequence, the signalled characters will be produced in corresponding sequence. However, the detailed distribution of functions between the sequencing relay and dash memory relay is somewhat different in the two systems, illustrating the sort of variation that can readily be made within the scope of the invention. In both illustrative instances the sequencing relay is actuated only when a dash signal is in storage in absence of a previously stored dot signal. Such actuation of the sequencing relay serves to block dot production in response to a dot signal that is later than the stored dash signal. In Fig. 12 that blocking is done by opening of 65A, in Fig. 22 by opening of upper 105A. In each instance the dot contact and dot memory are thereby isolated from the timing circuits of the system.

When a dash signal is in storage in presence of a previously stored dot signal, the sequencing relay remains unactuated, with the result that the dash signal remains ineffective until the previously signalled dot is produced. In the system of Fig. 22 that disabling of the dash signal results directly from the deactuated condition of Ry105, since dash memory Ry104 can affect the character producing portion of the system only via switch 105A of sequencing Ry105. With 105A in upper position (and 103A in lower position) no dash can be produced. In the system of Fig. 12, on the other hand, dash memory Ry64 directly controls the character producing circuitry via 64A. Such direct control by the dash memory is permissible in that particular system, since accidental conversion of a dot to a dash is prevented by opening of 61A in the dash trigger circuit whenever dot marking is in progress. In other words, the system is inherently biased in favor of dot production. Because of that bias, proper sequencing results if the sequencing relay merely prevents dot production (at 65A) when a dash is to be produced. In the system of Fig. 22 there is no such bias, and the sequencing relay must also prevent production of a dash when a dot is to be produced. That is done, as already stated, by passing stored dash signals to the control network only via the sequencing relay acting through lower 105A.

In a system such as Fig. 12, the switch shown as 64A may alternatively be controlled by sequencing Ry65 instead of by dash memory Ry64 (by analogy with lower 105A in Fig. 22). However, that change would slightly delay the switch action and would have no compensating advantage. In particular, even with that change it would not be convenient to eliminate upper 61A from the dash trigger circuit. Although its function of biasing the system toward dot production would no longer be required, upper 61A or its equivalent would still be required to deactuate Ry62 during dash production.

Figs. 22A and 22B represent control networks suitable for connecting a dual memory system such as that in the left hand portion of Fig. 22 to a character producing system of the general type illustrated by Beecher in the patent already cited. Network 330*a* of Fig. 22A, with its switches controlled by the indicated relays of Fig. 22, may be connected to any of the systems of Beecher's Figs. 1, 3, 4, 6, 7 and 8 in the manner already described for network 320*a* of Fig. 21A. Similarly, network 330*b* of Fig. 22B may be connected to the systems of Beecher's Figs. 2 and 5 in the manner already described for network 320*b* of Fig. 21B. It will be seen that in each instance actuation of 105A insures that the next character is a dash, while idle position of 105A insures production of a dot if a dot signal is stored (103A actuated) and permits either a dot or dash to be produced in direct response to the control lever (actuation of Ry101 or Ry102) if no dot signal is stored.

From the selected variety of illustrative embodiments described, it will be understood that many modifications may be made in those specific circuits, and that the broad principles of the invention may be carried into practical effect in many different ways without departing from the scope of the invention, which is defined in the following claims.

I claim:

1. A code keying system, comprising in combination, output circuit means shiftable between marking and spacing conditions, control means shiftable between idle and actuated conditions, continuously operating timing means acting independently of the condition of the control means to produce a continuous series of periodic and effectively instantaneous timing signals coupling circuit means acting to shift the output circuit means from spacing to marking condition under control of shifting of the control means to actuated condition and in definitely timed response to a timing signal; and means for continuing the output circuit in marking condition for a predetermined time period after it is so shifted, independently of the instant condition of the control means.

2. A code keying system as defined in claim 1 and in which the timing means comprises a fixed contact and a continuously rotating member that electrically engages the contact periodically and substantially instantaneously, the said member being normally electrically isolated from the coupling circuit means, and means acting to establish a connection between the member and the coupling circuit by virtue of shifting of the control means to actuated condition, engagement of the member and the contact acting when the member is so connected to shift the output circuit from spacing to marking condition.

3. A code keying system as defined in claim 1 and in which the timing means comprises a continuously operating multivibrator, means acting to differentiate the output of the multivibrator to produce a periodic series of voltage pulses, and means for supplying the voltage pulses to the coupling circuit means, the coupling circuit means including a trigger circuit that is normally insensitive to the voltage pulses, and the control means acting when shifted to actuated condition to render the trigger circuit sensitive to the voltage pulses.

4. A code keying system comprising in combination, means acting to generate a continuous series of effectively instantaneous periodic timing signals independently of the following named control means, control means actuable selectively to signal successively a plurality of code characters in approximately uniform time relation to respective timing signals, and circuit means acting under control of both the timing means and the control means to produce the signalled code characters in relatively accurately uniform time relation to the said timing signals.

5. In a system for producing in time sequence an arbitrarily selected series of code dots and dashes, control means for selectively signalling dots and dashes, a timer acting independently of the said control means to establish a predetermined and continuing time scale, means acting in response to a dot signal and under control of the timer to initiate production of a dot only in definite timed relation to the said continuing time scale, means acting in response to a dash signal and under control of the timer to initiate production of a dash only in definite timed relation to the said continuing time scale, and means acting to complete production of each initiated dot and dash independently of the instant condition of the control means.

6. A code keying system as defined in claim 5 and in which the timing means comprises two electrically independent timing switches and continuously rotating cam means acting periodically to close the switches substantially simultaneously for a closure time that is short compared to the period of action of the cam means, the two said signal responsive means comprising control switches in series with the respective timing switches, the said control switches being closed in response to dot and dash signals, respectively.

7. In a system for producing in time sequence a series of code characters selected arbitrarily from code dots and code dashes, the said dots and dashes being such that production of a complete dash requires twice as long as production of a complete dot, control means for selectively signalling dots and dashes, a timer acting independently of the control means to establish a continuous series of consecutive equal time intervals, means acting in response to a dot signal to produce a dot during the first complete time interval that follows the dot signal and is unoccupied by a previously signalled character, and means acting in response to a dash signal to produce a dash during the first two complete consecutive time intervals that follow the dash signal and are unoccupied by a previously signalled character.

8. In a system for producing in time sequence an arbitrarily selected series of code dots and code dashes, output circuit means shiftable between spacing and marking conditions, control means shiftable selectively between an idle condition and either of two actuated conditions in which it signals dots and dashes, respectively, timing means developing a continuous series of periodic and effectively instantaneous timing signals independently of the control means, means acting under control of shifting of the control means to either actuated condition and in response to one timing signal to shift the output circuit means to marking condition, means acting under control of a dot signal to return the output circuit means to spacing condition in response to the next succeeding timing signal, and means acting under control of a dash signal to return the output circuit to spacing condition in response to the third succeeding timing signal following the first named one.

9. A code keying system comprising output circuit means shiftable between marking and spacing conditions, timing means acting to generate two sets of periodic timing signals, the signals of one set alternating with the signals of the other set, control means selectively shiftable between idle condition and either of two active conditions, circuit means, acting under control of shifting of the control means to either one of its active conditions, to shift the output circuit means from spacing to marking condition in response to a predetermined signal of one set, and circuit means acting to return the output circuit to spacing conditions selectively in response to the first and the second succeeding timing signal of the other set, in accordance as the control means was shifted to the first and the second said active conditions.

10. A code keying system, comprising in combination, a trigger circuit shiftable between idle and actuated conditions, means acting under control of such shifting of the trigger circuit to actuated condition to produce a code character of predetermined total duration, a timer acting independently of the following named control means to produce a continuing series of timing signals at uniform successive time intervals following completion of a character, and control means actuable selectively to cause shifting of the trigger circuit to actuated condition only in definite time relation to a selected one of the timing signals.

11. A code keying system, comprising a timing circuit capable of two alternative conditions, timing means for continuously periodically shifting the timing circuit alternately from one condition to the other independently of the following named control means, circuit means acting to derive effectively instantaneous signals of one type from shifts of the timing circuit in one direction and to derive effectively instantaneous signals of another type from shifts of the timing circuit in the other direction, switching circuit means capable of two alternative conditions and shiftable to one condition in response to an applied signal of one type and to the other condition in response to an applied signal of the other type, control means operable selectively to supply a signal of the said one type to the switching circuit means, circuit means acting to supply signals of the other type to the switching circuit means irrespective of the control means, and output circuit means responsive to shifts of condition of the switching circuit means.

12. A code keying system comprising timing means acting to generate continuously two sets of periodic timing signals, the signals of one set alternating with the signals of the other set, two trigger circuits capable of respective idle, sensitized and actuated conditions, control means for selectively shifting the respective trigger circuits from idle to sensitized condition, first coupling circuit means acting in response to a timing signal of the first set to shift a sensitized trigger circuit to actuated condition, first clearing means acting to return the first trigger circuit from actuated to idle condition in response to a timing signal of the second set, second coupling means acting under control of shifting of the second trigger circuit to actuated condition to cause shifting of the first trigger circuit to actuated condition, second clearing means acting under control of shifting of the first trigger circuit to actuated condition to cause shifting of the second trigger circuit from actuated to idle condition, and output circuit means responsive to the conditions of the trigger circuits and acting to produce a signal whenever either trigger circuit is in energized condition.

13. A code keying system as defined in claim 12 and in which the said second coupling means includes means acting under control of the second trigger circuit to shift the first trigger circuit to sensitized condition, whereby the said first coupling means acts to shift the sensitized first trigger circuit to actuated condition in response to a timing signal of the first set.

14. A code keying system as defined in claim 12 and in which the said second coupling means includes means acting under control of the second trigger circuit to complete an actuating circuit for the first trigger circuit and means acting in response to a timing signal of the second set to energize the said actuating circuit.

15. A code keying system comprising timing means acting to generate continuously two sets of periodic timing signals, the signals of one set alternating with the signals of the other set, two trigger circuits capable of respective idle and actuated conditions, control means for selectively completing actuating circuits for the respective trigger circuits, the said actuating circuits being energized in response to a timing signal of the first set to shift the corresponding trigger circuits respectively to actuated condition, first clearing circuit means acting to return the first trigger circuit to idle condition in response to a timing signal of the second set, coupling means acting in response to shifting of the second trigger circuit to actuated condition to disable the said clearing circuit means and to complete an actuating circuit for the first trigger circuit, the last mentioned actuating circuit being energized in response to a timing signal of the second set to shift the first trigger circuit to actuated condition, second clearing means for shifting the second trigger circuit from actuated to idle condition after the first trigger circuit has been so actuated, and output circuit means responsive to the conditions of the trigger circuits and acting to produce a signal whenever either trigger circuit is in actuated condition.

16. A code keying system comprising timing means for producing a periodic series of timing voltage pulses of alternating polarity, first and second trigger circuits of multivibrator type capable respectively of idle, sensitized and actuated conditions and being shiftable respectively from sensitized to actuated condition in response to the said voltage pulses of one polarity, and being shiftable respectively from actuated to idle condition in response to voltage pulses of the other polarity, control means for selectively shifting the respective trigger circuits from idle to sensitized condition, coupling means acting under control of the shifting of the second trigger circuit from actuated to idle condition to cause the shifting of the first trigger circuit to actuated condition, and output circuit means capable of spacing and marking conditions and shiftable to marking condition in response to shifting of either trigger circuit to actuated condition, and returnable to spacing condition whenever neither trigger circuit is in actuated condition.

17. A code keying circuit as defined in claim 16 and in which the said control means includes a third trigger circuit of multivibrator type capable of idle and actuated conditions, manually operable means for shifting the third trigger circuit to actuated condition, and a circuit connection between the third and the first trigger circuits acting in response to shifting of the third trigger circuit to actuated condition to cause shifting of the first trigger circuit to sensitized condition.

18. A code keying system as defined in claim 17 and including also a coupling circuit between the third and second trigger circuits acting in response to shifting of the third trigger circuit to actuated condition to prevent shifting of the second trigger circuit to sensitized condition.

19. A code keying system as defined in claim 17 and including also circuit means responsive to the output circuit means and acting to return the third trigger circuit to idle condition in response to shifting of the output circuit means to marking condition.

20. A code keying system as defined in claim 17 and in which the said manually operable means includes a closable switch, means responsive to closure of the switch and acting to generate a voltage pulse and to supply the voltage pulse to the third trigger circuit in sufficient amplitude to shift the latter circuit to actuated condition.

21. A code keying system as defined in claim 17 and in which the said manually operable means includes a closable switch, means acting in response to movement of the switch to closed position to shift the third trigger circuit to actuated condition independently of the timing means, and means acting independently of the last said means and under control of the said timing means to cause shifting of the third trigger to actuated condition only if the switch is in closed position at the time of a timing voltage pulse of the said one polarity.

22. A code keying circuit as defined in claim 16 and in which the said coupling means acts to generate a voltage pulse of the said one polarity and to supply that pulse to the first trigger circuit in amplitude greater than the amplitude of the timing pulses of the other polarity.

23. In a system for producing selectively relatively long and relatively short code signals, output circuit means shiftable between idle and signalling conditions, first and second trigger circuits capable of being selectively shifted between respective idle and actuated conditions, each said trigger circuit when so shifted to actuated condition acting to cause shifting of the output circuit means to signalling condition, first control means actuable to cause shifting of the first trigger circuit alone to actuated condition for a predetermined time period to produce a relatively short code signal, and second control means actuable to cause shifting of the two said circuits successively to actuated condition for respective predetermined and effectively supplementary time periods to produce a relatively long code signal.

24. In a system for producing selectively relatively long and relatively short code signals, output circuit means shiftable between idle and signalling conditions, first and second trigger circuits capable of being selectively shifted between respective idle and actuated conditions, each said trigger circuit when so shifted to actuated condition acting to cause shifting of the output circuit means to signalling condition, first and second selectively actuable control means, the first control means being actuable to cause shifting of the first trigger circuit alone to actuated condition for a first predetermined time period to produce a relatively short code signal, and the second control means being actuable to cause shifting of the second trigger circuit to actuated condition for a second predetermined time period, and means acting by virtue of that action of the second control means to cause shifting of the first trigger circuit to actuated condition for a third predetermined time period which effectively overlaps, and extends beyond the end of, the second time period, the effective duration of the second and third time periods together being greater than that of the first time period, to produce a relatively long code signal.

25. In a system for producing selectively relatively long and relatively short code signals, first and second trigger circuits shiftable selectively between respective idle and actuated conditions, control means operable selectively to cause shifting of the first and of the second trigger circuits from idle to actuated condtition, clearing means acting to return the actuated trigger circuits to idle condition after respective relatively short time intervals, coupling circuit means acting in response to the return of the second trigger circuit to idle condition to cause shifting of the first trigger circuit to actuated condition, and output circuit means responsive to the conditions of the trigger circuits and acting to produce a signal whenever either trigger circuit is in actuated condition.

26. In a system for producing selectively relatively long and relatively short code signals, first and second trigger circuits shiftable selectively between respective idle and actuated conditions, control means operable selectively to cause shifting of the first and of the second trigger circuits from idle to actuated condition, clearing means acting to return the actuated trigger circuits to idle condition after respective relatively short time intervals, coupling circuit means responsive to the condition of the second trigger circuit and acting independently of the instant condition of the control means to cause shifting of the first trigger circuit to actuated condition after the second trigger circuit has been in actuated condition for a relatively short time interval, and output circuit means responsive to the conditions of the trigger circuits and acting to produce a signal whenever either trigger circuit is in actuated condition.

27. A system as defined in claim 26 and in which the said clearing means includes a first clearing circuit normally acting to return the first trigger circuit to idle condition after a relatively short time interval, which clearing circuit is disabled by virtue of shifting of the second trigger circuit to actuated condition, and a second clearing circuit for returning the second trigger circuit to idle condition only when the first trigger circuit is in actuated condition.

28. A system as defined in claim 26 and in which th clearing means includes circuit means responsive to the condition of the first trigger circuit and acting to cause return of the second trigger circuit to idle condition after the first trigger circuit has been so shifted to actuated condition.

29. A system for producing selectively relatively long and relatively short code signals, the said system comprising a trigger circuit shiftable between idle and actuated conditions, output circuit means responsive to such shifts of the trigger circuit, timing means acting continuously and independently of the following named control means to generate two sets of periodic timing signals, the signals of one set alternating with the signals of the other set, control means actuable to one condition to cause shifting of the trigger circuit from idle to actuated condition in response to a timing signal of one set, clearing means normally acting to return the so shifted trigger circuit to idle condition in response to the next following timing signal of the other set, a second trigger circuit shiftable between idle and actuated conditions, the control means being actuable momentarily to a second condition to cause immediate shifting of the second trigger circuit from idle to actuated condition independently of the said timing signals, the second trigger circuit acting when in actuated condition to cause shifting of the first mentioned trigger circuit from idle to actuated condition in response to a timing signal of the first set, and to render the said clearing means unresponsive to timing signals of the second set, and second clearing means acting to return the second trigger circuit to idle condition during the time period after the next following timing signal of the second set and before the second following timing signal of the second set.

30. A system as defined in claim 29, and also including coupling means acting in response to shifting of the first mentioned trigger circuit to actuated condition to prevent the said shifting of the second trigger circuit from idle to actuated condition.

31. A system as defined in claim 29 and including means actuable to vary the time of acting of the second clearing means within the said time period.

32. In combination with a code keying system that includes control means shiftable selectively between an idle condition and either of two active conditions that correspond respectively to two character types, character initiating means normally acting in response to active condition of the control means to initiate production of a code character of corresponding type, and timing means acting to terminate production of each initiated character in predetermined time relation to its initiation, and to prevent initiation of another character during production of a previously initiated character; signal storing means shiftable from idle to actuated condition independently of the said timing means and in response to momentary shifting of the control means to one of its active conditions, the signal storing means acting when so shifted to cause initiation of production of a character of corresponding type under control of the said timing means and independently of the instant condition of the control means, and clearing means acting to return the signal storing means to idle condition after production of the last mentioned character has been so initiated.

33. In combination with a code keying system that includes control means shiftable selectively between an idle condition and either of two active conditions that correspond respectively to two character types, character initiating means normally acting in response to active condition of the control means to initiate production of a code character of corresponding type, and timing means acting to terminate production of each initiated character in predetermined time relation to its initiation, and to prevent initiation of another character during production of a previously initiated character; a trigger circuit shiftable between relatively stable idle and active conditions, first coupling means responsive to momentary shifting of the control means to its active condition corresponding to one character type and acting independently of the timing means to shift the trigger circuit to active condition, second coupling means responsive to active condition of the trigger circuit and acting independently of the instant condition of the control means and under control of the timing means to cause initiation of production of a character of the said one type only after completion of production of previously initiated characters, and clearing means acting to return the trigger circuit to idle condition after initiation of production of the said character of the one type.

34. The combination defined in claim 33 and including also means responsive to active condition of the trigger circuit and acting to prevent initiation of production of a character of the other type.

35. In a system for producing in time sequence a series of code characters, control means for generating in relatively rapid succession signals corresponding to an ordered plurality of code characters selected from among a plurality of character types, means for storing such generated signals in the order of their generation, character initiating means acting under control of the storage means to initiate production in timed sequence of code characters corresponding to and in the order of the generated and stored signals, and sequencing means acting to complete production of each initiated character independently of the generation of subsequent signals and prior to the initiation of production of any subsequently signalled characters.

36. In a system for producing in time sequence a series of code characters, control means for signalling in relatively rapid succession a series of code characters selected from among a plurality of character types, a corresponding plurality of trigger circuits which are severally shiftable respectively from idle to actuated condition under control of such signalling of characters of their respective types, character producing means acting under control of such shifting of each trigger circuit to produce a code character of the corresponding type, and sequencing means actuated under control of the shifting of the trigger circuit that corresponds to a character of one type and acting to prevent initiation of production of a character of another type until production of the character of the said one type has been completed.

37. In a system for producing in time sequence a series of code characters selected from first and second character types, control means shiftable between an idle condition and first and second active conditions that correspond to the respective character types, first and second trigger circuits which are shiftable respectively from idle to actuated conditions under control of shifting of the control means from idle condition to the said first and second active conditions, means acting in response to each such shifting of the first and second trigger circuits, respectively, to produce a single code character of the said first and second types, and means acting independently of the first said trigger circuit to produce a continuing series of characters of the first type, in response to the control means continuing in its first active condition.

38. In a system for producing in time sequence a series of code characters selected from first and second character types, control means shiftable between an idle condition and first and second active conditions that correspond respectively to the two character types, a first and a second memory circuit for characters of the first type and a third memory circuit for characters of the second type, the said memory circuits being capable of respective idle and actuated conditions, actuating circuit means for the first and second memory circuits acting selectively under control of the condition of the third memory circuit and in response to shifting of the control means to its first active position to shift the first and the second memory circuits selectively to actuated condition according as the third memory circuit is in idle and in actuated conditions, respectively, actuating means for the third memory circuit acting under selective control of the condition of the second memory circuit and in response to shifting of the control means to its second active position to shift the third memory circuit to actuated condition only if the second memory circuit is in idle condition, output means under control of the said memory circuits and acting to produce a character of the first type in response to each shifting of the first memory circuit to actuated condition irrespective of the conditions of the second and third memory circuits, the said output means acting also to produce a character of the second type in response to coexisting presence of the third memory circuit in actuated condition and of the first memory circuit in idle condition, clearing means acting under control of the output means to return the first and the third memory circuits selectively from actuated to idle conditions by virtue of production of characters of the first and second types, respectively, and coupling means controlled by the output means and by the second memory circuit and acting in response to the presence of the latter circuit in actuated condition and by virtue of production of a character of the second type to shift the first memory circuit to actuated condition and to return the second memory circuit to idle condition.

39. A system for generating accurately timed code signals derived from an elongated record that carries scale designations forming a uniformly periodic record scale and that carries signal designations at positions that are spaced longitudinally of the record in approximately uniform relation to respective scale designations, the said system comprising a reading station, means for moving the record past the reading station at a uniform speed with reference to its carried scale designations, means for generating timing signals to form a time scale corresponding to the moving record scale, reading means shiftable to actuated condition in response to presence of a signal designation at the reading station, and signal generating means acting in timed response to a timing signal to generate a code signal only when the reading means is in actuated condition.

40. A system for generating accurately timed code signals derived from an elongated record that carries scale designations forming a uniformly periodic record scale and that carries signal designations spaced longitudinally of the record in approximately uniform relation to respective scale designations, the said system comprising a reading station, means for moving the record past the reading station at a uniform speed with respect to its carried scale designations, means for generating two continuous series of periodic timing signals in definite time relation to the movement of scale designations past the reading station, the timing signals of one series alternating with those of the other series, a trigger circuit shiftable between idle and actuated conditions, sensing means responsive to the presence of a signal designation at the reading station, actuating circuit means acting under control of the sensing means to shift the trigger circuit to actuated condition in timed response to a timing signal of one series and by virtue of the co-existing presence of a signal designation at the reading station, clearing circuit means acting to return the trigger circuit to idle condition in timed response to a timing signal of the other series and independently of the sensing means, and output circuit means shiftable between spacing and marking conditions in response to respective shifting of the trigger circuit between idle and actuated conditions.

41. A system for generating accurately timed code signals derived from an elongated record that carries scale designations forming a uniformly periodic record scale and that carries signal designations selected from among a plurality of signal types, the signal designations of each type being spaced longitudinally of the record in approximately uniform relation to respective scale designations, the said system comprising, a reading station, means for moving the record past the reading station at a uniform speed with reference to its carried scale designations, means for generating a continuous series of periodic timing signals in definite time relation to the movement of scale designations past the reading station to form a time scale corresponding to the moving record scale, a plurality of sensing means responsive respectively to presence of signal designations of the several types at the reading station, a plurality of trigger circuits corresponding respectively to the several signal types and shiftable between respective idle and actuated conditions, circuit means acting under selective control of the several sensing means to shift the respective corresponding trigger circuits from idle to actuated condition in timed response to a timing signal and by virtue of the co-existing presence of a signal designation of corresponding type at the reading station, and means selectively responsive to each such shifting of the several trigger circuits to produce a code signal of corresponding type.

42. A system for generating accurately timed code signals derived from an elongated record that carries scale designations forming a uniformly periodic record scale and that carries signal designations selected from among a plurality of signal types, the signal designations of each type being spaced longitudinally of the record in approximately uniform relation to respective scale designations, the said system comprising, a reading station, means for moving the record past the reading station at a uniform speed with reference to its carried scale designations, means for generating two continuous series of periodic timing signals in definite time relation to the movement of scale designations past the reading station, the timing signals of one series alternating with those of the other series, a plurality of sensing means responsive respectively to presence of signal designations of the several types at the reading station, an output circuit shiftable between spacing and marking conditions, actuating circuit means acting under control of the several sensing means to shift the output circuit from spacing to marking condition in timed response to a timing signal of one series and by virtue of the co-existing presence of a signal designation of any one of the said types at the reading station, clearing means for the output circuit capable of a plurality of distinct conditions that correspond respectively to the several said signal types, circuit means controlled selectively by the several sensing means and acting in response to presence of a signal designation of one of the said signal types at the reading station to establish the clearing means in its condition corresponding to that signal type, the clearing means acting when so shifted to cause the return of the output circuit to spacing condition in timed response to a succeeding timing signal and independently of the instant condition of the sensing means, the last said timing signal being selected from among those signals of the other series that follow the said signal of the one series in predetermined correspondence to the condition of the clearing means.

43. A code keying system for producing selectively relatively long and relatively short code signals, comprising in combination output circuit means shiftable between idle and signalling conditions, first and second trigger circuits capable of being selectively shifted between idle and actuated conditions, each said trigger circuit when so shifted to actuated condition acting to cause shifting of the output signal means to signalling condition, control means shiftable selectively between idle and first and second actuated conditions, continuously operating timing means acting independently of the condition of the control means to produce a continuous series of periodic and effectively instantaneous timing signals, first coupling means acting under control of shifting of the control means to its first actuated condition to cause shifting of the first trigger circuit to actuated condition in definitely timed relation to a timing signal and for a predetermined time period, thereby producing a relatively short code signal, second coupling means acting under control of shifting of the control means to its second actuated condition to cause successive shifting of the two said trigger circuits to actuated condition in definitely timed relation to a timing signal and for respective predetermined and effectively supplementary time periods, thereby producing a relatively long code signal, at least one of the said coupling means including signal storing means shiftable to actuated condition independently of the timing signals and in response to momentary shifting of the control means to the corresponding actuated condition.

44. A code keying system for producing selectively relatively long and relatively short code signals, comprising in combination output circuit means shiftable between idle and signalling conditions, first and second trigger circuits capable of being selectively shifted between idle and actuated conditions, each said trigger circuit when so shifted to actuated condition acting to cause shifting of the output signal means to signalling condition, control means shiftable selectively between idle and first and second actuated conditions, continuously operating timing means acting independently of the condition of the control meals to produce a continuous series of periodic and effectively instantaneous timing signals, first coupling means acting under control of shifting of the control means to its first actuated condition to cause shifting of the first trigger circuit to actuated condition in definitely timed relation to a timing signal and for a predetermined timed period, thereby producing a relatively short code signal, second coupling means acting under control of shifting of the control means to its second actuated condition to cause successive shifting of the two said trigger circuits to actuated condition in definitely timed relation to a timing signal and for respective predetermined and effectively supplementary time periods, thereby producing a relatively long code signal, the two said coupling means including respective first and second signal storing means shiftable to actuated condition independently of the timing signals and in response to momentary shifting of the control means to the respective corresponding actuated conditions, and sequencing circuit means interconnecting the said two coupling means and acting to determine the order of their action in accordance with the order of actuation of the respective signal storing means.

45. A code keying system for producing selectively relatively long and relatively short code signals, comprising in combination output circuit means shiftable between idle and signalling conditions, first and second trigger circuits capable of being selectively shifted between idle and actuated conditions, each said trigger circuit when so shifted to actuated condition acting to cause shifting of the output signal means to signalling condition, control means shiftable selectively between idle and first and second actuated conditions, continuously operating timing means acting independently of the condition of the control means to produce a continuous series of periodic and effectively instantaneous timing signals, first coupling means acting under control of shifting of the control means to its first actuated condition to cause shifting of the first trigger circuit to actuated condition in definitely timed relation to a timing signal and for a predetermined time period, thereby producing a relatively short code signal, and second coupling means acting under control of shifting of the control means to its second actuated condition to cause successive shifting of the two said trigger circuits to actuated condition in definitely timed relation to a timing signal and for respective predetermined and effectively supplementary time periods, thereby producing a relatively long code signal.

46. A code keying system as defined in claim 15 and in which the said second clearing means includes coupling means acting in response to shifting of the first trigger circuit to actuated condition to complete a clearing circuit for the second trigger circuit which is energized in response to a timing signal of the first set.

47. A code keying system comprising timing means acting to generate continuously two sets of periodic timing signals, the signals of one set alternating with the signals of the other set, two trigger circuits capable of respective idle and actuated conditions, control means for selectively completing actuating circuits for the respective trigger circuits, the said actuating circuits being energized in response to a timing signal of the first set to shift the corresponding trigger circuits respectively to actuated condition, first clearing circuit means acting to return the first trigger circuit to idle condition in response to a timing signal of the second set, coupling means acting in response to shifting of the second trigger circuit to actuated condition to complete an energizing circuit for shifting the first trigger circuit to actuated condition and to disable the first clearing circuit means, second clearing circuit means acting to return the second trigger circuit to idle condition in response to a timing signal of the second set, and output circuit means acting to produce a signal whenever the first trigger circuit is in actuated condition.

48. In a system for producing in time sequence a series of code characters selected arbitrarily from code dots and code dashes, the said dots and dashes being such that production of a complete dash requires twice as long as production of a complete dot, control means for selectively signalling dots and dashes, a timer acting independently of the control means to establish a continuous series of consecutive equal time intervals, means acting in response to a dot signal to produce a dot during the first complete time interval that follows the dot signal and is unoccupied by a previously signalled character, and means acting in response to a dash signal to produce a dash during the first two complete consecutive time intervals that follow the dash signal and are unoccupied by a previously signalled character, one of the two last said means including signal storing means shiftable from idle to actuated condition independently of the timing means in response to a momentary code signal of corresponding type, and coupling means acting under control of the signal storing means and independently of the condition of the control means to initiate the corresponding code character at the start of the said time interval.

49. A code keying system comprising control means shiftable selectively between idle and active conditions, continuously operating timing means acting independently of the condition of the control means to generate a continuous series of periodic and effectively instantaneous timing signals, code signal storing means shiftable from idle to actuated condition independently of the timing means and in response to momentary shifting of the control means to active condition, output means shiftable between marking and spacing conditions, coupling means acting under control of the signal storing means and independently of the condition of the control means to shift the output means to marking condition in response to a timing signal when the signal storing means is in actuated condition, clearing means acting to return the signal storing means to idle condition after such shifting of the output means to marking condition, and means acting to return the output means to idle condition after a predetermined time interval.

50. A code keying system as defined in claim 49 and including second coupling means acting under control of the control means and independently of the condition of the signal storing means to shift the output means to marking condition in response to a timing signal when the control means is in active condition.

51. A code keying system comprising control means shiftable selectively between idle and active conditions, continuously operating timing means acting independently of the condition of the control means to generate continuously two sets of periodic timing signals, the signals of one set alternating with the signals of the other set, code signal storing means shiftable from idle to actuated condition independently of the timing means and in response to momentary shifting of the control means to active condition, output means shiftable between marking and spacing conditions, coupling means acting under control of the signal storing means and independently of the condition of the control means to shift the output means to marking condition in response to a timing signal of the first set when the signal storing means is in actuated condition, clearing means acting under control of the output means to return the signal storing means to idle condition, and means acting in response to a time signal of the other set and independently of the condition of the control means to return the output means to spacing condition.

52. A code keying system as defined in claim 1 and in which the said coupling means includes a relay which controls a switch in the output circuit means, the relay coil being connected in series with a resistance across a source of voltage sufficient to hold the relay and insufficient to actuate it, and the timing means includes a condenser and means for connecting the condenser alternately across the relay coil and across the resistance, and the control means includes a switch connected in shunt to the relay coil, the switch being closed in idle condition of the control means and being open in actuated condition of the control means.

53. In a code keying system for producing code signals of a predetermined signal length, the combination of output circuit means shiftable between idle and signalling conditions, first and second trigger circuits shiftable between respective idle and actuated conditions, control means actuable to cause shifting of the first trigger circuit to actuated condition, first clearing means acting to return the first trigger circuit to idle condition after a first definite time period less than the said signal length, coupling circuit means acting under control of shifting of the first trigger circuit to cause shifting of the second trigger circuit to actuated condition, second clearing means acting to return the second trigger circuit to idle condition at a definite time which follows the return to idle condition of the first trigger circuit by a second definite time period, the sum of the two said time periods being equal to the said signal length, and circuit means acting to shift the output circuit means to signalling condition substantially simultaneously with the shift of the first trigger circuit to actuated condition, and acting to return the output circuit means to idle condition substantially simultaneously with the return to idle condition of the second trigger circuit.

54. The combination defined in claim 53 and in which the said coupling circuit means includes a switch connected in the second trigger circuit and controlled by the first trigger circuit.

55. The combination defined in claim 53 and in which the said first clearing means includes a switch connected in shunt to the first trigger circuit and closed by virtue of actuation of the second trigger circuit.

56. The combination defined in claim 53 and in which the said first clearing means includes a switch connected in series with the first trigger circuit and opened by virtue of actuation of the second trigger circuit.

57. The combination defined in claim 53 and in which the said coupling means includes means acting to generate a voltage pulse in response to return of the first trigger circuit to idle condition, and means for supplying that voltage pulse to the second trigger circuit to shift the same to actuated condition.

58. The combination defined in claim 53 and in which the second clearing circuit includes a switch connected in shunt to the second trigger circuit and closed by virtue of the return to idle condition of the first trigger circuit.

59. The combination defined in claim 53 and in which the said coupling circuit means acts in response to shifting of the first trigger circuit to actuated condition to cause immediate shifting of the second trigger circuit to actuated condition, and the output circuit is shifted to signalling condition by virtue of shifting of the second trigger circuit to actuated condition.

60. In combination with a code keying system that includes control means shiftable selectively between an idle condition and either of two active conditions that correspond respectively to two character types, character initiating means normally acting in response to active condition of the control means to initiate production of a code character of corresponding type, and timing means acting to terminate production of each initiated character in predetermined time relation to its initiation, and to prevent initiation of another character during production of a previously initiated character; signal storing means comprising two trigger circuits shiftable selectively from respective idle to actuated conditions independently of the said timing means and in response to momentary shifting of the control means to its respective active conditions, each trigger circuit when so shifted to actuated condition acting to cause initiation of production of a character of corresponding type under control of the said timing means and independently of the instant condition of the control means, and sequencing circuit means interconnecting the trigger circuits and the said character initiating means and acting to determine the order of initiation of characters of the respective types in accordance with the order of actuation of the two trigger circuits.

JOHN KAYE.

References Cited in the file of this patent

UNITED STATES PATENTS

| Number | Name | Date |
|---|---|---|
| 1,685,776 | Favarger | Oct. 2, 1928 |
| 2,148,028 | Martin | Feb. 21, 1939 |
| 2,222,448 | Starkins | Nov. 19, 1940 |
| 2,228,470 | Martin | Jan. 14, 1941 |
| 2,303,734 | Garceau | Dec. 1, 1942 |
| 2,517,538 | Beecher | Aug. 8, 1950 |